US010984641B2

(12) United States Patent
Modestine et al.

(10) Patent No.: US 10,984,641 B2
(45) Date of Patent: *Apr. 20, 2021

(54) PARCEL THEFT DETERRENCE FOR A/V RECORDING AND COMMUNICATION DEVICES

(71) Applicant: Amazon Technologies, Inc., Seattle, WA (US)

(72) Inventors: John Modestine, Los Angeles, CA (US); Elliott Lemberger, Santa Monica, CA (US); James Siminoff, Pacific Palisades, CA (US); Joshua Roth, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,991

(22) Filed: Nov. 11, 2019

(65) Prior Publication Data

US 2020/0074824 A1 Mar. 5, 2020

Related U.S. Application Data

(63) Continuation of application No. 15/669,817, filed on Aug. 4, 2017, now Pat. No. 10,510,232.

(Continued)

(51) Int. Cl.
*G08B 13/196* (2006.01)
*G06T 7/254* (2017.01)
(Continued)

(52) U.S. Cl.
CPC ............. *G08B 13/196* (2013.01); *G06T 7/13* (2017.01); *G06T 7/246* (2017.01); *G06T 7/254* (2017.01);
(Continued)

(58) Field of Classification Search
USPC ........................................................ 348/141
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

International Search Report and Written Opinion of the International Searching Authority for PCT/US/2017/045636, dated Nov. 17, 2017, International Application Division, Korean Intellectual Property Office, Republic of Korea.

*Primary Examiner* — Behrooz M Senfi
(74) *Attorney, Agent, or Firm* — Lathrop GPM LLP

(57) ABSTRACT

Parcel theft deterrence for audio/video (A/V) recording and communication devices, such as video doorbells and security cameras. When an A/V recording and communication device captures image data that includes a parcel, a parcel boundary may be created for monitoring the parcel within. In various embodiments, when the parcel is removed from the parcel boundary, a user alert may be generated to notify a user of a client device associated with the A/V recording and communication device that the parcel has been removed.

20 Claims, 43 Drawing Sheets

Related U.S. Application Data

(60) Provisional application No. 62/374,505, filed on Aug. 12, 2016, provisional application No. 62/479,060, filed on Mar. 30, 2017, provisional application No. 62/522,075, filed on Jun. 19, 2017.

(51) Int. Cl.

| | | |
|---|---|---|
| *G06T 7/70* | (2017.01) | |
| *G06T 7/60* | (2017.01) | |
| *H04N 5/232* | (2006.01) | |
| *H04N 7/18* | (2006.01) | |
| *G06T 7/246* | (2017.01) | |
| *G06T 7/13* | (2017.01) | |
| *H04N 7/14* | (2006.01) | |

(52) U.S. Cl.
CPC .............. *G06T 7/60* (2013.01); *G06T 7/70* (2017.01); *G08B 13/19608* (2013.01); *G08B 13/19695* (2013.01); *H04N 5/23293* (2013.01); *H04N 7/186* (2013.01); *G06T 2207/10016* (2013.01); *G06T 2207/10024* (2013.01); *G06T 2207/30232* (2013.01); *H04N 7/147* (2013.01)

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,109,378 B2 | 8/2015 | Scalisi |
| 9,113,051 B1 | 8/2015 | Scalisi |
| 9,113,052 B1 | 8/2015 | Scalisi |
| 9,118,819 B1 | 8/2015 | Scalisi et al. |
| 9,142,214 B2 | 9/2015 | Scalisi |
| 9,160,987 B1 | 10/2015 | Scalisi et al. |
| 9,165,444 B2 | 10/2015 | Scalisi |
| 9,172,920 B1 | 10/2015 | Scalisi et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Scalisi |
| 9,736,284 B2 | 8/2017 | Scalisi et al. |
| 9,743,049 B2 | 8/2017 | Scalisi et al. |
| 9,754,334 B2 | 9/2017 | Pearcy et al. |
| 9,760,237 B2 | 9/2017 | Eraker et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,482,737 B2 * | 11/2019 | Modestine .............. G06T 7/246 |
| 10,510,232 B2 * | 12/2019 | Modestine ....... G08B 13/19608 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2007/0217780 A1 | 9/2007 | Hirooka |
| 2010/0202702 A1 | 8/2010 | Benos et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0149946 A1 | 5/2015 | Benos et al. |
| 2015/0163463 A1 | 6/2015 | Hwang et al. |
| 2015/0310381 A1 | 10/2015 | Lyman |
| 2016/0044287 A1 | 2/2016 | Scalisi et al. |
| 2016/0180667 A1 * | 6/2016 | Bunker ............ G08B 13/19613 382/103 |
| 2017/0301200 A1 * | 10/2017 | Siminoff ............ G06K 9/00771 |
| 2018/0047267 A1 | 2/2018 | Modestine et al. |
| 2018/0261060 A1 * | 9/2018 | Siminoff .......... G08B 13/19684 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| KR | 10-2012-0057779 A | 6/2012 |
| KR | 10-2014-0115614 A | 10/2014 |
| KR | 10-1612745 B1 | 4/2016 |

(56) References Cited

FOREIGN PATENT DOCUMENTS

| | | |
|---|---|---|
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

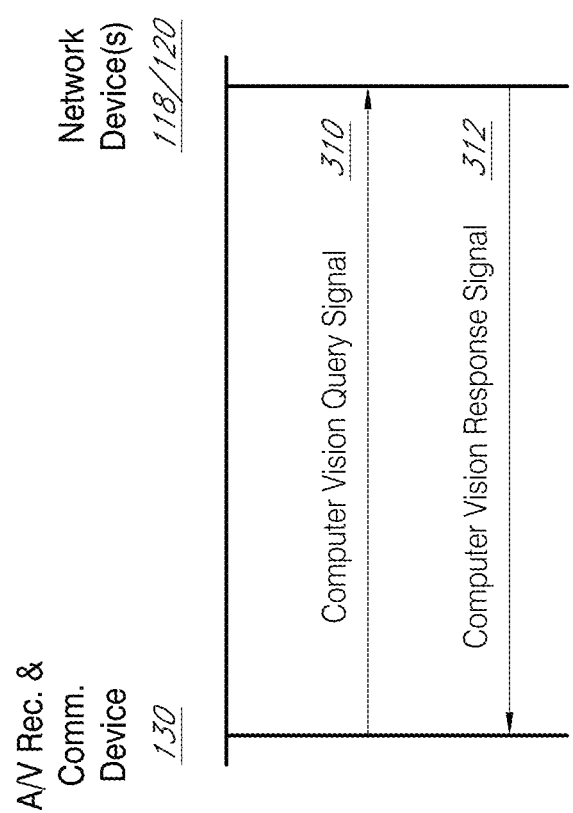

PARCEL THEFT DETERRENCE FOR A/V RECORDING AND COMMUNICATION DEVICES

CROSS-REFERENCE TO RELATED APPLICATIONS

This application is a continuation of application Ser. No. 15/669,817, filed on Aug. 4, 2017, which claims priority to provisional application Ser. No. 62/522,075, filed on Jun. 19, 2017, provisional application Ser. No. 62/479,060, filed on Mar. 30, 2017, and provisional application Ser. No. 62/374,505, filed on Aug. 12, 2016. The entire contents of the priority applications are hereby incorporated by reference as if fully set forth.

TECHNICAL FIELD

The present embodiments relate to audio/video (AN) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

BRIEF DESCRIPTION OF THE DRAWINGS

The various embodiments of the present parcel theft deterrence for audio/video (A/V) recording and communication devices now will be discussed in detail with an emphasis on highlighting the advantageous features. These embodiments depict the novel and non-obvious present parcel theft deterrence for A/V recording and communication devices shown in the accompanying drawings, which are for illustrative purposes only. These drawings include the following figures, in which like numerals indicate like parts:

FIG. 23 is a sequence diagram illustrating an embodiment of a process for deterring parcel theft with an A/V recording and communication device according to various aspects of the present disclosure;

DETAILED DESCRIPTION

Figure 1:
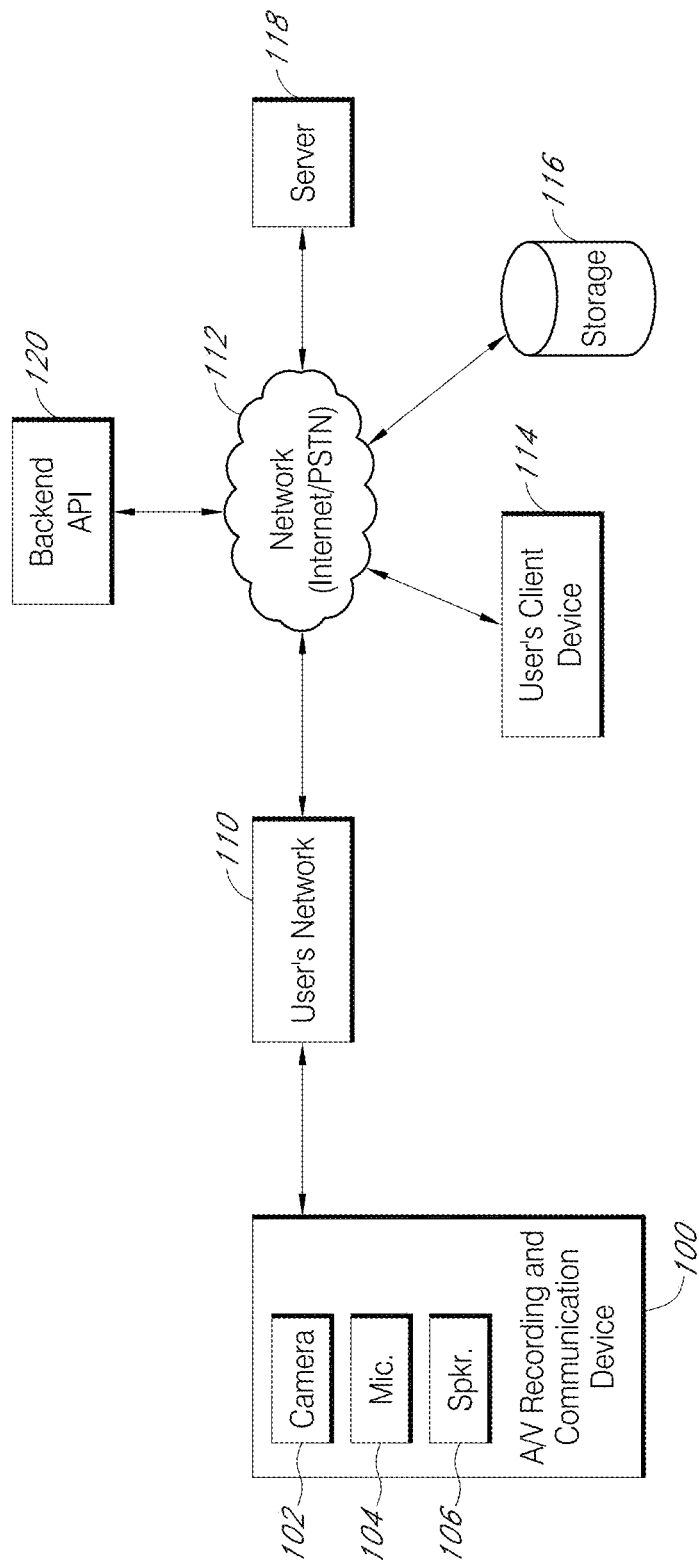
FIG. 1 is a functional block diagram illustrating a system for streaming and storing A/V content captured by an audio/video (A/V) recording and communication device according to various aspects of the present disclosure.

The various embodiments of the present parcel theft deterrence for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that parcel pilferage is a pernicious and persistent problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves. The present embodiments provide these advantages and enhancements, as described below.

The present embodiments can be implemented in numerous ways, including as a process, an apparatus, a system, a computer program product embodied on a computer-readable storage medium, and/or a processor, such as a processor configured to execute instructions stored on and/or provided by a memory coupled to the processor. In this specification, these implementations may be referred to as techniques. In general, the order of the steps of disclosed processes may be altered within the scope of the present embodiments. Unless stated otherwise, a component such as a processor or a memory described as being configured to perform a task may be implemented as a general component that is temporarily configured to perform the task at a given time or a specific component that is manufactured to perform the task. As used herein, the term processor may comprise one or more devices, circuits, and/or processing cores configured to process data, such as computer program instructions.

The following detailed description describes the present embodiments with reference to the drawings. In the drawings, reference numbers label elements of the present embodiments. These reference numbers are reproduced below in connection with the discussion of the corresponding drawing features.

The embodiments of the present parcel theft deterrence for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100, such as a doorbell. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 is typically located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some of the present embodiments).

The video images captured by the camera 102 of the A/V recording and communication device 100 (and the audio captured by the microphone 104) may be uploaded to the cloud and recorded on the remote storage device 116 (FIG. 1). In some of the present embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some of the present embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
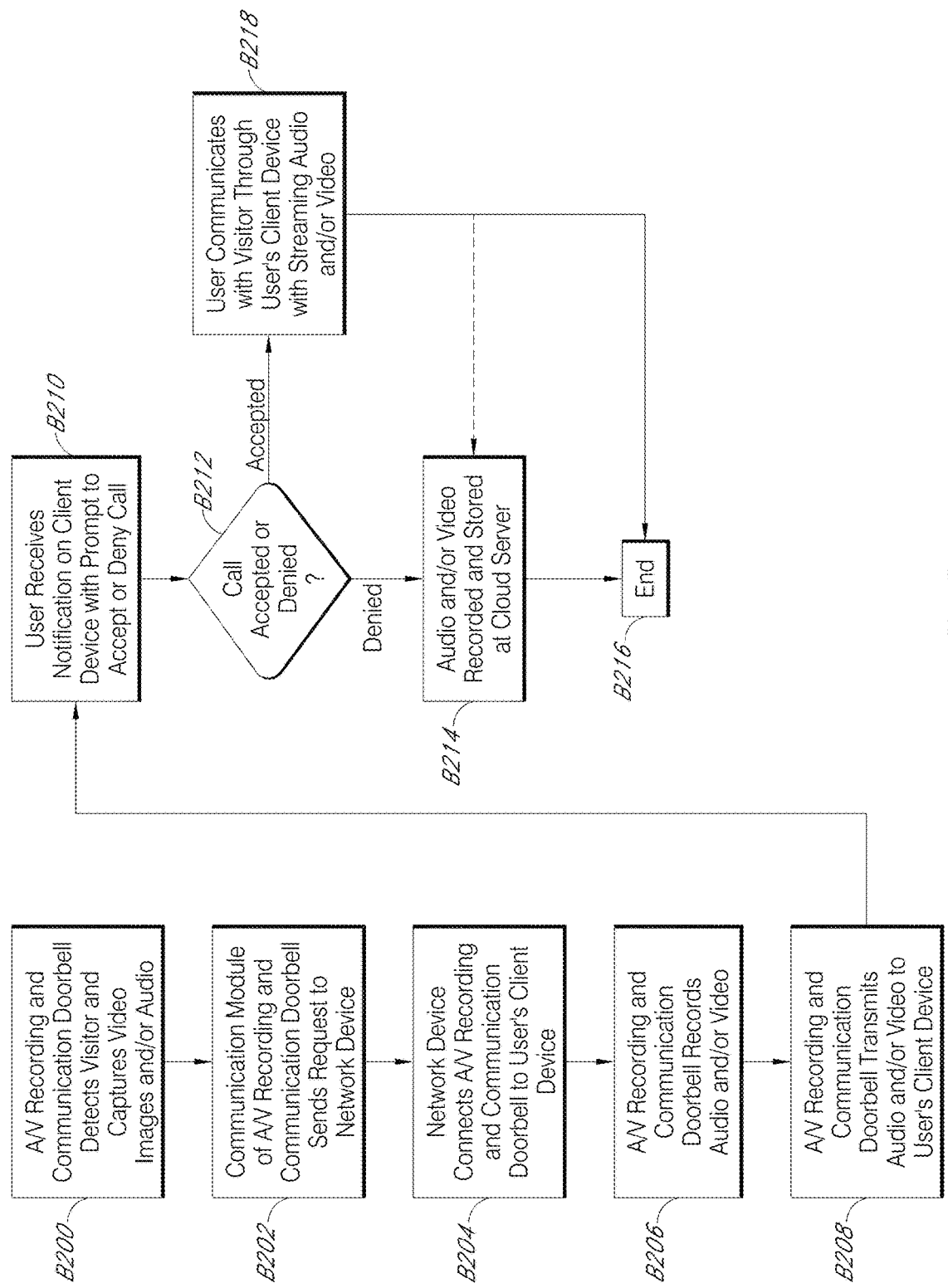
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B260, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B262, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B264 the network device may connect the A/V recording and communication device 100 to the user's client device 114 through the user's network 110 and the network 112. At block B266, the A/V recording and communication device 100 may record available audio and/or video data using the camera 102, the microphone 104, and/or any other device/sensor available. At block B268, the audio and/or video data is transmitted (streamed) from the A/V recording and communication device 100 to the user's client device 114 via the user's network 110 and the network 112. At block B270, the user may receive a notification on his or her client device 114 with a prompt to either accept or deny the call.

At block B272, the process determines whether the user has accepted or denied the call. If the user denies the notification, then the process advances to block B274, where the audio and/or video data is recorded and stored at a cloud server. The session then ends at block B276 and the connection between the A/V recording and communication device 100 and the user's client device 114 is terminated. If, however, the user accepts the notification, then at block B278 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B276. In some of the present embodiments, the audio and/or video data may be recorded and stored at a cloud server (block B274) even if the user accepts the notification and communicates with the visitor through the user's client device 114.

Figure 3:
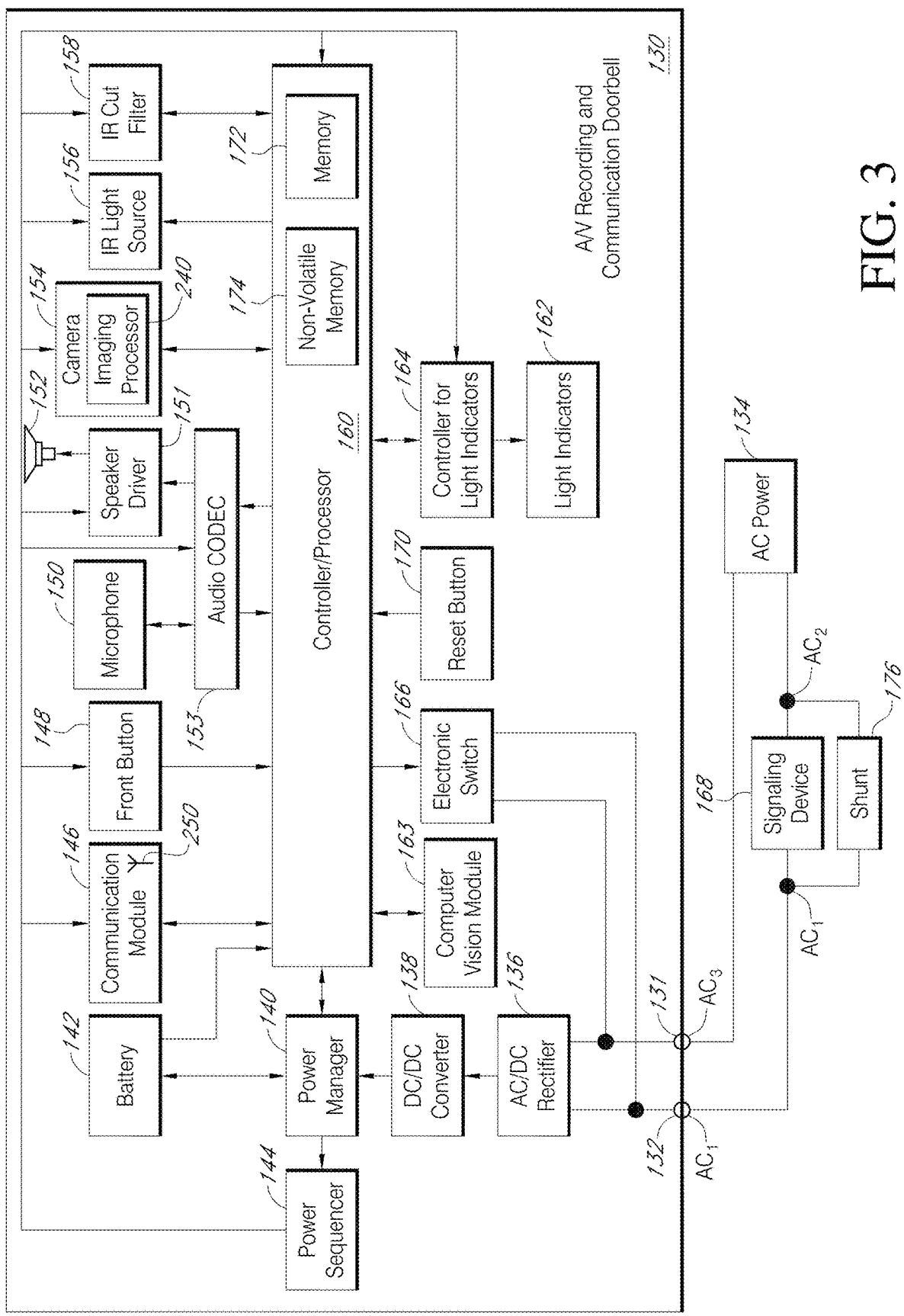
FIG. 3 is a functional block diagram illustrating an embodiment of an A/V recording and communication device according to the present disclosure.

FIGS. 3-13 illustrate one embodiment of a low-power-consumption A/V recording and communication device 130 according to various aspects of the present disclosure. FIG. 3 is a functional block diagram illustrating various components of the A/V recording and communication device 130 and their relationships to one another. For example, the A/V recording and communication device 130 includes a pair of terminals 131, 132 configured to be connected to a source of external AC (alternating-current) power, such as a household AC power supply 134 (may also be referred to as AC mains). The AC power 134 may have a voltage in the range of 16-24 V AC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication device 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication device 130, including a communication module 146, a front button 148, a microphone 150, a speaker driver 151, a speaker 152, an audio CODEC (COder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication device 130 further comprises an electronic switch 166 that closes when the front button 148 is depressed. When the electronic switch 166 closes, power from the AC power source 134 is diverted through a signaling device 168 that is external to the A/V recording and communication device 130 to cause the signaling device 168 to emit a sound, as further described below. In one non-limiting example, the electronic switch 166 may be a triac (triode AC switch) device. The A/V recording and communication device 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some of the present embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication device 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication device 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication device 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication device 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the device 130 therefore causes the signaling device 168 to "ring," alerting any person(s) within the structure to which the device 130 is mounted that there is a visitor at the front door (or at another location corresponding to the location of the device 130). In one non-limiting example, the electronic switch 166 may be a triac device.

Figure 4:
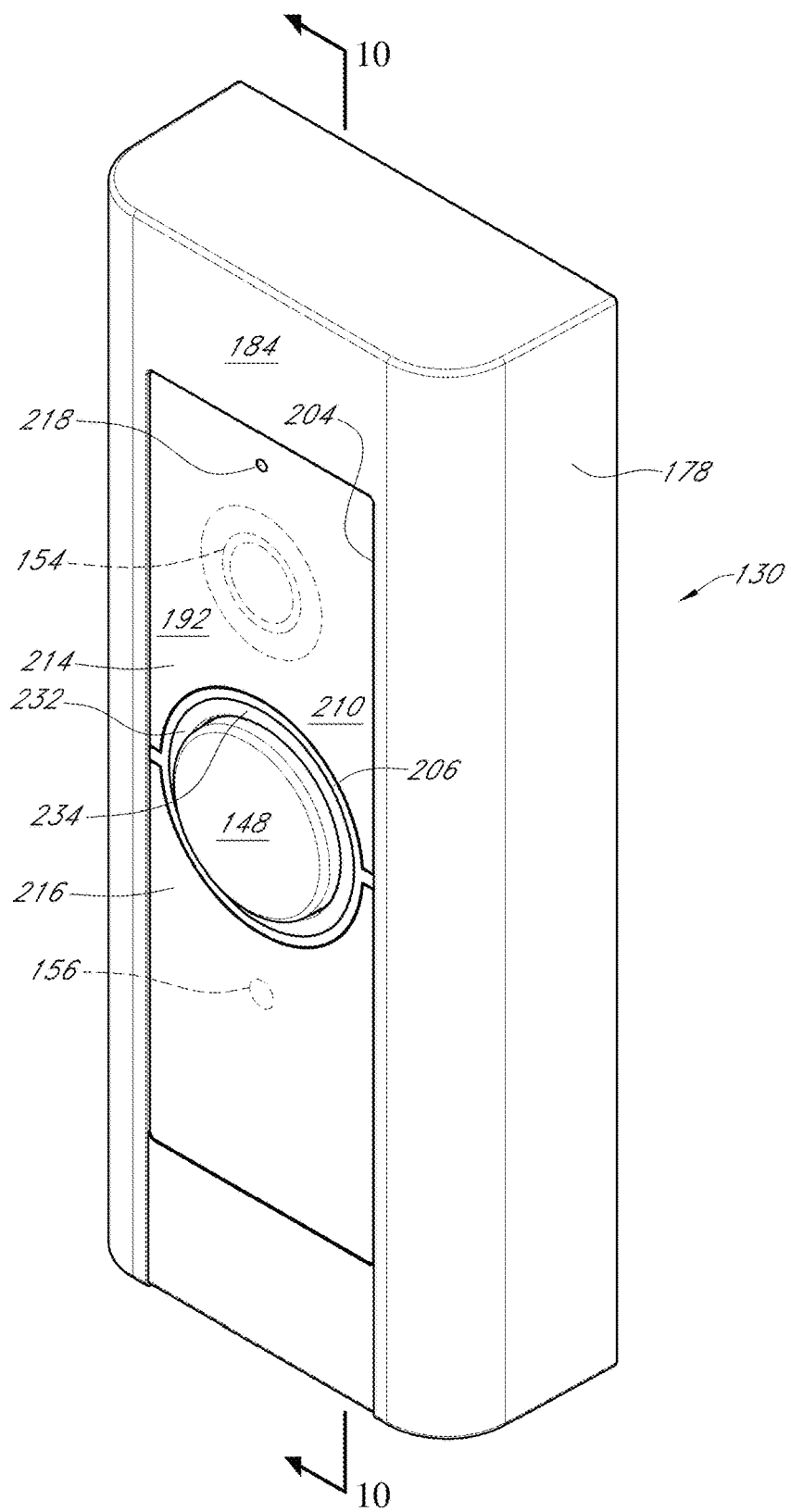
FIG. 4 is a front perspective view of an embodiment of an A/V recording and communication device according to the present disclosure.
Figure 5:
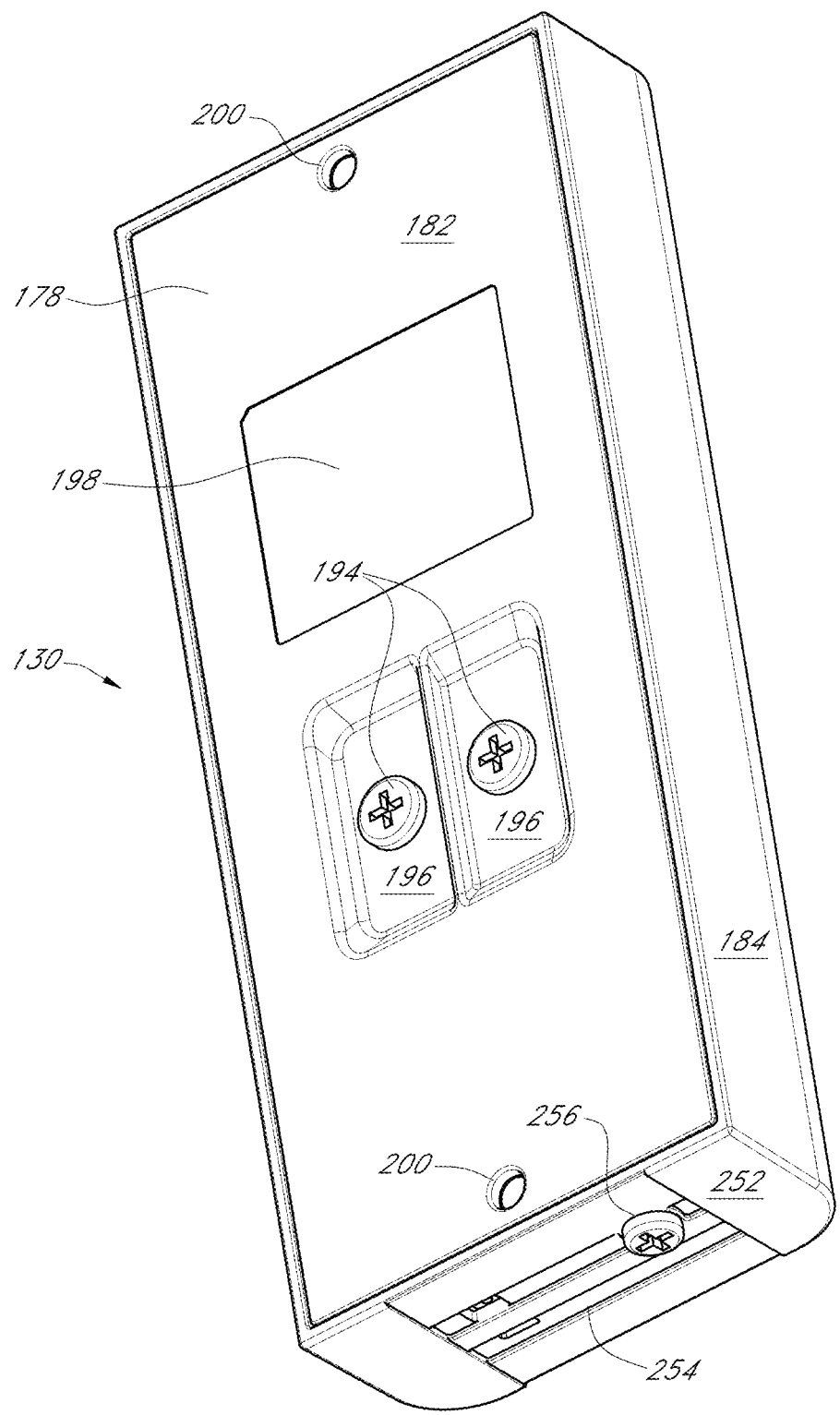
FIG. 5 is a rear perspective view of the A/V recording and communication device of FIG. 4.
Figure 6:
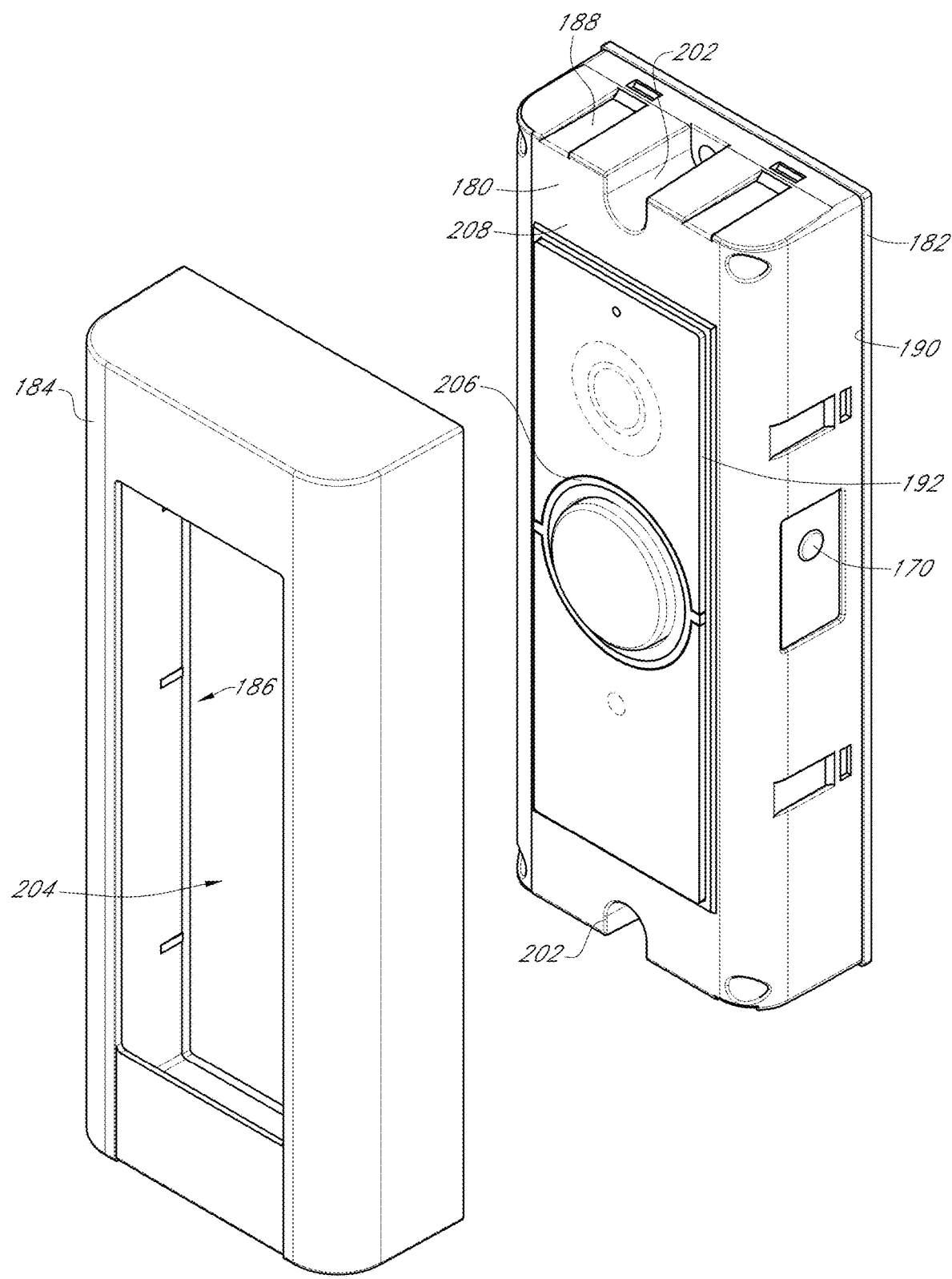
FIG. 6 is a partially exploded front perspective view of the A/V recording and communication device of FIG. 4 showing the cover removed.

With reference to FIGS. 4-6, the A/V recording and communication device 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some of the present embodiments, multiple shells 184 in different colors may be provided so that the end user may customize the appearance of his or her A/V recording and communication device 130. For example, the A/V recording and communication device 130 may be packaged and sold with multiple shells 184 in different colors in the same package.

With reference to FIG. 4, a front surface of the A/V recording and communication device 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication device 130). With further reference to FIG. 4, the A/V recording and communication device 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication device 130. The terminal screws 194 are configured to receive electrical wires to connect to the A/V recording and communication device 130, through the terminals 131, 132, to the household AC power supply 134 of the structure on which the A/V recording and communication device 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication device 130. The A/V recording and communication device 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication device 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication device 130 may include a mounting plate or bracket (not shown) to facilitate securing the A/V recording and communication device 130 to the mounting surface.

Figure 10:
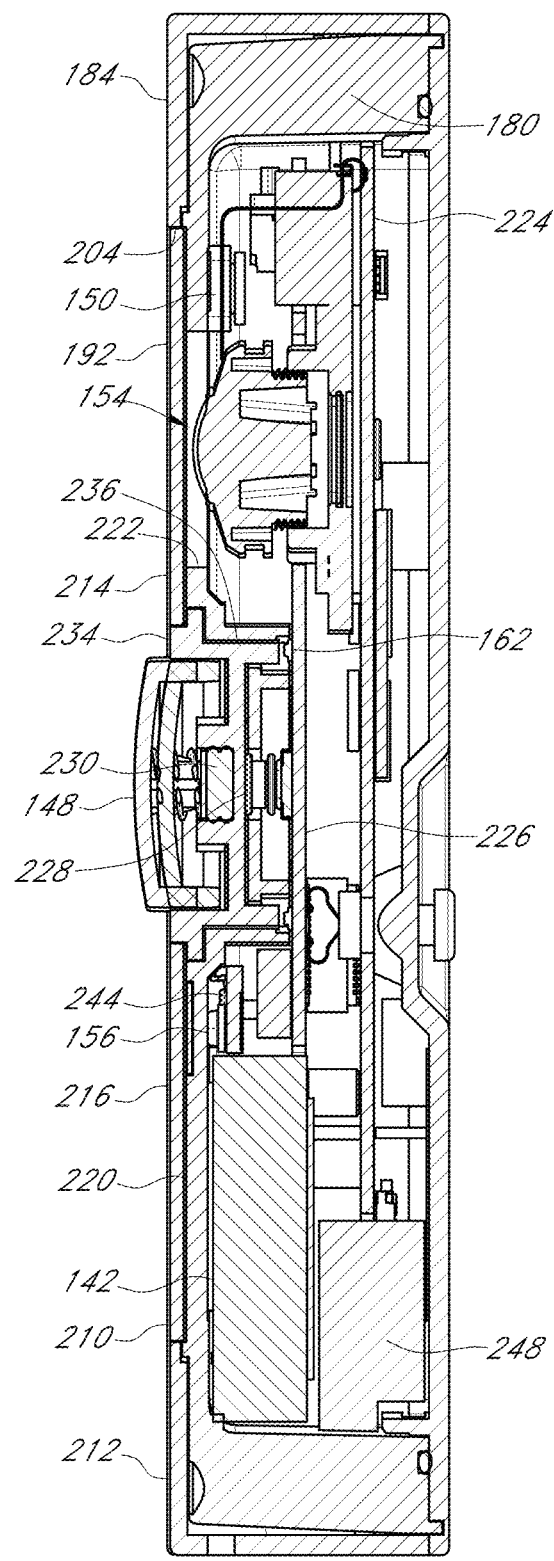
FIG. 10 is a right-side cross-sectional view of the A/V recording and communication device of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication device 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
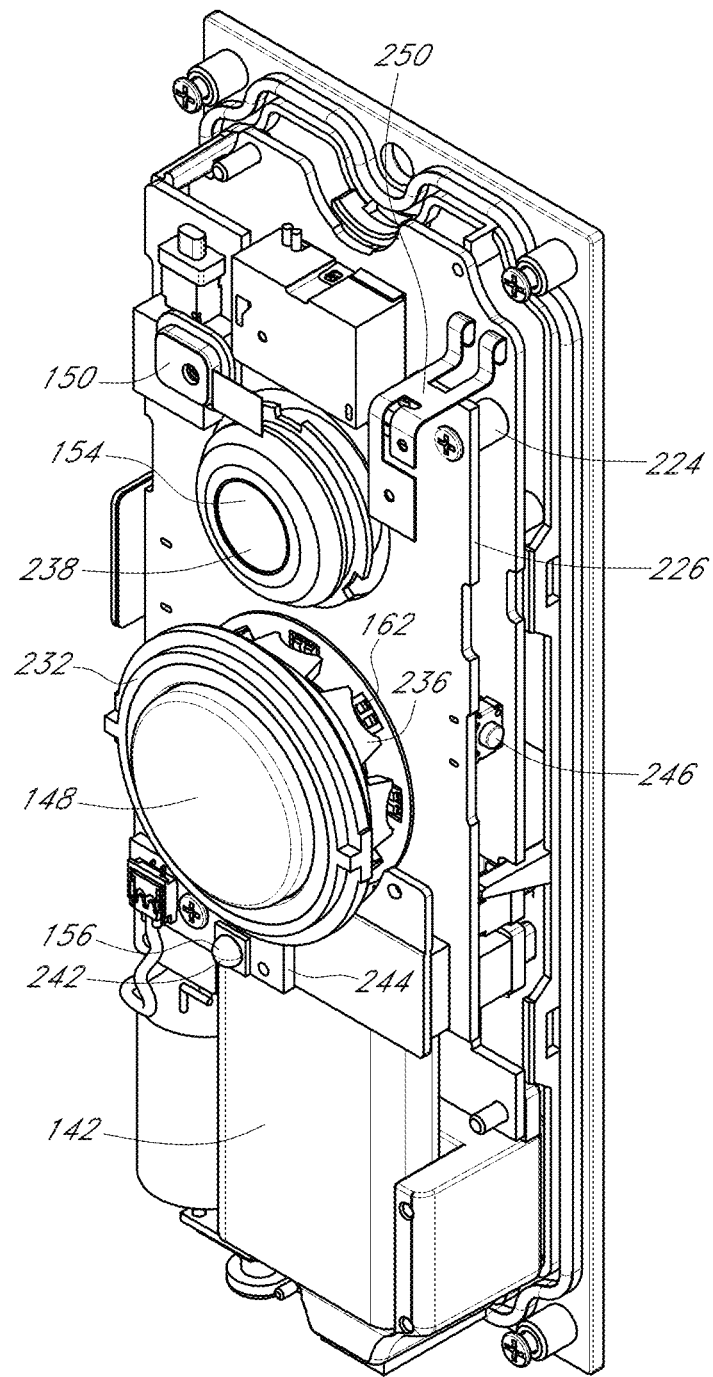
FIGS. 7-9 are front perspective views of various internal components of the A/V recording and communication device of FIG. 4.
Figure 8:
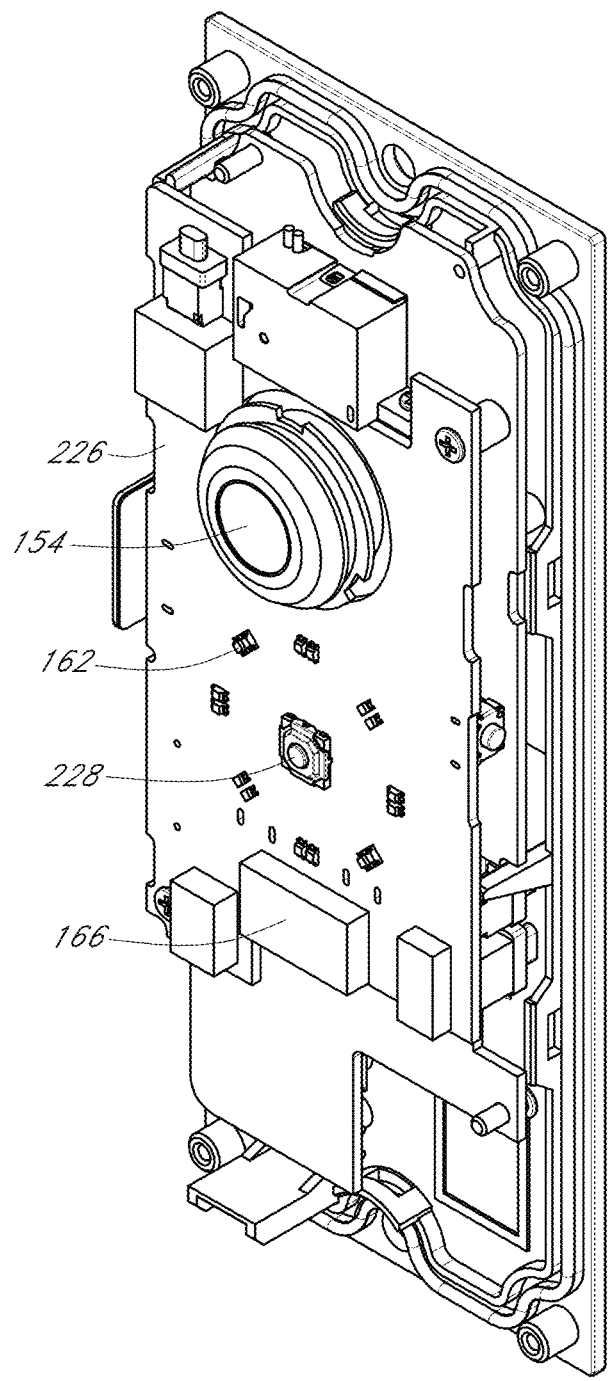
Figure 9:
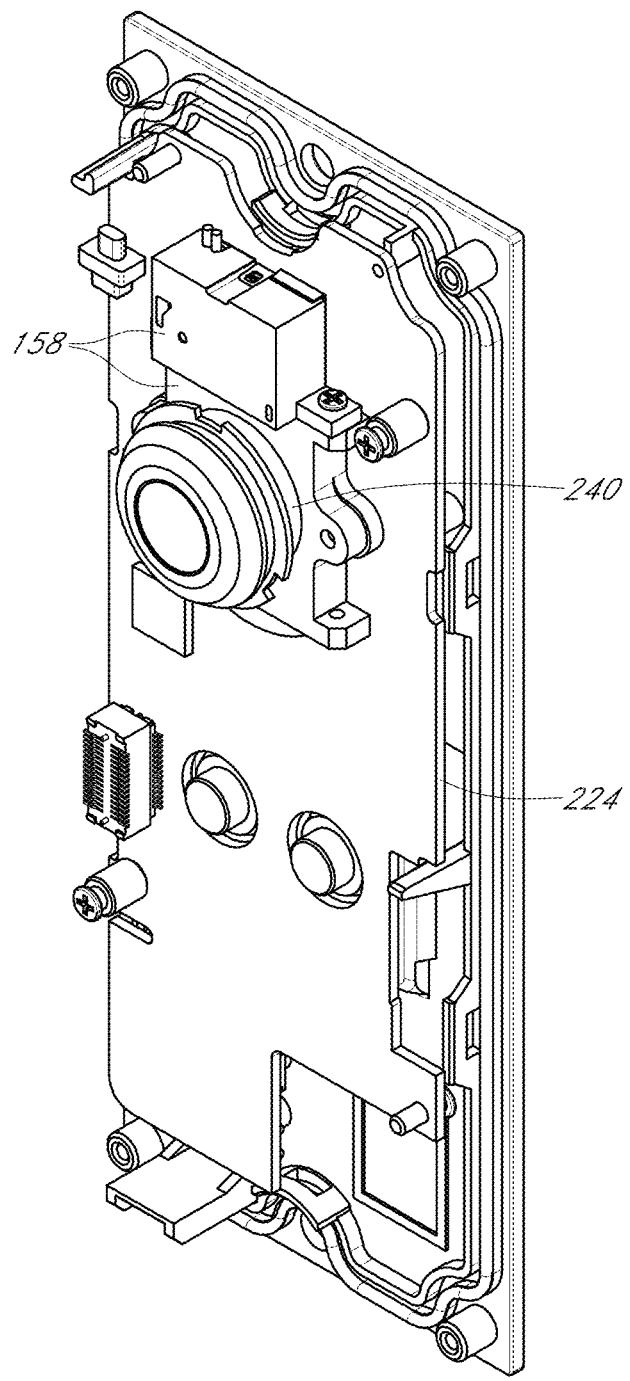

FIGS. 7-10 illustrate various internal components of the A/V recording and communication device 130. FIGS. 7-9 are front perspective views of the device 130 with the shell 184 and the enclosure 180 removed, while FIG. 10 is a right-side cross-sectional view of the device 130 taken through the line 10-10 in FIG. 4. With reference to FIGS. 7 and 8, the A/V recording and communication device 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the device 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the device 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless (and/or wired) network is good, limited, poor, or not connected. The LEDs 162 may be used to guide the user through setup or installation steps using visual cues, potentially coupled with audio cues emitted from the speaker 152.

With further reference to FIG. 7, the A/V recording and communication device 130 further comprises a rechargeable battery 142. As described in further detail below, the A/V recording and communication device 130 is connected to an external power source 134 (FIG. 3), such as AC mains. The A/V recording and communication device 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication device 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication device 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication device 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. In alternative embodiments of the IR LED PCB 244, the IR LED PCB 244 may include more than one IR LED 242. For example, the IR LED PCB 244 may include three IR LEDs 242, or any other number of IR LEDs 242. In embodiments including more than one IR LED 242, the size of the third opening in the cover may be increased to accommodate the larger size of the IR LED PCB 244.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication device 130 can clearly capture images at night (may be referred to as "night vision").

With reference to FIG. 9, the A/V recording and communication device 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some of the present embodiments, the camera 154 acts as a light detector for use in controlling the current state of the IR cut filter 158 and turning the IR LED 242 on and off. Using the camera 154 as a light detector is facilitated in some of the present embodiments by the fact that the A/V recording and communication device 130 is powered by a connection to AC mains, and the camera 154, therefore, is always powered on. In other embodiments, however, the A/V recording and communication device 130 may include a light sensor separate from the camera 154 for use in controlling the IR cut filter 158 and the IR LED 242.

With reference back to FIG. 6, the A/V recording and communication device 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160. In some of the present embodiments, the reset button 170 may also be used in a process to activate the A/V recording and communication device 130, as described below.

Figure 11:
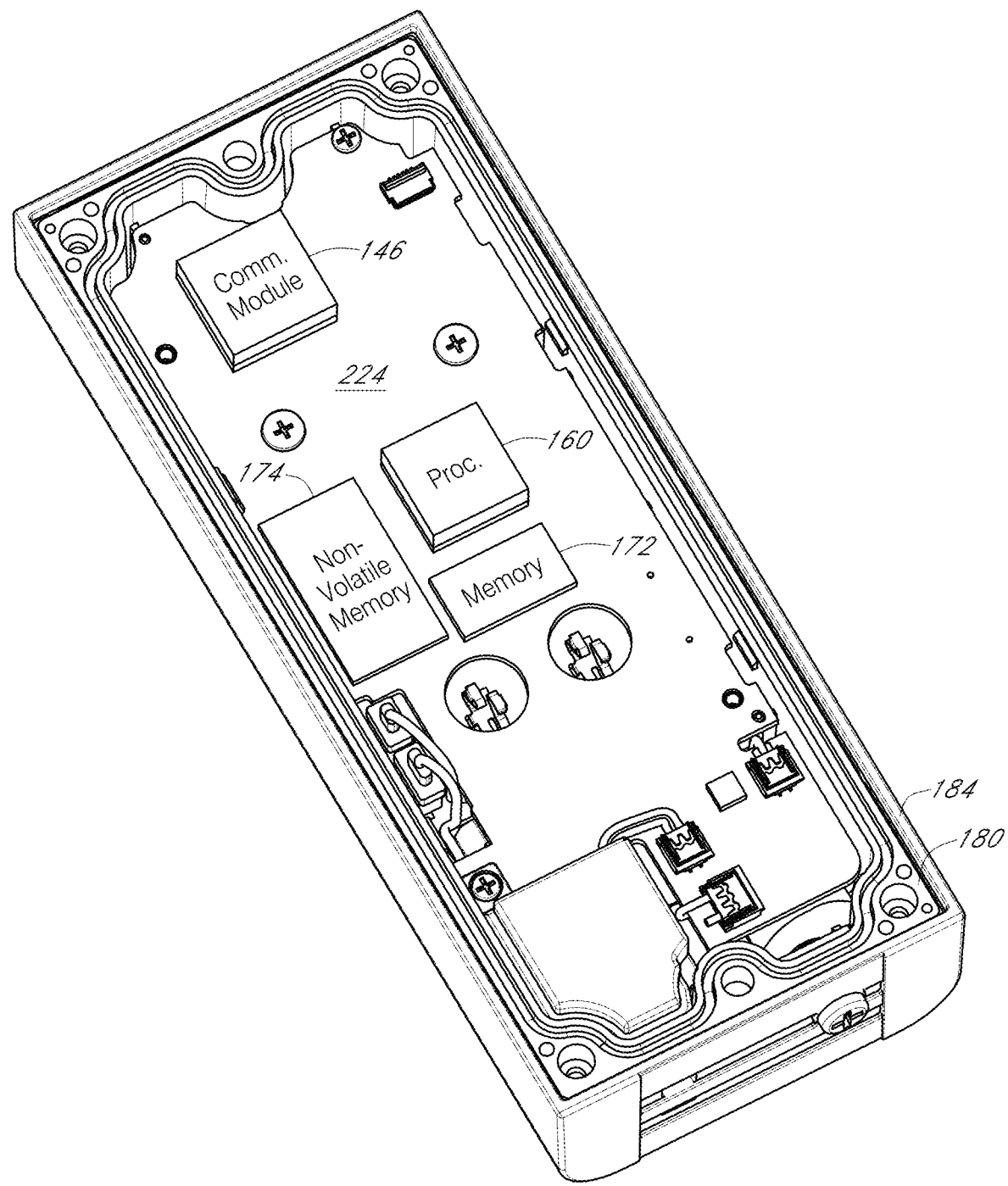
FIGS. 11-13 are rear perspective views of various internal components of the A/V recording and communication device of FIG. 4.
Figure 12:
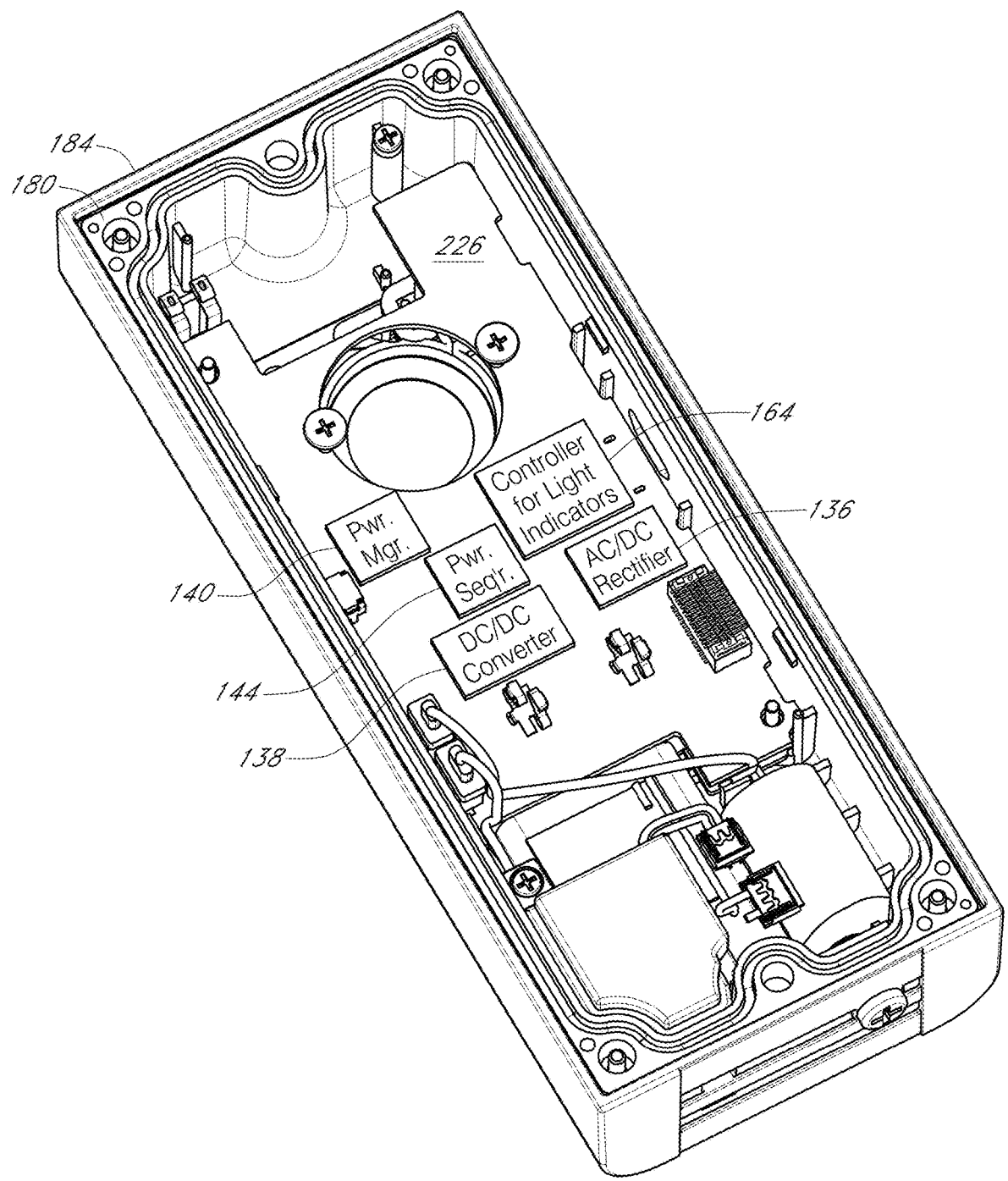
Figure 13:
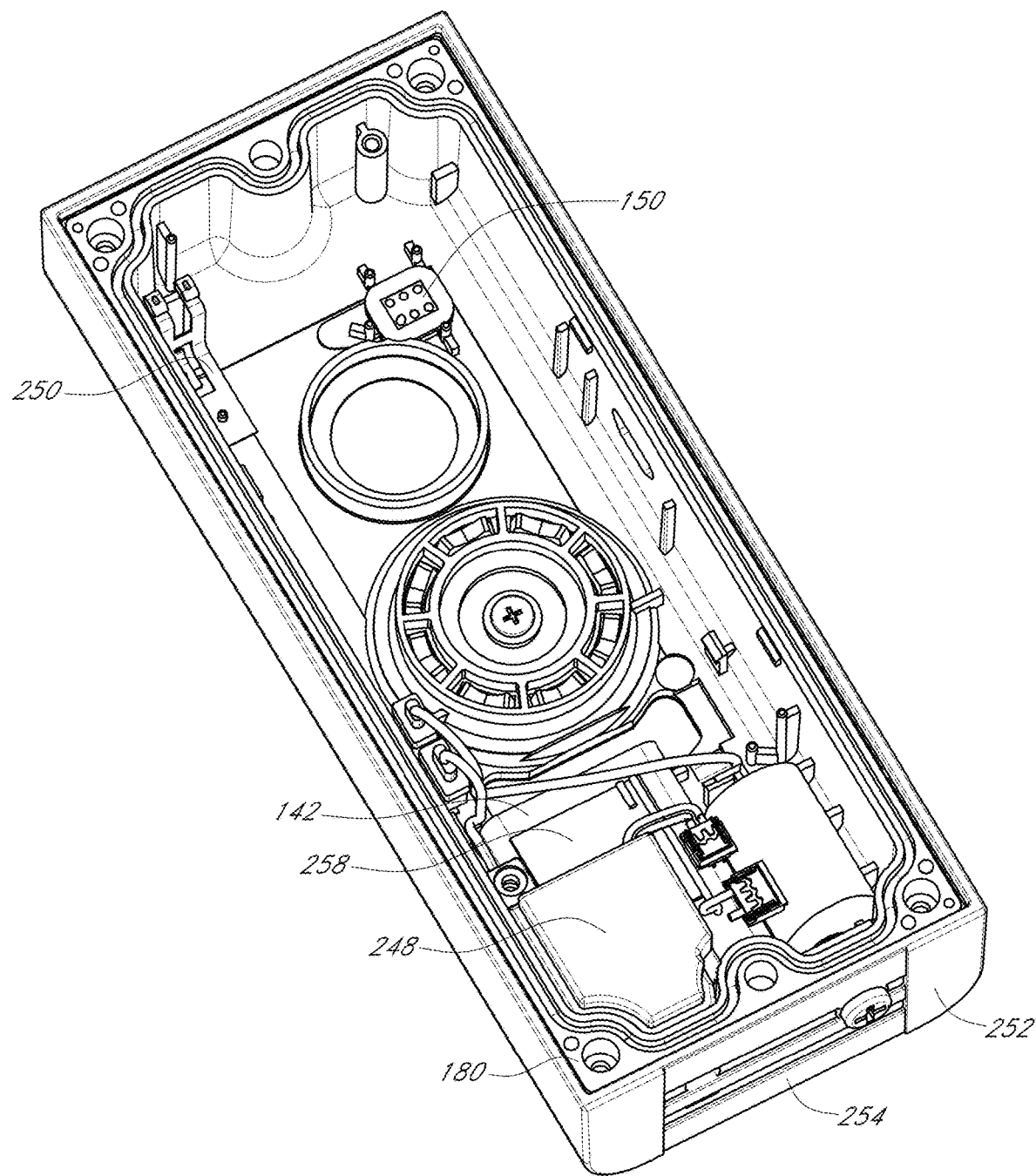

FIGS. 11-13 further illustrate internal components of the A/V recording and communication device 130. FIGS. 11-13 are rear perspective views of the device 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218

(FIG. 4) in the upper portion 214 of the shield 192 so that sounds emanating from the area around the A/V recording and communication device 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication device 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication device 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the device 130 is mounted to a mounting bracket (not shown), the security screw may also maintain the device 130 on the mounting bracket.

With reference to FIG. 13, the A/V recording and communication device 130 may further include a battery heater 258. The present A/V recording and communication device 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some of the present embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some of the present embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 14:
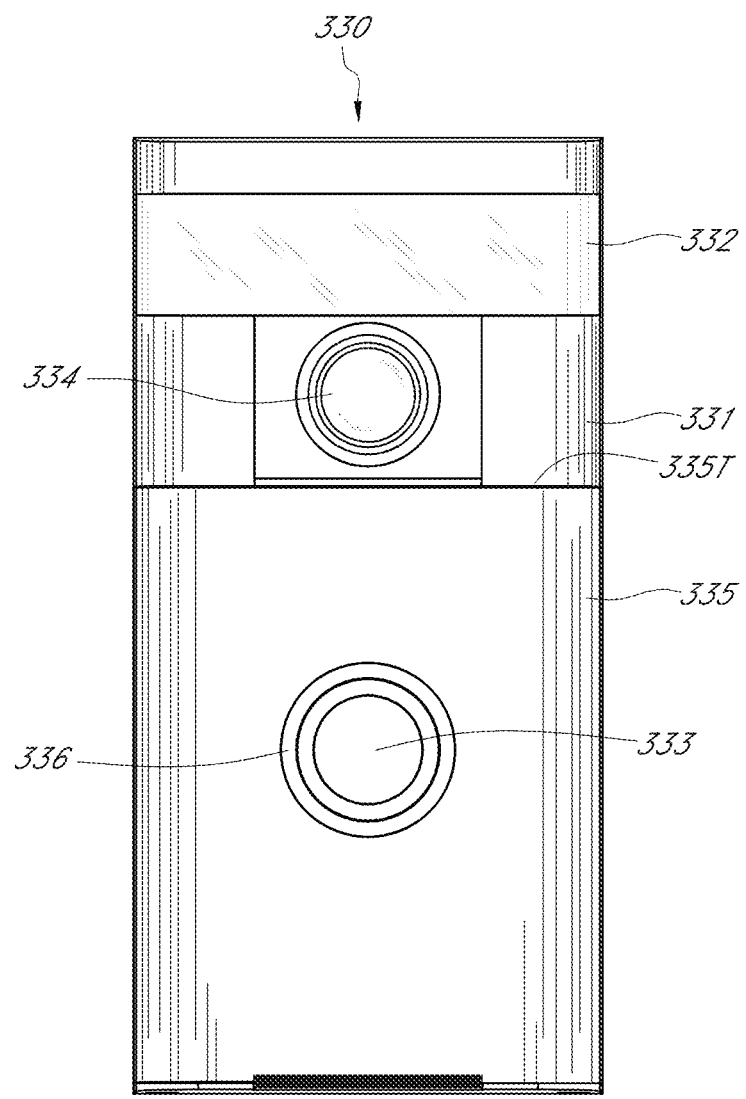
FIG. 14 is a front view of an A/V recording and communication device according to various aspects of the present disclosure.
Figure 15:
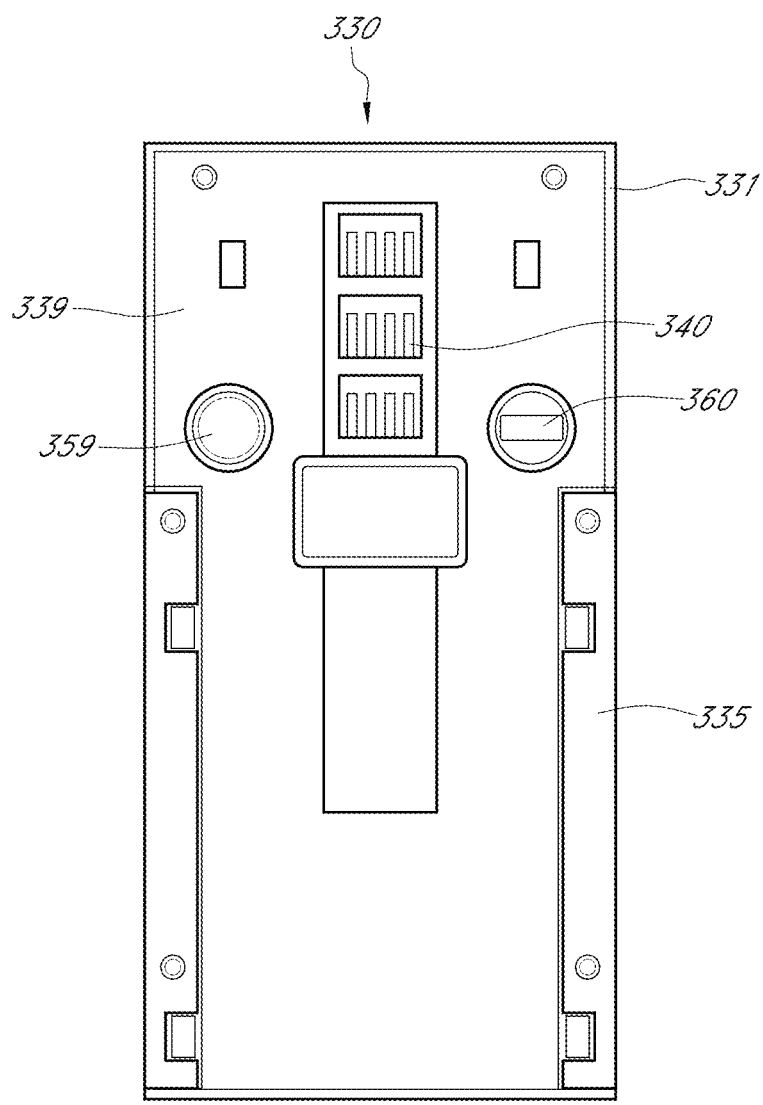
FIG. 15 is a rear view of the A/V recording and communication device of FIG. 14.
Figure 16:
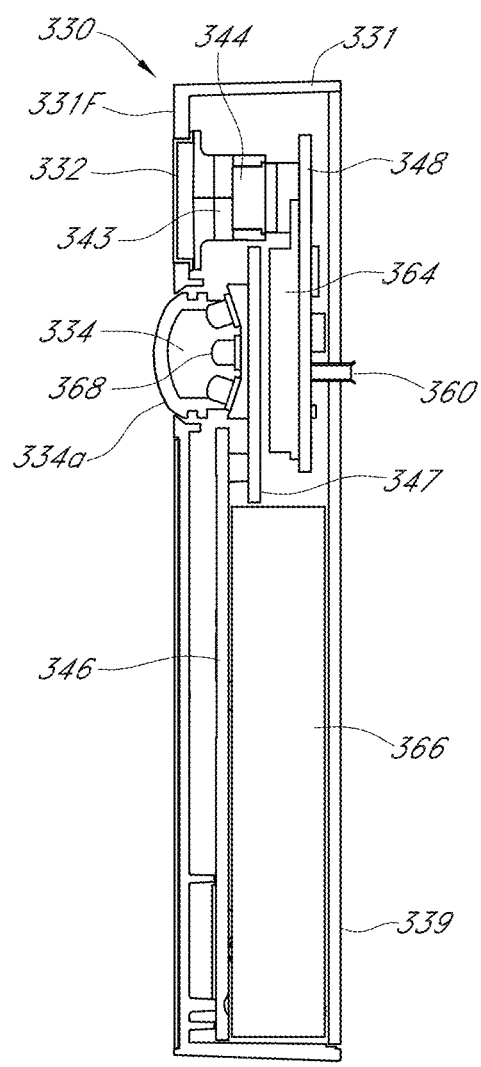
FIG. 16 is a right-side cross-sectional view of the A/V recording and communication device of FIG. 14.
Figure 17:
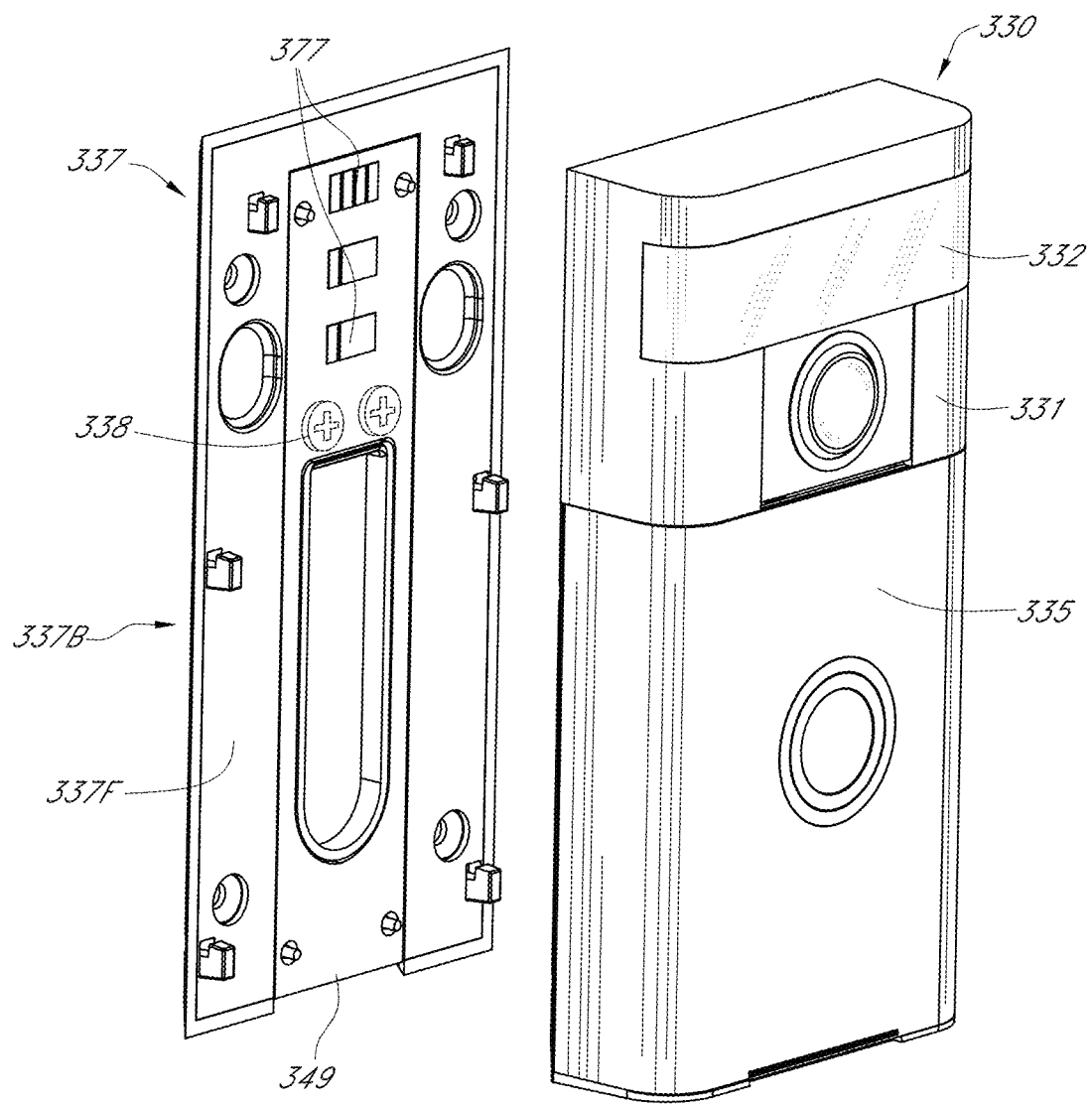
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some of the present embodiments the material of the enclosure 331 preferably permits infrared light to pass through from inside the doorbell 330 to the environment and vice versa. The doorbell 330 further includes a lens 332. In some of the present embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some of the present embodiments, the doorbell 330 may comprise three PIR sensors 344, as further described below, but in other embodiments any number of PIR sensors 344 may be provided. In some of the present embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
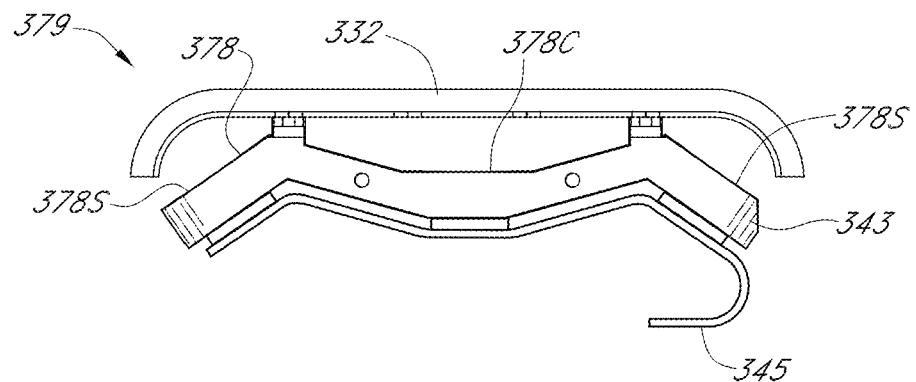
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
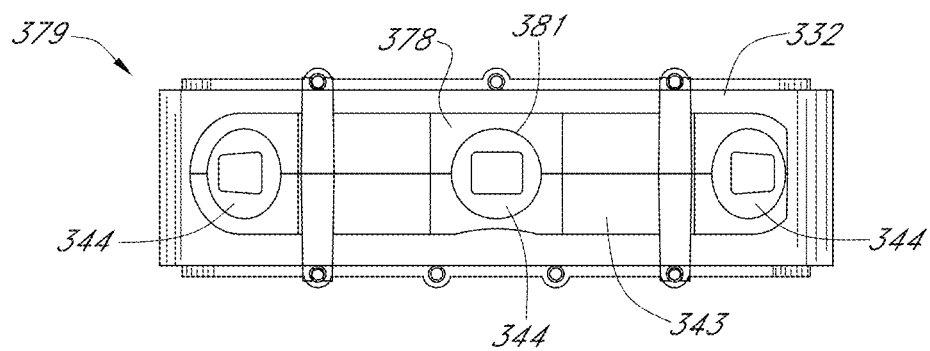
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
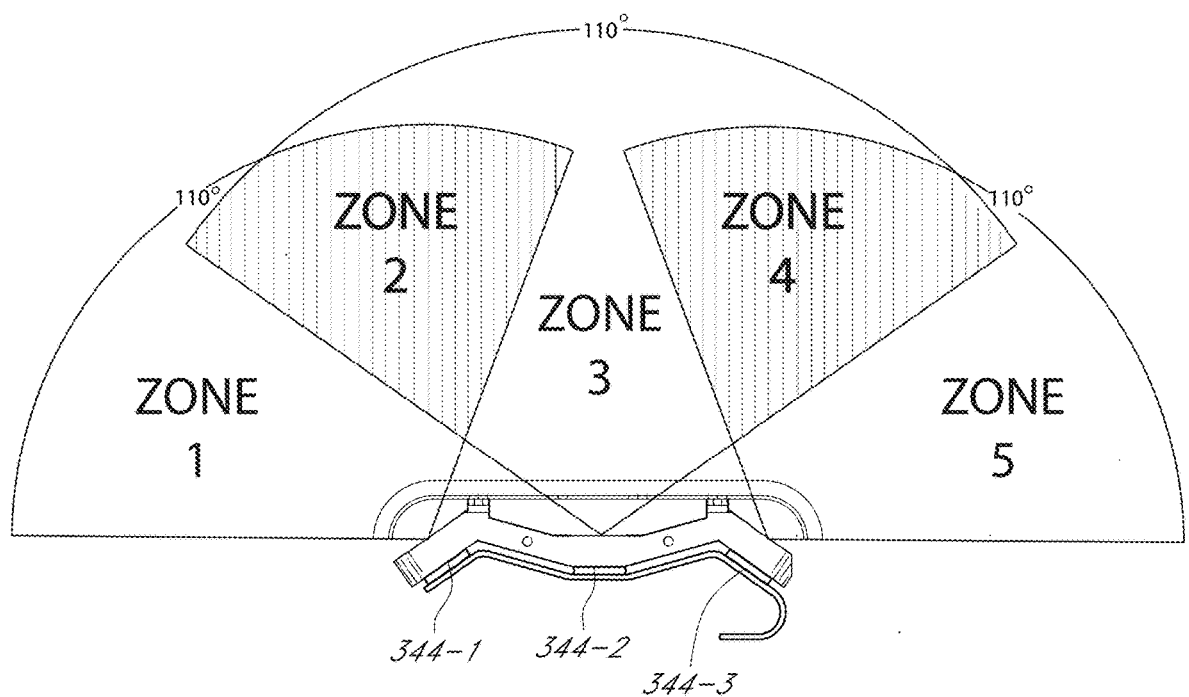
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some of the present embodiments, the doorbell 130 may be capable of determining the direction that an object is moving based upon which zones are triggered in a time sequence.

Figure 21:
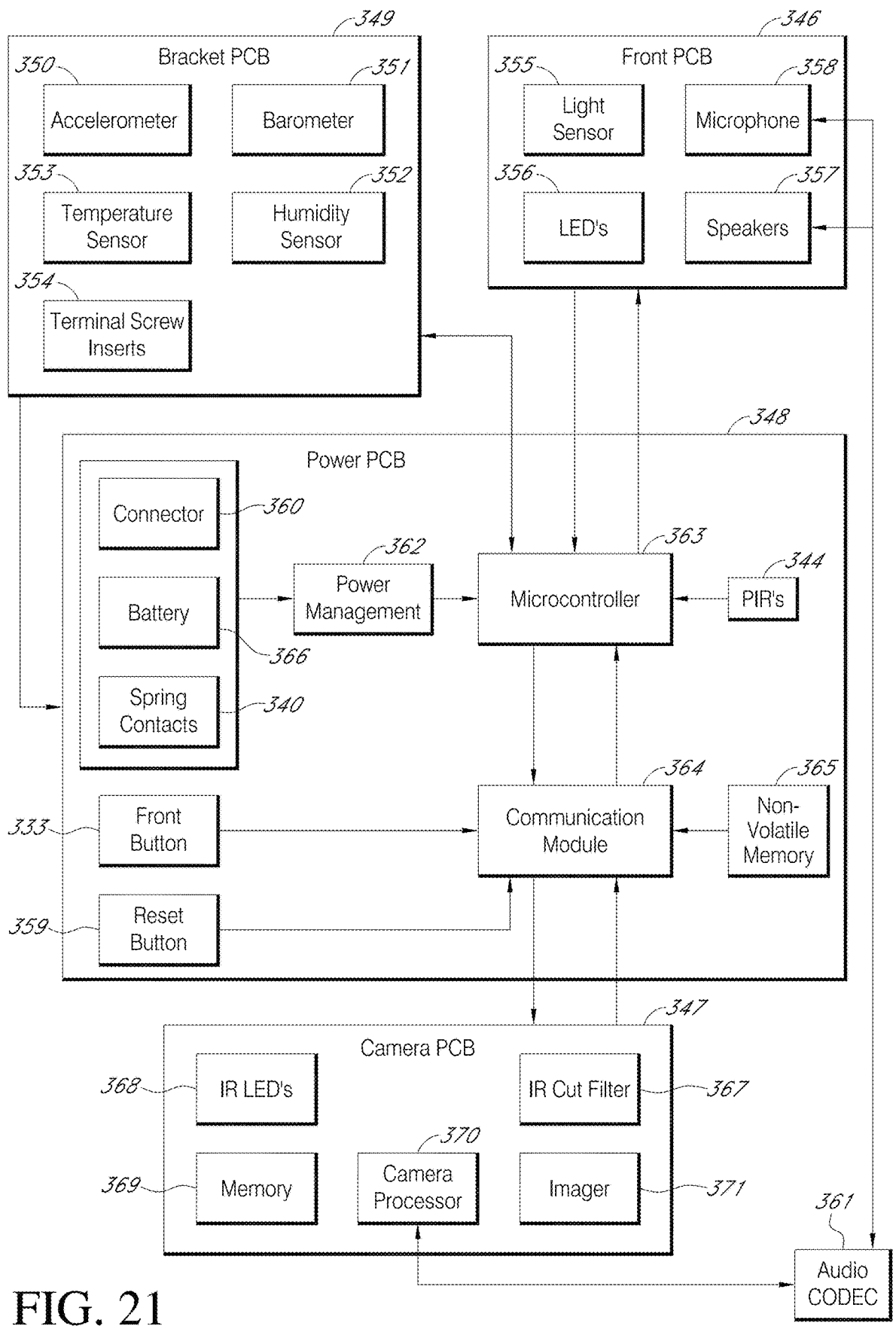
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some of the present embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the device 130, but without the front button 148, the button actuator 228, and/or the light pipe 232.

The present disclosure also provides numerous examples of methods and systems including A/V recording and communication devices that are powered by a connection to AC mains, but the present embodiments are equally applicable for A/V recording and communication devices that are battery powered. For example, the present embodiments may include an A/V recording and communication device such as those described in US Patent Application Publication Nos. 2015/0022620 (application Ser. No. 14/499,828) and 2015/0022618 (application Ser. No. 14/334,922), both of which are incorporated herein by reference in their entireties as if fully set forth.

As discussed above, parcel theft is an increasingly common problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves. The present embodiments provide these advantages and enhancements, as described below.

For example, some of the present embodiments deter parcel theft by receiving, by a processor of a client device, image data including a parcel recorded by a camera of an A/V recording and communication device in a field of view of the camera, displaying the image data on the display of the client device, receiving, by the processor based on the image data displayed on the display of the client device, an input including a first selection of a parcel boundary for monitoring the parcel within the parcel boundary, and a second selection of a monitoring action to be executed in response to the parcel being moved from within the parcel boundary, and generating and transmitting, by the processor based on the input, parcel monitoring rules to the A/V recording and communication device.

As another example, some of the present embodiments may deter parcel theft by receiving, by a processor of an A/V recording and communication device, from a client device associated with the A/V recording and communication device, parcel monitoring rules for monitoring a parcel in a field of view of the motion detector, the parcel monitoring rules including a parcel boundary for monitoring the parcel within the parcel boundary, and a monitoring action to be executed in response to the parcel being moved from within the parcel boundary, updating, by the processor based on the parcel monitoring rules, the motion detection rules to create updated motion detection rules, detecting, by the motion detector based on the updated motion detection rules, that the parcel has been moved from within the parcel boundary; and executing, by the processor in response to the detecting that the parcel has been moved from within the parcel boundary and based on the updated motion detection rules, the monitoring action.

Some of the present embodiments may comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII).

2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present AN recording and communication device 130 may include a computer vision module 163. The computer vision module 163 may include any of the components (e.g. hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Figure 22:
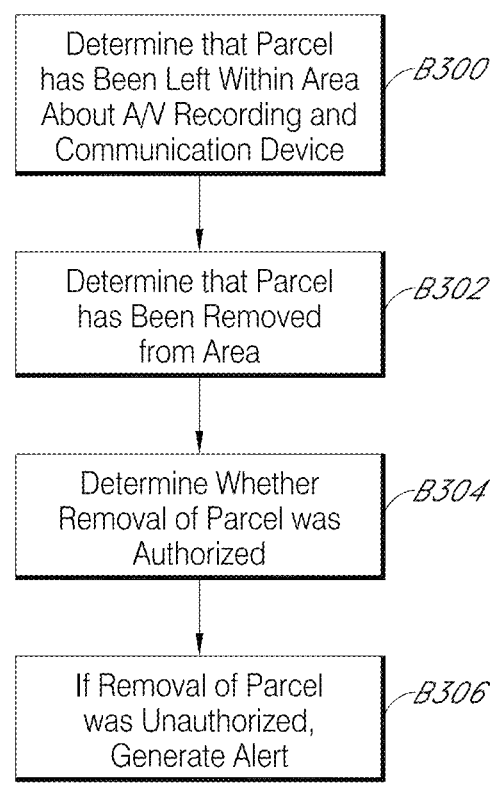
FIG. 22 is a flowchart illustrating an embodiment of a process for deterring parcel theft with an A/V recording and communication device according to various aspects of the present disclosure.

FIG. 22 illustrates an example embodiment of a process for deterring parcel theft with an A/V recording and communication device according to various aspects of the present disclosure. At block B300, the process determines that a parcel has been left within an area about an A/V recording and communication device, such as the A/V recording and communication device 130 described above, or the A/V recording and communication device 402 described below, for example. The present embodiments encompass any method of determining that a parcel has been left within an area about an A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been left within the area about the A/V recording and communication device 130 may comprise comparing video frames recorded by the camera 154 of the A/V recording and communication device 130, e.g. using computer vision. For example, before a parcel is left within the area about the A/V recording and communication device 130, the field of view of the camera 154 may remain largely static. Different objects may occasionally (or frequently) pass through the camera's field of view, such as people, animals, cars, etc., but these objects generally do not remain within the camera's field of view for very long (on the order of seconds) and, if they stop within the camera's field of view, they typically begin moving again soon after stopping. By contrast, when a parcel is left within the camera's field of view, it typically remains within the camera's field of view for a significant amount of time (on the order of minutes or hours), and the parcel typically remains motionless throughout the time that it remains within the camera's field of view (at least until someone picks it up and carries it away). Thus, comparing video frames from a time before a parcel is left within the camera's field of view with video frames from a time after the parcel is left within the camera's field of view may enable a reliable determination to be made as to whether an object that is present within the camera's field of view is a parcel or not.

The present embodiments contemplate numerous methodologies for determining whether an object that is present within the camera's field of view is a parcel or not. Any or all of these methodologies may include one or more aspects of computer vision. For example, in some of the present embodiments an object within the camera's field of view may be determined to be a parcel if the object is not present within the camera's field of view at a first time (in a first video frame), the object is present within the camera's field of view at a second time after the first time (in a second video frame), and the object remains within the camera's field of view for at least a threshold amount of time (e.g., 10 seconds, 30 seconds, or 60 seconds). Determining whether the object remains within the camera's field of view for at least the threshold amount of time may comprise review of one or more video frames that are recorded after the second video frame. In other embodiments, an object within the camera's field of view may be determined to be a parcel if the object is not present within the camera's field of view at a first time (in a first video frame), the object is present within the camera's field of view at a second time after the first time (in a second video frame), and the object remains motionless within the camera's field of view for at least a threshold amount of time. Determining whether the object remains motionless within the camera's field of view for at least the threshold amount of time may comprise review of one or more video frames that are recorded after the second video frame.

In other embodiments, an object within the camera's field of view may be determined to be a parcel if the object is not present within the camera's field of view at a first time (in a first video frame), a person is detected approaching the A/V recording and communication device 130 at a second time after the first time (in a second video frame), the person is detected moving away from the A/V recording and communication device 130 at a third time after the second time (in a third video frame), and the object is present within the camera's field of view at a fourth time after the third time (in a fourth video frame).

In other embodiments, an object within the camera's field of view may be determined to be a parcel if the object is not present within the camera's field of view at a first time (in a first video frame), a stationary vehicle (which may be a delivery vehicle, for example) is detected within the camera's field of view at a second time after the first time (in a second video frame), the object is present within the camera's field of view at a third time after the second time (in a third video frame), and the vehicle is no longer present within the camera's field of view at a fourth time after the third time (in a fourth video frame).

In other embodiments, an object within the camera's field of view may be determined to be a parcel if the object is not present within the camera's field of view at a first time (in a first video frame), the object is present within the camera's field of view at a second time after the first time (in a second video frame), and the object meets one or more criteria, such as having one or more physical characteristics. Examples of physical characteristics that may be examined to determine whether the object is a parcel include, without limitation, size, shape, color, and material (or materials). For example, if the object is made of cardboard and is brown or white (common colors for cardboard shipping boxes), it may be determined to be a parcel.

The present embodiments contemplate many processes for examining physical characteristics of the object and making a determination as to whether the object is a parcel. For example, some of the present embodiments may comprise gathering information about the object using computer vision, and then comparing the gathered information about the object to stored information about parcels to determine whether there is a match. For example, the present embodiments may include a database of parcels and/or physical characteristics of parcels. The database may include pictures of known parcels, and comparing the gathered information about the object to the stored information about parcels may comprise comparing a picture of the object to the pictures of known parcels. Gathering information about the object using computer vision may comprise using one or more cameras, scanners, imagers, etc. and/or one or more sensors, such as sonar. In some of the present embodiments, determining whether the object is a parcel may be based on the location of the object within the field of view of the camera. For example, if the A/V recording and communication device is located near a door, such as the front door, then a motionless object in close proximity to the A/V recording and communication device may be more likely to be a parcel. However, if the object is distant from the A/V recording and communication device, such as in the front yard, near the street, or in a garden, for example, the object may be less likely to be a parcel. As such, the determination of whether the object is a parcel may further include determining the location of the parcel in the field of view of the camera 444. In some of the present embodiments, the user of the client device (e.g., client device 404, 406 of FIG. 33) may be able to set parcel zone(s) during a setup process. The creation of the parcel zone(s) may be similar to that of the creation of the parcel boundary 475 described below (e.g., drawn on a display of the client device, automatically created based on the field of view of the A/V recording and communication device, etc.). In embodiments where parcel zone(s) are created, the A/V recording and communication device may first determine if the motionless object is within the parcel zone prior to determining, based on the methods disclosed herein, if the motionless object is a parcel.

With reference to FIG. 23, information received by the computer vision module 163 of the A/V recording and communication device 130 may be sent to one or more network devices, such as the server 118 and/or the backend API 120, in a computer vision query signal 310. The one or more network devices may then analyze the sent information and/or compare the sent information with other information in one or more databases to determine whether there is a match, for example in order to identify the parcel. In one example embodiment, comparing the sent information about the parcel with other information in one or more databases to determine whether there is a match may comprise comparing the sent information, such as one or more photos or images, about the parcel with photos and/or images of known parcels. If there is a match, then one or more actions may occur, such as the A/V recording and communication device 130 transitioning to a different operational mode. For example, the network device, such as the server 118 and/or the backend API 120, may send a computer vision response signal 312 to the A/V recording and communication device 130. The computer vision response signal 312 may include a command to the A/V recording and communication device 130 to change the operational mode of the A/V recording and communication device 130. For example, the command to the A/V recording and communication device 130 may cause the A/V recording and communication device 130 to transition to an "armed" mode in which the A/V recording and communication device 130 is configured to take one or more actions when the parcel is removed from the area about the A/V recording and communication device 130, as described below.

In another example embodiment, determining that the parcel has been left within the area about the A/V recording and communication device 130 may comprise receiving information from a carrier (e.g. the postal service, FedEx, UPS, etc.) that delivered the parcel. For example, when the parcel carrier delivers the parcel, or at some time after the parcel carrier has delivered the parcel, the carrier may update a delivery status of the parcel in the carrier's parcel tracking system to indicate that the parcel has been delivered. The carrier's parcel tracking system may then forward that information to one or more network devices, such as the server 118 and/or the backend API 120, which may then forward the information to the A/V recording and communication device 130.

In another example embodiment, determining that the parcel has been left within the area about the A/V recording and communication device 130 may comprise automatic identification and data capture (AIDC). For example, the parcel may include at least one of a barcode 320 (FIG. 24), a matrix code 322 (FIG. 25), a bokode 324 (FIG. 26), and a radio frequency identification (RFID) tag 326 (FIG. 27). AIDC refers to methods of automatically identifying objects, collecting data about them, and entering that data directly into computer systems (e.g. without human involvement). Technologies typically considered part of AIDC include barcodes, matrix codes, bokodes, RFID, biometrics (e.g. iris recognition, facial recognition, voice recognition, etc.), magnetic stripes, Optical Character Recognition (OCR), and smart cards. AIDC is also commonly referred to as "Automatic Identification," "Auto-ID," and "Automatic Data Capture."

AIDC encompasses obtaining external data, particularly through analysis of images and/or sounds. To capture data, a transducer may convert an image or a sound into a digital file. The file is then typically stored and analyzed by a computer, and/or compared with other files in a database, to verify identity and/or to provide authorization to enter a secured system. AIDC also refers to methods of recognizing objects, getting information about them, and entering that data or feeding it directly into computer systems without any human involvement. In biometric security systems, capture may refer to the acquisition of and/or the process of acquiring and identifying characteristics, such as finger images, palm images, facial images, or iris prints, which all may involve video data, or voice prints, which may involve audio data.

Figure 24:
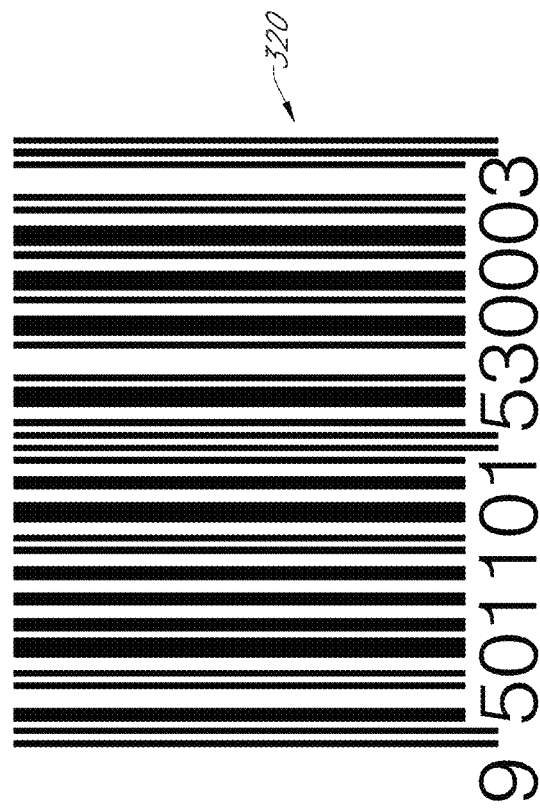
FIG. 24 is a front elevation view of a barcode.

A barcode, such as the example barcode 320 shown in FIG. 24, is an optical machine-readable representation of data relating to the object to which it is attached. Barcodes systematically represent data by varying the widths and spacings of parallel lines, and may be referred to as linear or one-dimensional (1D) barcodes.

Figure 25:
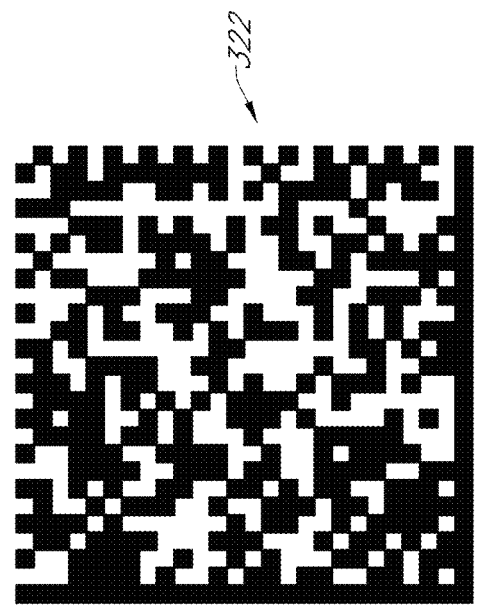
FIG. 25 is a front elevation view of a matrix code.

A matrix code, such as the example matrix code 322 shown in FIG. 25, is a two-dimensional matrix barcode consisting of black and white "cells" or modules arranged in either a square or rectangular pattern. The information encoded can be text and/or numeric data. Quick response (QR) codes and Data Matrix codes are specific types of matrix codes.

Figure 26:
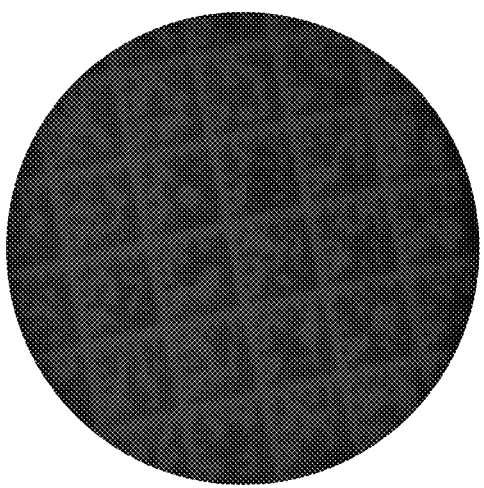
FIG. 26 is a front elevation view of a bokode.
Figure 27:
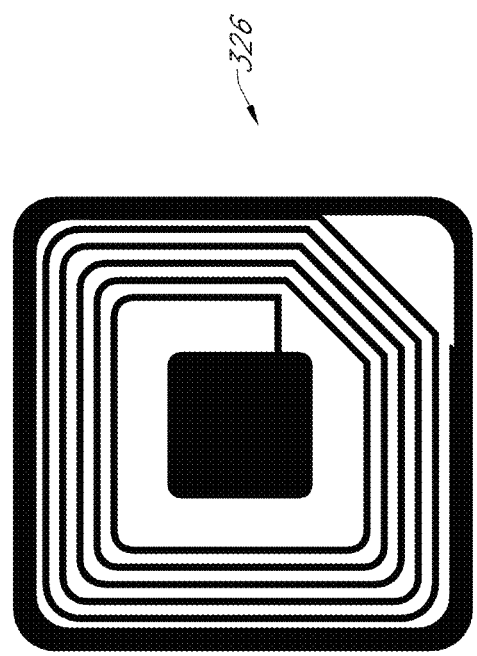
FIG. 27 is a front elevation view of a radio frequency identification (RFID) tag.

A bokode, such as the example bokode 324 shown in FIG. 26, is a type of data tag that holds much more information than a barcode over the same area. The bokode pattern is a tiled series of matrix codes. Bokodes may be circular, and may include an LED covered with a mask and a lens.

Radio-frequency identification (RFID) uses electromagnetic fields to automatically identify and track tags attached to objects. The tags, such as the example RFID tag 326 shown in FIG. 27, contain electronically stored information, and may be passive or active. Passive tags collect energy from a nearby RFID reader's interrogating radio waves. Active tags have a local power source, such as a battery, and may operate at hundreds of meters from the RFID reader. Unlike a barcode, the tag need not be within the line of sight of the reader, so it may be embedded in the tracked object.

The A/V recording and communication device 130 may capture information embedded in one of these types (or any other type) of AIDC technologies. For example, with reference to FIG. 3, the A/V recording and communication device 130 may include an AIDC module 165 operatively connected to the processor 160. The AIDC module 165 may include hardware and/or software configured for one or more types of AIDC, including, but not limited to, any of the types of AIDC described herein. For example, the AIDC module 165 may include an RFID reader (not shown), and the camera 154 of the A/V recording and communication device 130 may in some of the present embodiments be considered to be part of the AIDC module 165. For example, with respect to barcodes, matrix codes, and bokodes (or any other type code), the camera 154 of the A/V recording and communication device 130 may scan the code, and any information embedded therein. To facilitate scanning the code, the parcel carrier may hold the parcel up to the camera 154. With respect to RFID, the RFID reader of the AIDC module 165 may interrogate an RFID tag 326 on, or embedded in, the parcel. In some of the present embodiments, the processor 160 of the A/V recording and communication device 130 may be considered to be part of the AIDC module 165 and/or the processor 160 may operate in conjunction with the AIDC module 165 in various AIDC processes.

AIDC and computer vision have significant overlap, and use of either one of these terms herein should be construed as also encompassing the subject matter of the other one of these terms. For example, the computer vision module 163 and the AIDC module 165 may comprise overlapping hardware components and/or functionality. In some of the present embodiments, the computer vision module 163 and the AIDC module 165 may be combined into a single module.

The computer vision methods and AIDC methods described above may also be used in the processes described in FIGS. 36-41 below, in reference to the system 400. For example, in the process of FIG. 38, at block B318, computer vision and/or AIDC methods similar to those described above may be used to detect, by the motion detector (e.g., the camera 444) based on the updated motion detection rules 473, that the parcel has been moved from within the parcel boundary 475. Similarly, in the process of FIG. 39, at block B626, computer vision and/or AIDC methods similar to those described above may be used to analyze, by the processor 452, the image data 460 to determine whether the image data 460 includes a parcel. As another example, in the process of FIG. 41, at block B638, computer vision and/or AIDC methods similar to those described above may be used by the processor 502 of the backend server 430 to analyze the image data 460 to determine whether a parcel is present.

Figure 28:
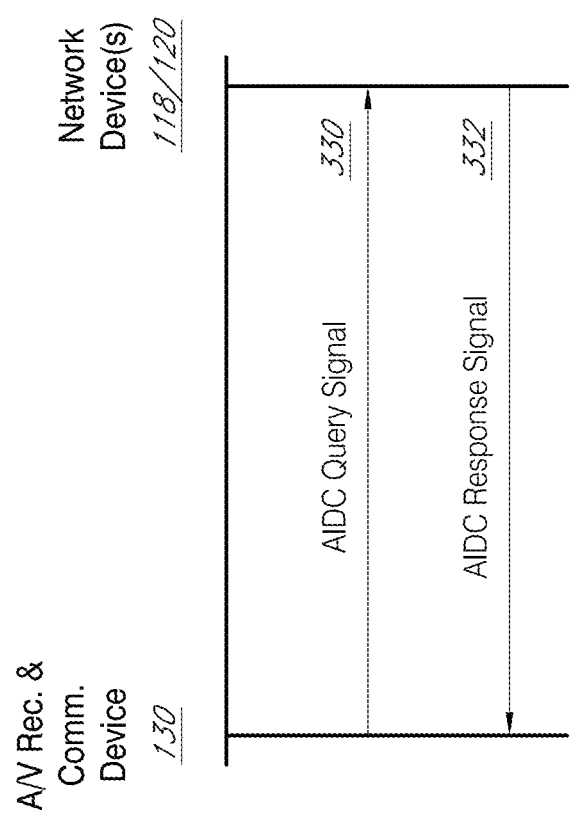
FIG. 28 is a sequence diagram illustrating an embodiment of a process for deterring parcel theft with an A/V recording and communication device according to various aspects of the present disclosure.

With reference to FIG. 28, information received by the AIDC module 165 of the A/V recording and communication device 130 from one or more codes or tags may be sent to one or more network devices, such as the server 118 and/or the backend API 120, in an AIDC query signal 330. The one or more network devices may then analyze the sent information and/or compare the sent information with other information in one or more codes databases to determine whether there is a match, for example in order to identify the parcel. If there is a match, then one or more actions may occur, such as the A/V recording and communication device 130 transitioning to a different operational mode. For example, the network device, such as the server 118 and/or the backend API 120, may send an AIDC response signal 332 to the A/V recording and communication device 130. The AIDC response signal 332 may include a command to the A/V recording and communication device 130 to change the operational mode of the A/V recording and communication device 130. For example, the command to the A/V recording and communication device 130 may cause the A/V recording and communication device 130 to transition to an "armed" mode in which the A/V recording and communication device 130 is configured to take one or more actions when the parcel is removed from the area about the A/V recording and communication device 130, as described below.

With further reference to FIG. 22, at block B302 the process determines that the parcel has been removed from the area about the A/V recording and communication device 130. The area about the A/V recording and communication device may be the entire area in the field of view of the A/V recording and communication device, a parcel zone as described above, or may specifically be a parcel boundary, such as the parcel boundary 475 described below. The present embodiments encompass any method of determining that a parcel has been removed from the area about an A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been removed from the area about the A/V recording and communication device 130 may comprise comparing video frames recorded by the camera 154 of the A/V recording and communication device 130. For example, after a parcel has been determined to have been left within the area about the A/V recording and communication device 130, the parcel is likely to remain motionless in the position where it was left. Thus, if the parcel is present within the camera's field of view at a first time (in a first video frame), and is no longer present within the camera's field of view at a second time after the first time (in a second video frame), then the parcel may be determined to have been removed from the area about the A/V recording and communication device 130. As described above, this determination may be made within the entire area about the A/V recording and communication device, or in a more defined area, such as within the parcel zone and/or the parcel boundary 475, for example.

In another example embodiment, determining that the parcel has been removed from the area about the A/V recording and communication device 130 may comprise AIDC. For example, if the parcel includes an RFID tag, then an RFID reader of the AIDC module 165 may detect that the RFID tag no longer responds to interrogation signals. In some of the present embodiments, if the RFID reader sends a threshold number of interrogation signals and receives no response from the RFID tag of the parcel, the process may determine that the parcel has been removed from the area about the A/V recording and communication device 130. In some of the present embodiments, the threshold number of interrogation signals with no response may be one interrogation signal, or two interrogation signals, or three interrogation signals, or any other number of interrogation signals. As described above, this determination may be made using AIDC within the entire area about the A/V recording and communication device, or in a more defined area, such as within the parcel zone and/or the parcel boundary 475, for example.

With further reference to FIG. 22, at block B304 the process determines whether removal of the parcel from the area about the A/V recording and communication device 130 was authorized. The present embodiments encompass any method of determining whether removal of the parcel from the area about the A/V recording and communication device 130 was authorized, and several examples are provided below. The present embodiments are not, however, limited to these examples, which are provided for illustration only. Any of the examples described below, as well as any of the present embodiments, may include one or more aspects of computer vision.

In one example embodiment, determining whether removal of the parcel from the area about the A/V recording and communication device 130 was authorized may comprise detecting (or tracking) a direction of movement of the parcel. For example, when a parcel is left outside the front entrance of a home, the homeowner (or other occupant) will typically pick up the parcel and bring it inside the home. A parcel thief, by contrast, will typically pick up the parcel and carry it away from the home. Thus, if the A/V recording and communication device 130 detects that the parcel is moving toward a structure to which the A/V recording and communication device 130 is secured (or with which the A/V recording and communication device 130 is associated), then the process may determine that the removal of the parcel from the area about the A/V recording and communication device 130 is authorized. But, if the A/V recording and communication device 130 detects that the parcel is moving away from the structure to which the A/V recording and communication device 130 is secured (or with which the A/V recording and communication device 130 is associated), then the process may determine that the removal of the parcel from the area about the A/V recording and communication device 130 is unauthorized. This determination may be similar to that of block B618 of the process of FIG. 38. For example, detecting, by the motion detector based on the updated motion detection rules 473, that the parcel has been moved from within the parcel boundary 475 may include detecting (or tracking) a direction of movement of the parcel.

In another example embodiment, determining whether removal of the parcel from the area about the A/V recording and communication device 130 was authorized may comprise AIDC and/or computer vision. For example, if an authorized person (e.g. the addressee of the parcel) removes the parcel from the area about the A/V recording and communication device 130, the A/V recording and communication device 130 may receive information from the authorized person. For example, the authorized person may present identification or credentials to the A/V recording and communication device 130. The camera 154 and/or the AIDC module 165 and/or the processor 160 of the A/V recording and communication device 130 may receive information from the identification or credentials for use in determining that the person removing the parcel from the area about the A/V recording and communication device 130 is an authorized person. If no identification or credentials are presented when the parcel is removed from the area about the A/V recording and communication device 130, or if identification or credentials are presented but they do not match an expected identification or credentials, then the process may determine that the person removing the parcel from the area about the A/V recording and communication device 130 is not an authorized person. In some of the present embodiments, the A/V recording and communication device 130 may provide a prompt, such as a voice prompt emitted through the speaker, requesting identification or credentials when a person is detected within the area about the A/V recording and communication device 130 and/or when the A/V recording and communication device 130 detects that the parcel has been moved or picked up.

Figure 29:
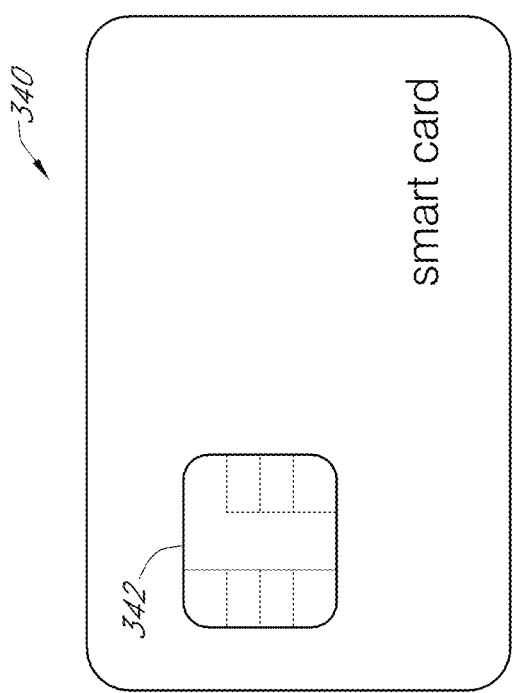
FIG. 29 is a front elevation view of a smart card.

Examples of identification or credentials that could be used in the foregoing processes include, without limitation, a card (or other carrier or substrate) bearing a barcode 320, or a matrix code 322, or a bokode 324, or an RFID tag 326, or an embedded integrated circuit (such as in a smart card, a chip card, or an integrated circuit card (ICC)), or a magnetic stripe. FIG. 29 illustrates an example of a smart card 340 including an embedded integrated circuit 342, and FIG. 30 illustrates an example of a card 344 including a magnetic stripe 346.

A smart card, chip card, or integrated circuit card (ICC), such as the example smart card 340 shown in FIG. 29, is any pocket-sized card that has one or more embedded integrated circuits. Smart cards may be either contact or contactless. Contact smart cards include a contact area comprising contact pads. These pads provide electrical connectivity when inserted into a reader, which serves as a communication medium between the smart card and a host (e.g., a computer, or a point of sale terminal). Contact smart cards do not contain batteries. Instead, power is supplied by the card reader. With contactless smart cards, the card communicates with and is powered by the reader through RF induction technology. These cards require only proximity to an antenna to communicate. Like contact smart cards with, contactless cards do not have an internal power source. Instead, they use an inductor to capture some of the incident radio-frequency interrogation signal, rectify it, and use it to power the card's electronics.

Figure 30:
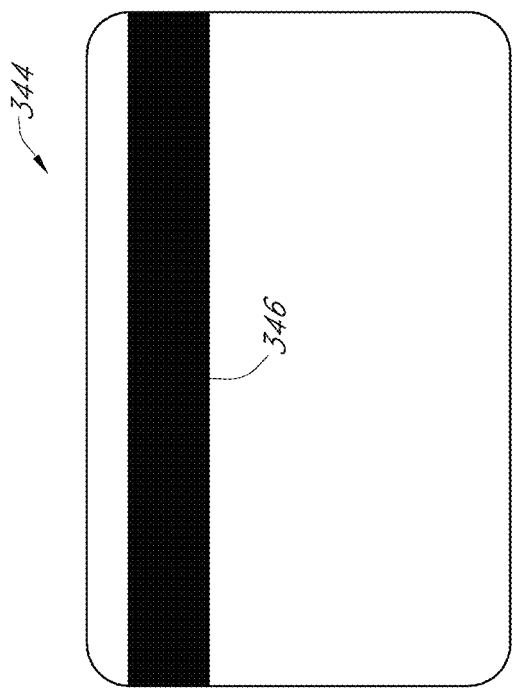
FIG. 30 is a rear elevation view of a magnetic stripe card.

A magnetic stripe card, such as the example card 344 shown in FIG. 30, is a type of card capable of storing data by modifying the magnetism of tiny iron-based magnetic particles on a band of magnetic material on the card. The magnetic stripe, sometimes called a magstripe, is read by swiping past a magnetic reading head.

Further examples of identification or credentials that could be used in the foregoing processes include, without limitation, a card (or other carrier or substrate) bearing text that can be received as input by the AIDC module 165 and/or the camera 154 and/or the processor 160 through optical character recognition (OCR). OCR is the mechanical or electronic conversion of images of typed, handwritten, or printed text into machine-encoded text.

Further examples of AIDC and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who removes the parcel from the area about the A/V recording and communication device 130. For example, the computer vision module 163, the AIDC module 165, and/or the camera 154 and/or the processor 160 may receive information about the person using any one, or any combination of more than one, of the foregoing biometrics.

Another aspect of determining whether removal of the parcel from the area about the A/V recording and communication device 130 was authorized may comprise comparing information received through the AIDC (and/or computer vision) to information about one or more persons. With reference to FIG. 28, information received by the AIDC module 165 (and/or the computer vision module 163) and/or the camera 154 and/or the processor 160 of the A/V recording and communication device 130 may be sent to one or more network devices, such as the server 118 and/or the backend API 120, in an AIDC query signal 330. The one or more network devices may then compare information in the AIDC query signal 330 about the person detected in the area about the A/V recording and communication device 130 with information from one or more sources. These information sources may include one or more databases and/or services. For example, a database and/or service may include a smart list of authorized persons. If a person who removed the parcel is on the smart list of authorized persons, then the removal of the parcel from the area about the A/V recording and communication device 130 may be determined to be authorized.

In some of the present embodiments, the information in the AIDC query signal 330 may be compared with information about one or more persons who are authorized to remove parcels from the area about the A/V recording and communication device 130. For example, biometric information (or other AIDC/computer vision information) about one or more authorized persons may be uploaded and stored at one or more databases and/or services accessible to the one or more network devices, such as the server 118 and/or the backend API 120. Comparison(s) between this information and the information in the AIDC query signal 330 may determine whether a person detected in the area about the A/V recording and communication device 130 is an authorized person or not. The comparison(s) may be performed by one or more network devices, such as the server 118 and/or the backend API 120, for example.

In other embodiments, the information in the AIDC query signal 330 may be compared with information about one or more persons who have been reported in connection with one or more crimes and/or suspicious events. In some of the present embodiments, the crime(s) and/or suspicious event(s) may have occurred within a defined radius of the A/V recording and communication device 130. For example, a first user of an A/V recording and communication device may view video footage that was recorded by his or her device and determine that the person or persons in the video footage are, or may be, engaged in suspicious activity and/or criminal activity. The first user may then share that video footage with one or more other people, such as other users of A/V recording and communication devices, and/or one or more organizations, including one or more law enforcement agencies. The present embodiments may leverage this shared video footage for use in comparing with the information in the AIDC query signal 330 to determine whether a person detected in the area about the A/V recording and communication device 130 is the same person that was the subject of (and/or depicted in) the shared video footage. If a person detected in the area about the A/V recording and communication device 130 is the same person that was reported in connection with one or more crimes and/or suspicious events, then that person is probably not a person who is authorized to remove parcels from the area about the A/V recording and communication device 130. In some of the present embodiments, the person (or persons) depicted in the shared video footage may be a perpetrator(s) of one or more parcel thefts. Further, those parcel thefts may have occurred within a defined radius about the A/V recording and communication device 130. Further description of sharing video footage from A/V recording and communication devices is provided in U.S. patent application Ser. Nos. 62/288,971 (filed on Jan. 29, 2016 and entitled "SHARING VIDEO FOOTAGE FROM WIRELESS AUDIO/VIDEO RECORDING AND COMMUNICATION DEVICES") and 62/300,547 (filed on Feb. 26, 2016 and entitled "SHARING VIDEO FOOTAGE FROM WIRELESS AUDIO/VIDEO RECORDING AND COMMUNICATION DEVICES"), both of which are incorporated herein by reference in their entireties as if fully set forth.

In another example embodiment, AIDC and/or computer vision may comprise the camera 154 of the A/V recording and communication device 130 capturing an image of a person in the area about the A/V recording and communication device 130. The image of the person may comprise an image of the person's face. The image of the person's face may be compared with image(s) of the face(s) of at least one other person. In some of the present embodiments, the at least one other person may be a person or persons who were reported in connection with suspicious activity and/or criminal activity, such as parcel theft. The comparison(s) may be performed by one or more network devices, such as the server 118 and/or the backend API 120. If a match is found between the image of the person's face captured by the camera 154 of the A/V recording and communication device 130 and the at least one image of the face(s) of at least one other person, then the process may determine that removal of the parcel from the area about the A/V recording and communication device 130 was unauthorized. The process may then generate an alert, which may comprise any or all of the alert types described herein.

With further reference to FIG. 28, the network device, such as the server 118 and/or the backend API 120, may send an AIDC response signal 332 to the A/V recording and communication device 130. In some of the present embodiments, the AIDC response signal 332 may be sent after a comparison has been made between the information in the AIDC query signal 330 and the information about one or more persons who are authorized to remove parcels from the area about A/V recording and communication device 130 and/or the information about one or more persons who have been reported in connection with one or more crimes and/or suspicious events. The AIDC response signal 332 may comprise an indicator (and/or information) about whether a person detected in the area about the A/V recording and communication device 130 is authorized to remove parcels from that area or not.

With further reference to FIG. 22, at block B306, when the removal of the parcel from the area about the A/V recording and communication device 130 is determined to have been unauthorized, the process may generate an alert. In some of the present embodiments, the alert may comprise an alert signal sent to a client device. For example, the alert may be similar to, or the same as, the process described above with respect to block B268 of FIG. 2, in which audio and/or video data is transmitted (streamed) from the A/V recording and communication device 130 to the user's client device 114 via the user's network 110 and the network 112. The streaming video may include images of the person(s) who was/were determined to have been unauthorized. The user can then determine whether to take further action, such as alerting law enforcement and/or sharing the video footage with other people, such as via social media.

In some of the present embodiments, the alert may comprise an audible alarm emitted from the speaker 152 of the A/V recording and communication device 130. The audible alarm may be any loud noise likely to attract attention and/or startle the unauthorized person, making it more likely that he or she will flee without absconding with the parcel(s). In some of the present embodiments, the alert may comprise an announcement emitted from the speaker 152 of the A/V recording and communication device 130. The announcement may comprise a verbal warning that the area about the A/V recording and communication device 130 is being recorded. The unauthorized person, upon being informed that the area about the A/V recording and communication device 130 is being recorded, may decide to flee the scene without absconding with the parcel(s). In some of the present embodiments, the alert may comprise both an audible alarm and an announcement in combination. Also in some of the present embodiments, the alert may comprise any combination of an alert signal sent to a client device, an audible alarm emitted from the speaker 152 of the A/V recording and communication device 130, and an announcement emitted from the speaker 152 of the A/V recording and communication device 130.

In some of the present embodiments, the alert may be similar to that of the user alert 472 described below. In the alternative, the user alert 472 described below may be similar to the alert described above in some of the present embodiments.

Some of the present embodiments may comprise identifying a parcel within the area about the A/V recording and communication device 130. In some of the present embodiments, identifying the parcel may comprise the camera 154 of the A/V recording and communication device 130 capturing an image of an identifying mark on the parcel. In various embodiments, the identifying mark may be, for example, a company logo or other identifying symbol. The identifying mark on the parcel may be compared with a plurality of identifying marks in a database. If a match is found, the parcel may be identified as originating with the sender associated with the matching identifying mark. In other embodiments, the identifying mark may be, for example, a barcode, a matrix code, a bokode, etc. In some of the present embodiments, RFID (or other similar technology) may be used to identify a parcel.

Figure 31:
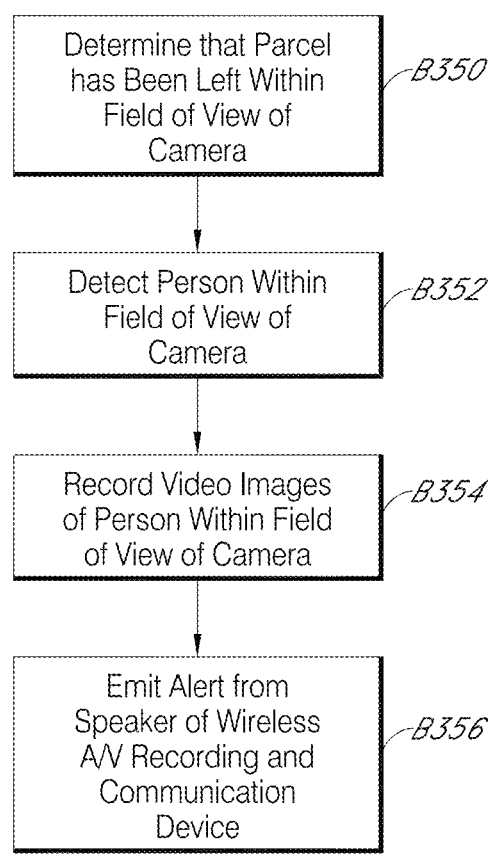
FIGS. 31 and 32 are flowcharts illustrating embodiments of processes for deterring parcel theft with an A/V recording and communication device according to various aspects of the present disclosure.

FIG. 31 illustrates an example embodiment of a process for deterring parcel theft with an A/V recording and communication device according to various aspects of the present disclosure. At block B350, the process may determine that a parcel has been left within an area about an A/V recording and communication device, such as the A/V recording and communication device 130 described above. The present embodiments encompass any method of determining that a parcel has been left within an area about an A/V recording and communication device, including any of the examples described above. The present embodiments are not, however, limited to these examples, which are provided for illustration only.

With further reference to FIG. 31, at block B352, after the parcel has been left within the area about the A/V recording and communication device 130, the process may detect a person within the area about the A/V recording and communication device 130. The detection of the person within the area about the A/V recording and communication device 130 may be according to any of the processes described herein, such as, for example, comparing video frames recorded by the camera 154 of the A/V recording and communication device 130.

With further reference to FIG. 31, at block B354 the process may record, with the camera 154 of the A/V recording and communication device 130, video images of the person within the area about the A/V recording and communication device 130. At block B356, the process may emit an alert from the speaker 152 of the A/V recording and communication device 130. The alert may comprise an audible alarm and/or an announcement, similar to the example embodiments described above.

In some of the present embodiments, the processes described above, including the processes described with reference to FIGS. 14 and 23, may be performed automatically when a parcel is detected within the area about the A/V recording and communication device 130. In other embodiments, processes similar to those described above may only be performed in response to a user command. For example, one aspect of the present embodiments may provide an option to a user for enabling and/or disabling a parcel protection feature or mode. An option to enable/disable the parcel protection mode may be presented to the user, for example, through a graphical user interface (GUI) of an application executing on the user's client device 114. The GUI may also provide other options (e.g., receiving motion alerts, etc.), in addition to the parcel protection mode, for the user to select or unselect (e.g., to enable or disable).

In one example embodiment, the user may manually enable parcel protection mode in response to a notification that a parcel has been delivered. For example, with reference to FIG. 32, at block B360 the user may receive a notification that a parcel has been delivered (e.g., left within the field of view of the camera 154). The notification may be received in several different ways. For example, the parcel carrier may press the front button 148 of the A/V recording and communication device 130, thereby initiating a call to the user's client device 114. The user may answer the call and speak to the parcel carrier, who may inform the user that his or her parcel has been delivered and left in the area about the A/V recording and communication device 130. In another example, the call to the user's client device 114 may be initiated automatically by the A/V recording and communication device 130 in response to detecting the presence of the parcel carrier, such as by using the camera 154 for motion detection and/or a separate motion sensor. The user may then view live streaming video of the parcel delivery event (or subsequently view recorded video of the parcel delivery event) and thereby be informed of the parcel delivery without actually speaking to the parcel carrier. In yet another example, the A/V recording and communication device 130 may detect the delivery of the parcel, for example using any of the techniques described herein, and may then send a notification to the user's client device 114, for example in the form of an alert (e.g., a push notification).

Figure 32:
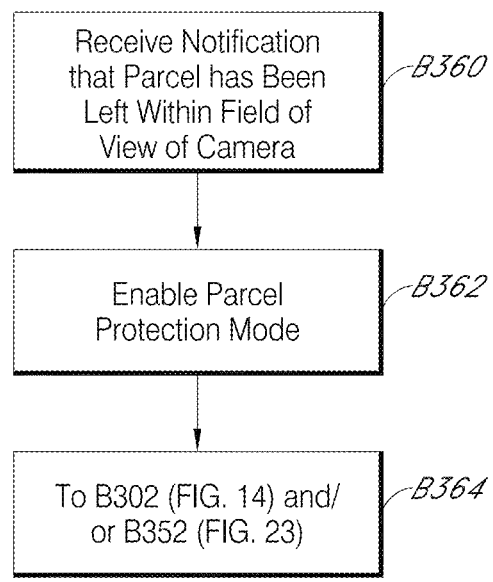

Regardless of the form of notification, and with further reference to FIG. 32, at block B362 the user may manually enable parcel protection mode, such as, for example, using an application executing on the user's client device 114, as described above. In some of the present embodiments, the option to enable parcel protection mode may be presented to the user in conjunction with the notification sent to the user's client device 114, for example in the form of an alert (e.g., a push notification). If the user enables parcel protection mode, then at block B364 the process of FIG. 32 advances to block B302 of FIG. 22 and/or block B352 of FIG. 31. In some of the present embodiments, however, if the user declines to enable parcel protection mode, then parcel protection mode may remain inactive, and the operations shown in blocks B302-B306 of FIG. 22 and blocks B362-B366 of FIG. 31 would not be performed.

As described above, a user may disable the parcel protection mode manually in the same manner that the user enables this feature/mode (e.g., through a GUI of an application that is associated with the A/V recording and communication device). Some of the present embodiments may also disable the parcel protection mode automatically (e.g., without a user's intervention). Some such embodiments may disable the parcel protection mode when a parcel is removed from an area about an A/V recording and communication device by an authorized person (e.g., the homeowner, a friend or family member of the homeowner, or any other person authorized by the homeowner). Different embodiments may realize that a parcel is removed (e.g., from the field of view of a camera of an A/V recording and communication device) by an authorized person through different methods. Some aspects of the present embodiments may verify a person as an authorized person by authenticating the person's biometrics. As an example, one aspect of the present embodiments identifies the person's face (e.g., by performing a face recognition process, as described above) and compares the identification data with one or more databases that contain authorized persons' identification data.

Some of the present embodiments may disable a parcel protection mode when these embodiments determine that an authorized user is at, or within a threshold vicinity of, the location of the parcel. Some of the present embodiments make such a determination by comparing a current location of the authorized user (e.g., by locating a client device that the user carries) and the location of the parcel. Some other embodiments may determine that a parcel is picked up by an authorized person when the parcel moves in a specific direction (e.g., toward the house instead of away from the house). Some of the present embodiments may realize that the parcel is being moved toward the house, e.g., by comparing a sequence of video images of the moving parcel captured by a camera of the A/V recording and communication device. Some other embodiments may use an AIDC module (e.g., an RFID reader) of the A/V recording and communication device to determine the direction of movement of a parcel (e.g., when the parcel includes a barcode, a matrix code, an RFID tag, etc.).

In any of the present embodiments, various aspects of methods may be performed locally, e.g. by one or more components of the A/V recording and communication device 130, and/or remotely, e.g. by one or more network devices, such as the server 118 and/or the backend API 120, for example. For example, the processor 160 of the A/V recording and communication device 130 may perform various aspects such as, but not limited to, comparing video frames recorded by the camera 154 of the A/V recording and communication device 130 to determine whether a parcel has been left within the area about the A/V recording and communication device 130 and/or that the parcel has been removed from the area about the A/V recording and communication device 130.

Many of the present embodiments have been described with reference to persons detected by, or present in the area about, the A/V recording and communication device 130. The present embodiments are not limited, however, to scenarios involving humans. For example, the present embodiments contemplate that a parcel thief need not be a human. A parcel theft bot or drone, for example, may be encompassed by any of the present embodiments. For example, in a process similar to any process described herein, after a parcel has been left within the area about the A/V recording and communication device 130, the process may detect a parcel theft bot or drone within the area about the A/V recording and communication device 130. The process may also record, with the camera 154 of the A/V recording and communication device 130, video images of the parcel theft bot or drone within the area about the A/V recording and communication device 130.

Any of the present embodiments may comprise a designated parcel delivery area. For example, a user may designate a particular area about the A/V recording and communication device 130 as a parcel delivery area. The parcel delivery area may be demarcated in any suitable manner, such as with markings and/or text provided on the pavement and/or adjacent wall(s). Processes of determining whether a parcel has been left within the area about the A/V recording and communication device 130 and/or determining whether the parcel has been removed from the area about the A/V recording and communication device 130 may comprise determining whether an object has been left within and/or removed from the designated parcel delivery area. The user may, in some of the present embodiments, direct or aim the camera 154 of the A/V recording and communication device 130 toward the designated parcel delivery area to facilitate determining whether an object has been left within and/or removed from the designated parcel delivery area.

Figure 33:
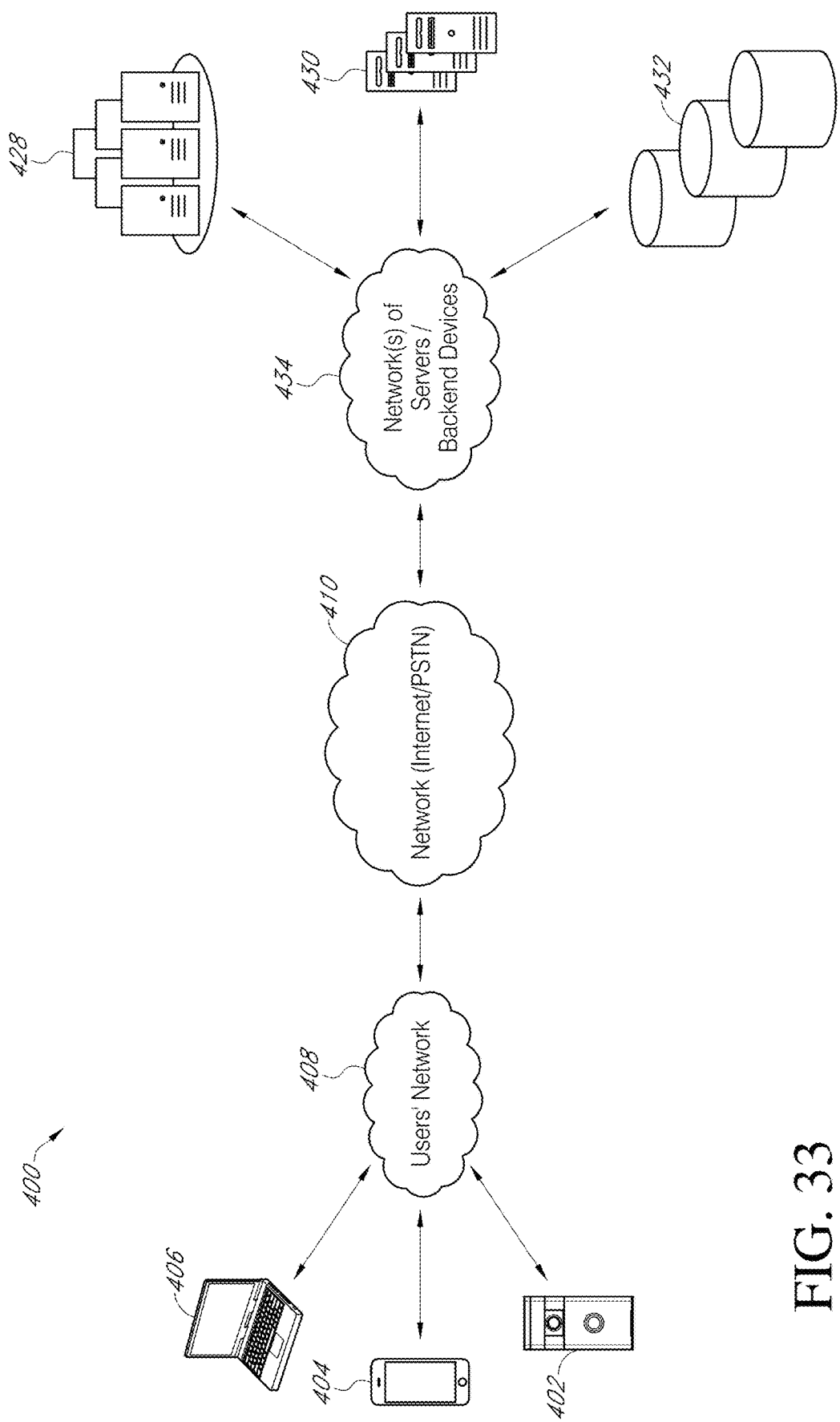
FIG. 33 is a functional block diagram illustrating a system for deterring parcel theft using an A/V recording and communication device according to the present embodiments.

FIG. 33 is a functional block diagram illustrating a system 400 for deterring parcel theft using an A/V recording and communication device according to various aspects of the present disclosure. The system 400 may include one or more audio/video (A/V) recording and communication devices 402 configured to access a user's network 408 to connect to a network (Internet/PSTN) 410. The one or more A/V recording and communication devices 402 may include any or all of the components and/or functionality of the A/V recording and communication device 100 (FIGS. 1-2), the A/V recording and communication doorbell 130 (FIGS. 3-13), and/or the A/V recording and communication doorbell 330 (FIGS. 14-21). As discussed herein, the present disclosure provides numerous examples of methods and systems including A/V recording and communication devices 402, such as A/V recording and communication doorbells, but the present embodiments are equally applicable for A/V recording and communication devices 402 other than doorbells. For example, the present embodiments may include one or more A/V recording and communication security cameras and/or A/V recording and communication security floodlights instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

The user's network 408 may include any or all of the components and/or functionality of the user's network 110 described herein. The system 400 may also include one or more client devices 404, 406, which in various embodiments may be configured to be in network communication and/or associated with the A/V recording and communication device 402. The client devices 404, 406 may comprise, for example, a mobile phone such as a smartphone, or a computing device such as a tablet computer, a laptop computer, a desktop computer, etc. The client devices 404, 406 may include any or all of the components and/or functionality of the client device 114 and/or the client device 800 described herein. In some of the present embodiments, the client devices 404, 406 may not be associated with the A/V recording and communication device 402. In other words, the user/owner of the client device(s) 404, 406 may not also use/own a A/V recording and communication device 402.

With further reference to FIG. 33, the system 400 may also include various backend devices such as (but not limited to) storage devices 432, backend servers 430, and backend APIs 428 that may be in network communication with the A/V recording and communication device 402 and/or client device 404, 406. In some of the present embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some of the present embodiments, the backend servers 430 and backend APIs 428 may be similar in structure and/or function to the server 118 and the backend API 120 (FIG. 1), respectively.

Figure 34:
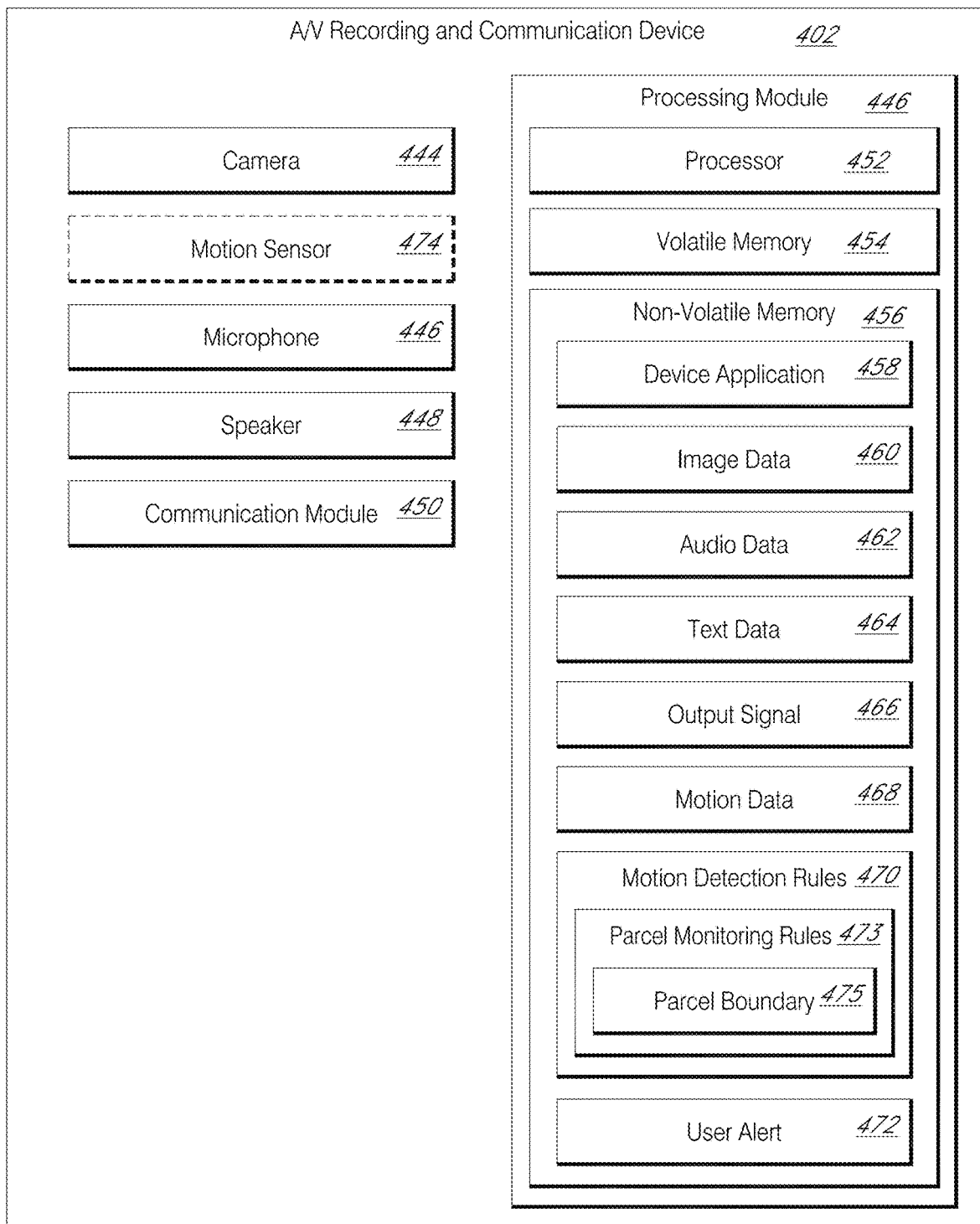
FIG. 34 is a functional block diagram of an A/V recording and communication device on which the present embodiments may be implemented according to various aspects of the present disclosure.

FIG. 34 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 468 using at least one of the camera 444 or the motion sensor 474. In some of the present embodiments, the device application 458 may also configure the processor 452 to generate text data 464 describing the image data 460, such as in the form of metadata, for example. In other embodiments, the text data 464 describing the image data 460 may be generated by a user using the client device 404, 406 associated with the A/V recording and communication device 402. In addition, the device application 458 may configure the processor 452 to transmit the image data 460, the audio data 462, the motion data 468 and/or the text data 464 to the client device 404, 406 using the communication module 450. In various embodiments, the device application 458 may also configure the processor 452 to generate and transmit an output signal 466 that may include the image data 460, the audio data 462, the text data 464 and/or the motion data 468. In some of the present embodiments, the output signal 466 may be transmitted to a backend device, such as the backend server(s) 430, using the communication module 450, and the backend devices may transfer the output signal 466 to the client device 404, 406. In other embodiments, the output signal 466 may be transmitted directly to the client device 404, 406.

In further reference to FIG. 34, the image data 460 may comprise image sensor data such as (but not limited to) exposure values and data regarding pixel values for a particular sized grid. Further, the image data 460 may comprise converted image sensor data for standard image file formats such as (but not limited to) JPEG, JPEG 2000, TIFF, BMP, or PNG. In addition, the image data 460 may also comprise data related to video, where such data may include (but is not limited to) image sequences, frame rates, and the like. Moreover, the image data 460 may include data that is analog, digital, compressed, uncompressed, and/or in vector formats.

In some of the present embodiments, the image data 460 may also include facial recognition, facial detection, biometric recognition, object recognition, object detection, AIDC, and/or other information about the persons and/or objects in the image data 460. The facial recognition, facial detection, biometric recognition, object recognition, object detection, AIDC, and/or other information may be generated in response to using facial recognition software, facial detection software, object recognition, object detection, and/or biometric analysis software, for example, as described above. The facial recognition, facial detection, biometric recognition, object recognition, object detection, AIDC, and/or other information may be included in the image data 460 for analysis in some of the present embodiments.

The image data 460 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 34, the motion data 468 may comprise data generated by a motion detector having motion detection rules 470. The motion detector may be the motion sensor 474 and/or the camera 444, depending on the specific embodiment. For example, in embodiments that use motion sensors 474 such as PIRs, the motion data 468 may include voltage data generated by the motion sensor 474 in response to the presence of infrared radiation. In some of the present embodiments, the motion data 468 may also comprise time-based and/or location-based information such as the amount of time a motion event is detected and/or the location of the motion event in the field of view of the motion sensor 474 and/or the field of view of the camera 444 (e.g., Zones 1-5 (FIG. 20), the location within one of the Zones 1-5, and/or the proximity to the A/V recording and communication device 402). Dependent on the type of motion sensor 474 implemented in a given embodiment, the motion data 468 may include the data type (e.g., voltage) generated specific to the type of motion sensor 474 (e.g., PIR, microwave, acoustic, etc.). The motion sensor 474 of FIG. 34 is illustrated with dashed lines to indicate that the motion sensor 474 may not be a feature of the A/V recording and communication device 402 and/or may not be used in certain embodiments (e.g., the A/V recording and communication doorbell 130 of FIG. 3-13).

In embodiments where the A/V recording and communication device 402 is similar to that of the A/V recording and communication doorbell 130 of FIGS. 3-13, the motion data 468 may be generated solely by the camera 444. As such, the detection of a motion event, the determination of whether a motion event is caused by the movement of a person and/or object in a field of view of the A/V recording and communication device 402, and/or the speed and/or location of a person and/or object in the field of view of the A/V recording and communication device 402 may be determined using the motion data 468 generated by the camera 444, for example.

The motion data 468 may further include an estimated speed and/or direction data of the person and/or object that caused the motion event. For example, the motion data 468 may include an estimated speed of a person and/or object (e.g., a parcel) passing in a field of view of the motion sensor 474 and/or the camera 444. For another example, the motion data 468 may include a direction that a person and/or object in front of the motion sensor 474 and/or camera 444 is traveling, such as toward or away from the A/V recording and communication device 402 or from within the parcel boundary 475. As described above, the direction of the movement of the parcel may be used in determining whether or not the removal of the parcel is authorized.

In some of the present embodiments, the motion data 468 may include information pertaining to a status of a parcel in the field of view of the motion detector (e.g., the camera 444 and/or the motion sensor 474). For example, the motion data 468 may include information about the movement of the parcel in the field of view of the motion detector, such as information of the parcel's movement within and from within the parcel boundary 475. As such, the motion detection rules 470 and/or the parcel monitoring rules 473 may include rules for generating the motion data 468 specific to the parcel and/or the parcel boundary 475. As a result, the motion data 468 may be different for each parcel that enters the field of view of the motion detector, as each parcel may have a unique parcel boundary 475, may be located in a unique location within the field of view of the motion detector, and/or may be a unique parcel shape and/or size, for example.

With further reference to FIG. 34, the motion detection rules 470 may include rules for generating motion data 468, analyzing motion data 468, and/or executing tasks and/or commands in response to the analysis of the motion data 468. The A/V recording and communication device 402 may have motion detection rules 470 specific to persons and/or objects.

In some of the present embodiments, the motion detection rules 470 may include parcel monitoring rules 473 for monitoring parcels in the field of view of the motion detector (e.g., the camera 444 and/or the motion sensor 474). The parcel monitoring rules 473 may include rules specific to the parcel boundary 475. For example, the parcel monitoring rules 473 may adjust the motion detection rules 470 within the parcel boundary 475, such as by increasing the sensitivity of the motion detector within the parcel boundary 475. As an example, in embodiments using the motion sensor 474, any movement within the parcel boundary 475 may trigger a user alert 472. As another example, less movement may be required for triggering a user alert 472 when the movement occurs within the parcel boundary 475 than when the movement occurs outside of the parcel boundary 475. As another example, in embodiments using the camera 444 as the motion detector, the amount of change (e.g., changed pixels) within the parcel boundary 475 between successive frames of the image data 460 required to trigger the monitoring action may be less than the amount of change required outside of the parcel boundary 475. For example, any change within the parcel boundary 475 may trigger a determination that the parcel is being moved from within the parcel boundary, and may trigger the monitoring action.

Figure 42:
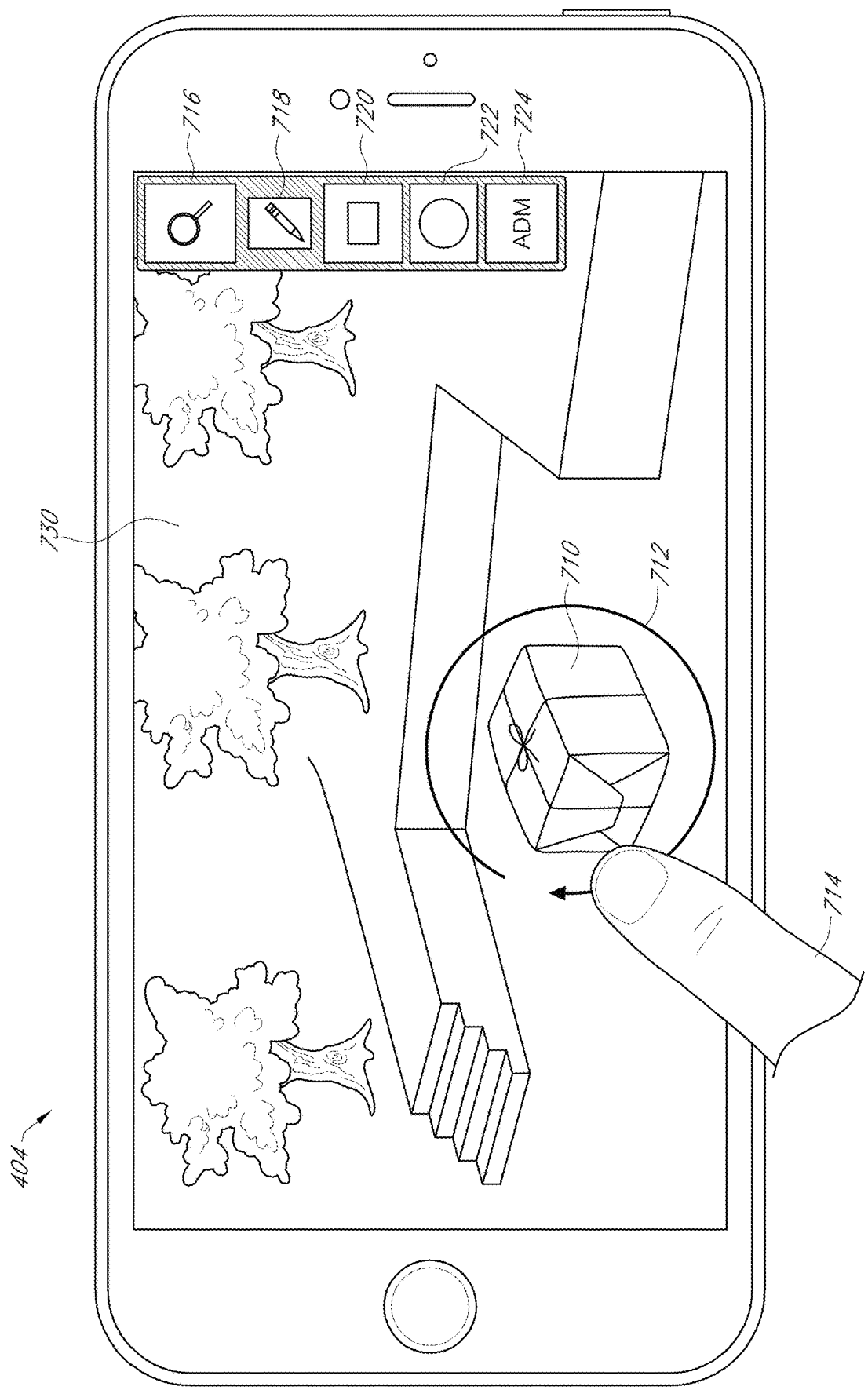
FIGS. 42-44 are example illustrations of graphical user interfaces (GUI) for creating parcel boundaries for deterring parcel theft with an A/V recording and communication device according to various aspects of the present disclosure.

The parcel boundary 475 may be an artificial boundary around a parcel in the image data 460. The parcel boundary 475 may be used in a "parcel protection mode," for example, as described above. In some of the present embodiments, the parcel boundary 475 may be created by the user, such as illustrated in FIG. 42. In FIG. 42, a parcel boundary 712 is created by a user using his or her finger 714 to draw the parcel boundary 712 around the parcel 710 on the display 730 of the client device 404. The user may first select the draw parcel boundary icon 718, and then proceed to draw the parcel boundary 712 on the display 730. In such an embodiment, the parcel boundary 712 may be any shape dictated by the shape drawn by the finger 714 of the user. In some of the present embodiments, when the user draws the parcel boundary 712, the parcel boundary 712 may be uneven, messy, and/or jagged, for example. In such embodiments, the parcel boundary 712 may be adjusted by the processor of the client device 404, 406 to conform to a more recognizable shape. For example, if the user draws a parcel boundary 712 resembling a circle, but uneven and messy, the parcel boundary may be updated to reflect a more conforming and/or seamless circle of similar size to the drawn parcel boundary 712. In some embodiments, the client device 404, 406 may not include a touchscreen. In such embodiments, the user may draw the parcel boundary 712 using any input device, rather than a finger 714. Non-limiting examples of input devices include a mouse, a trackball, a touchpad, a joystick, a pointing stick, a stylus, etc.

Figure 43:
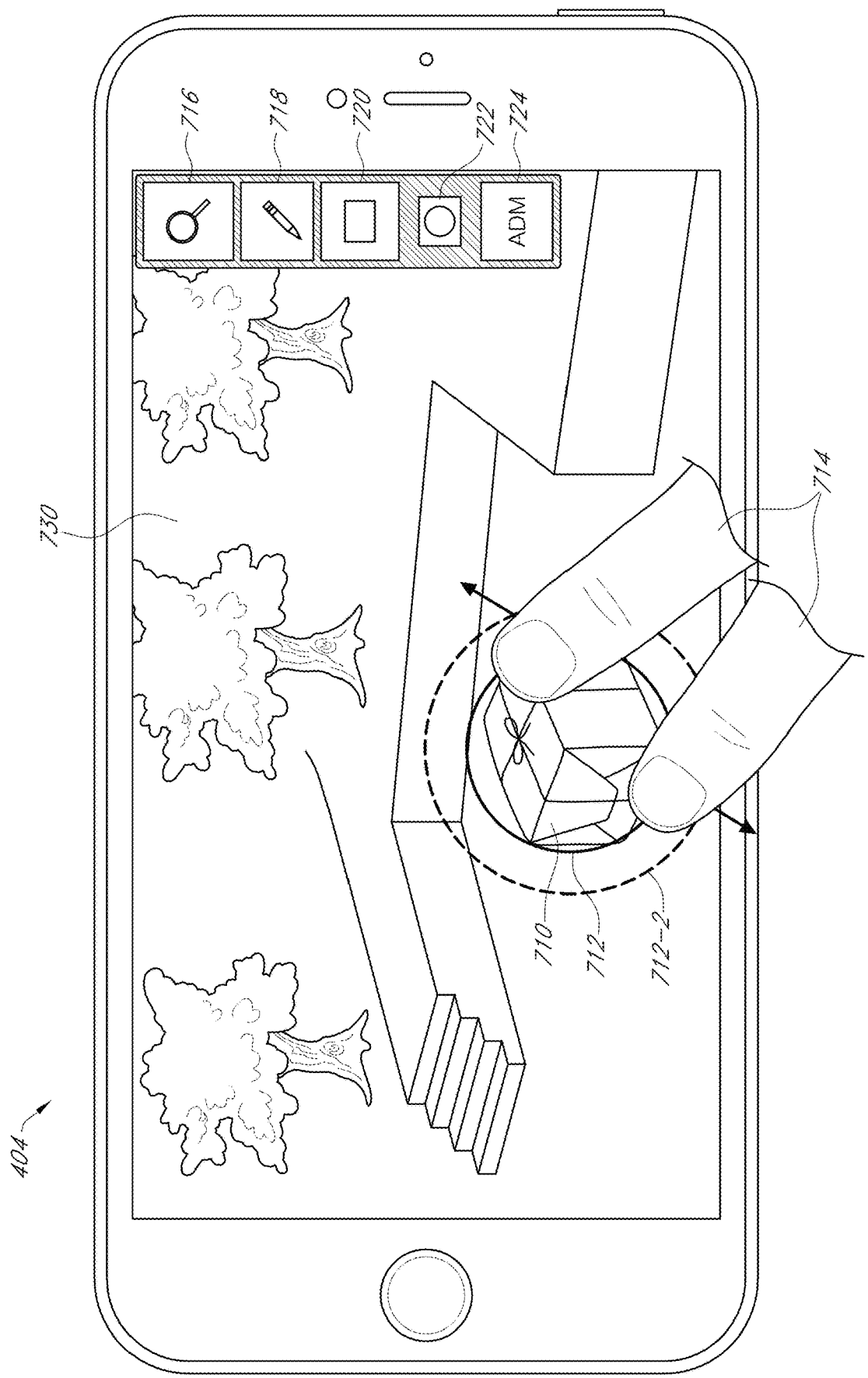

In other embodiments, the user may be able to select a general parcel boundary shape such as a square or circle, for example, as illustrated in FIG. 43. In FIG. 43, the user may first select the circle parcel boundary icon 722 such that a circle may appear on the display 730. The user may then use his or her fingers 714 to maneuver the parcel boundary 712 around the display 730 and/or to adjust the size and/or shape of the parcel boundary 712 (e.g., enlarge the circle, lengthen the circle along an axis to create more of an oval shape, etc.). For example, the user may increase the size of the parcel boundary 712 to the size of the parcel boundary 712-2. The GUI may also include the square parcel boundary icon 720 for creating a square parcel boundary 475, and/or any other shaped parcel boundary icon.

Figure 44:
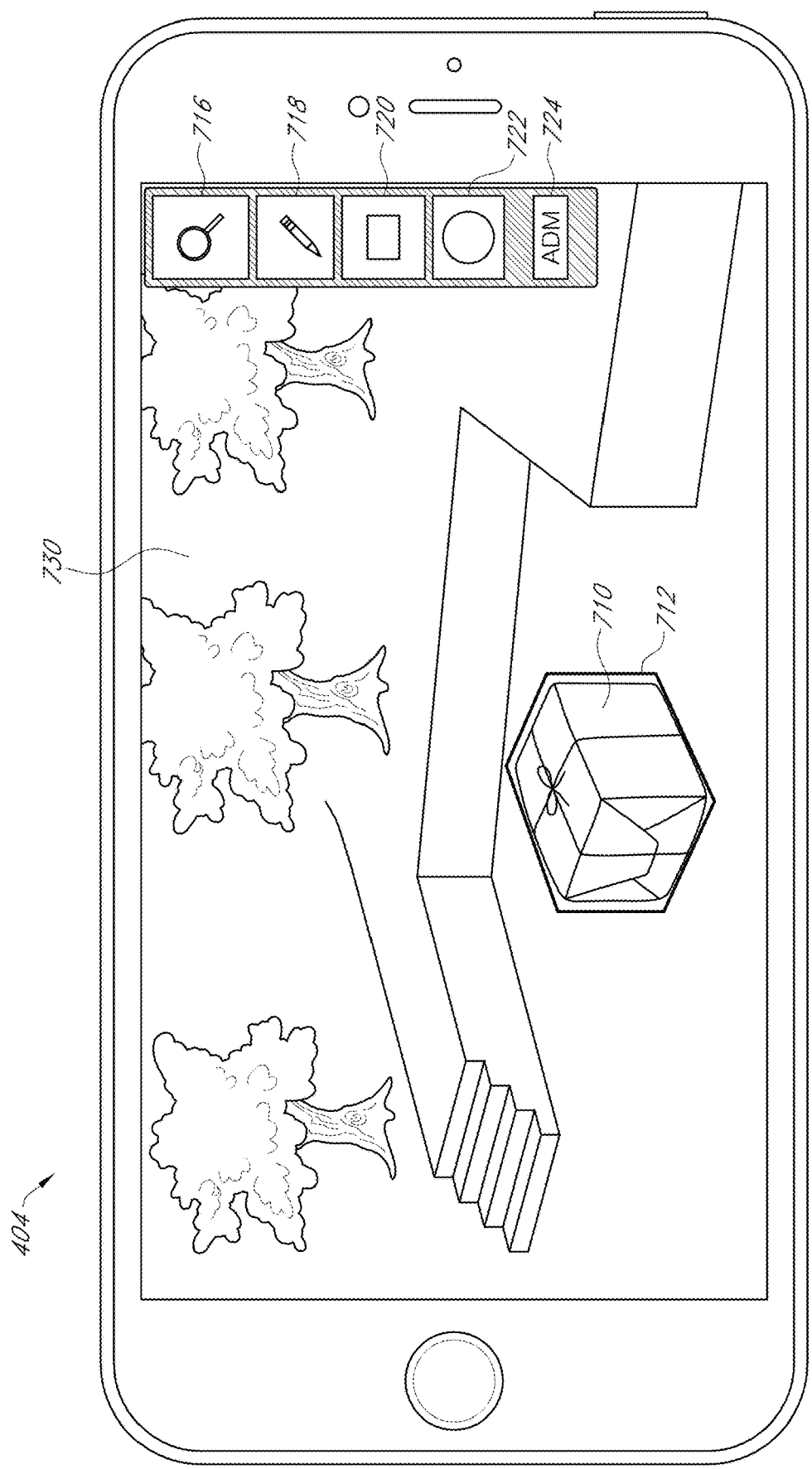

In yet another embodiment, the parcel boundary 475 may be generated automatically. In such embodiments, the user may select the automatic detection mode (ADM) icon 724, for example, as illustrated in FIG. 44. As a result, the processor of the client device 404 may locate, within the image data 460, the parcel 710 and generate the parcel boundary 712 around the parcel 710. The parcel boundary 712 may conform to the shape of the parcel 710, as illustrated in FIG. 44, or may be another shape, such as a circle or square, for example. In addition to selecting the ADM icon 714, the user may also be able to select the size of the parcel boundary 712. For example, the user may be able to select the size of the parcel boundary 712 relative to the parcel 710. In such an example, the user may be able to select a small, medium, or large parcel boundary 712. A small, or standard, parcel boundary 712 may conform substantially to the shape and size of the parcel 710, while medium and large parcel boundaries may be larger than, but substantially the same shape as, the parcel 710. For example, a medium parcel boundary 712 may be 50% to 75% larger than the parcel, and a large parcel boundary 712 may be 100% to 200% larger than the parcel. As such, the sizes of the parcel boundary 712 may correlate to the size of the parcel. In other embodiments, the sizes of the parcel boundary 712 may be the same irrespective of the parcel 710 size.

The automatic detection mode may use computer vision, such as object detection, similar to that described above, to determine the location of the parcel within the field of view of the A/V recording and communication device 402. Once the location, size, and shape of the parcel is determined, the parcel boundary 475 can be generated around the parcel in the field of view of the A/V recording and communication device 402.

Figure 35:
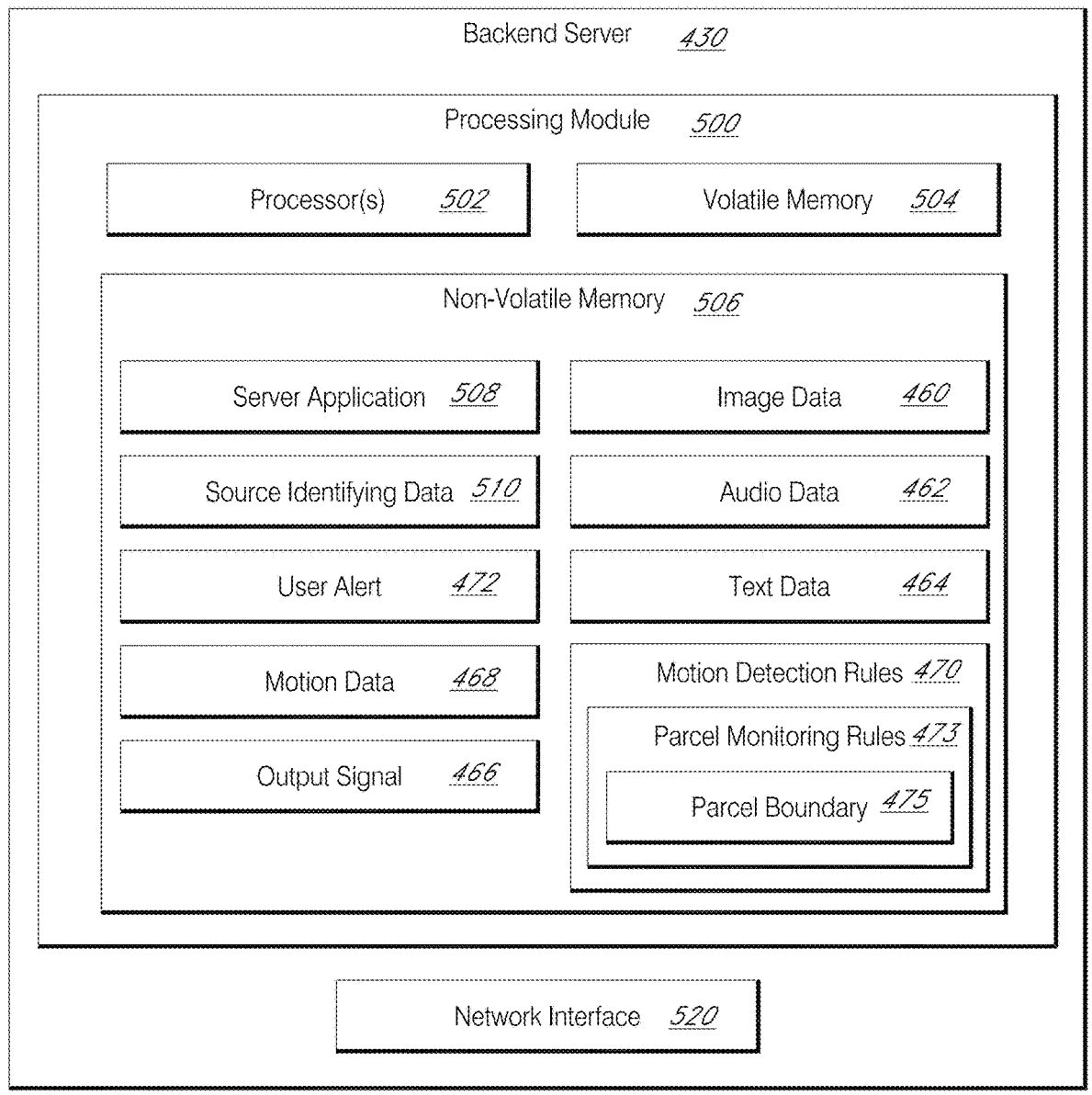
FIG. 35 is a functional block diagram of a backend device on which the present embodiments may be implemented according to various aspects of the present disclosure.

FIG. 35 is a functional block diagram illustrating one embodiment of the backend server(s) 430 according to various aspects of the present disclosure. The backend server(s) 430 may comprise a processing module 500 comprising a processor 502, volatile memory 504, a network interface 520, and non-volatile memory 506. The network interface 520 may allow the backend server(s) 430 to access and communicate with devices connected to the network (Internet/PSTN) 410. The non-volatile memory 506 may include a server application 508 that configures the processor 502 to receive the image data 460, the audio data 462, the text data 464, and/or the motion data 468 received from the A/V recording and communication device 402 in the output signal 466, for example. In various embodiments, and as described below, the backend server(s) 430 may be configured to receive, from the client device 404, 406, a first selection of a parcel boundary 475 for monitoring a parcel within the parcel boundary 475, and a second selection of a monitoring action (e.g., generating the user alert 472) to be executed in response to the parcel being moved from within the parcel boundary 475, and generate and transmit, based on the first and second selections, the parcel monitoring rules 473 to the A/V recording and communication device 402.

In further reference to FIG. 35, the non-volatile memory 506 may also include source identifying data 510 that may be used to identify the A/V recording and communication device 402. In some of the present embodiments, identifying the A/V recording and communication device 402 may include determining the location of the device 402, which location may be used to determine which client device(s) 404, 406 will receive the user alert 472 and/or the image data 460. In addition, the source identifying data 510 may be used to determine location(s) of the client device(s) 404, 406. In some of the present embodiments, the server application 508 may further configure the processor 502 to generate and transmit a report signal (not shown) to a third-party client device (not shown), which may be associated with a law enforcement agency, for example. The report signal sent to the law enforcement agency may include information indicating an approximate location of where the image data 460 was captured, which may assist the law enforcement agency with apprehending the criminal perpetrator shown in the image data 460.

In the illustrated embodiment of FIGS. 34-35, the various components including (but not limited to) the processing modules 446, 500, the communication module 450, and the network interface 520 are represented by separate boxes. The graphical representations depicted in each of FIGS. 23-24 are, however, merely examples, and are not intended to indicate that any of the various components of the A/V recording and communication device 402 or the backend server(s) 430 are necessarily physically separate from one another, although in some of the present embodiments they might be. In other embodiments, however, the structure and/or functionality of any or all of the components of A/V recording and communication device 402 may be combined. In addition, in some of the present embodiments the communication module 450 may include its own processor, volatile memory, and/or non-volatile memory. Further, the structure and/or functionality of any or all of the components of the backend server(s) 430 may be combined. In addition, in some of the present embodiments the network interface 520 may include its own processor, volatile memory, and/or non-volatile memory.

Figure 36:
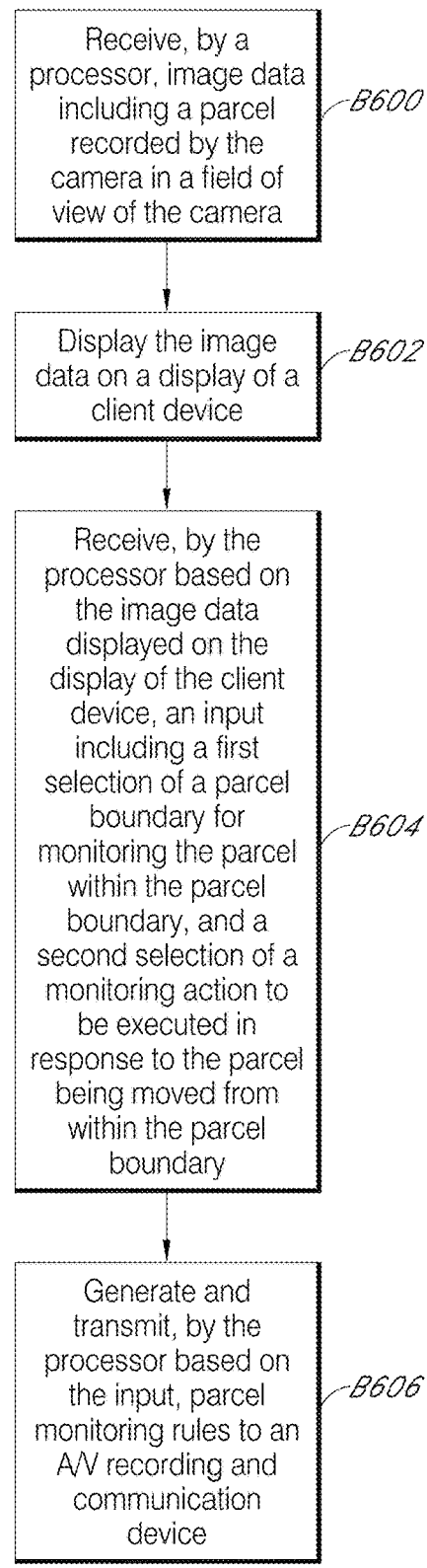
FIGS. 36-41 are flowcharts illustrating various embodiments of processes for deterring parcel theft with an A/V recording and communication device according to various aspects of the present disclosure.

Now referring to FIG. 36, FIG. 36 is a flowchart illustrating one embodiment of a process for deterring parcel theft with an A/V recording and communication device according to various aspects of the present disclosure. At block B600, the process receives, by a processor, image data including a parcel recorded by the camera in a field of view of the camera. For example, a processor (e.g., the processor 802 of FIG. 45) of the client device 404, 406 may receive the image data 460 including a parcel recorded by the camera 444 in a field of view of the camera 444.

At block B602, the process displays the image data on a display of a client device. For example, the processor of the client device 404, 406 may display the image data 460 on the display of the client device 404, 406 (e.g. display 806 of FIG. 45). The image data 460 on the display may be a visual representation of the field of view of the camera 444. The image data 460 may include the parcel, such as the parcel 710 of FIGS. 42-44. The image data 460 displayed on the display may be a still image captured by the camera 444, a live, streaming, and/or recorded video captured by the camera 444, and/or a frame of a video recorded by the camera 444. For example, once the A/V recording and communication device 402 determines a parcel is present, the camera 444 may capture a still image of the field of view of the camera 444 including the parcel for sending to the client device 404, 406 to have the parcel boundary 475 created. In another example, a video feed may be sent to the display of the client device 404, 406, and the user may be able to, based on the presence of the parcel, enter the parcel protection mode whereby the user can create the parcel boundary 475. In such an example, the user may be able to freeze the video at a certain frame to create the parcel boundary 475. In another example, the processor of the client device 404, 406 may freeze the video at a frame that includes the parcel for the user to create the parcel boundary 475. In yet another example, the user may be able to create the parcel boundary 475 while viewing the live streaming video. This example may be useful where the field of view of the camera 444 does not change.

With further reference to FIG. 36, the process, at block B604, receives, by the processor based on the image data displayed on the display of the client device, an input including a first selection of a parcel boundary for monitoring the parcel within the parcel boundary, and a second selection of a monitoring action to be executed in response to the parcel being moved from within the parcel boundary. For example, the processor of the client device 404, 406, based on the image data 460 (e.g., a visual representation of the field of view of the camera 444 including the parcel), receives an input including a first selection of the parcel boundary 475 for monitoring the parcel within the parcel boundary 475, and a second selection of a monitoring action (e.g., generating a user alert) to be executed in response to the parcel being moved from within the parcel boundary 475.

The selection of the parcel boundary 475 may be done by the user using any of the methods described above with respect to FIGS. 42-44. For example, as illustrated in FIG. 42, the user may draw the parcel boundary 712 around the parcel 712 using his or her finger 714 on the display 730 of the client device 404, 406. As another example, as illustrated in FIG. 43, the user may fit a parcel boundary 712 of a particular shape, such as a circle, square, rectangle, triangle, or other shape, around the parcel 710 using his or her fingers 714 on the display 730. In yet another example, as illustrated in FIG. 44, the user may select automatic detection mode (ADM) to have the processor of the client device 404, 406 automatically generate the parcel boundary 712 around the parcel 710 on the display 730 of the client device 404, 406.

In such an example, object detection and/or recognition may be used, as described above, to locate the parcel in the image data 460 for generating the parcel boundary 475.

The second selection of the monitoring action to be executed in response to the parcel being moved from within the parcel boundary 475 may include a selection of the generation of a user alert, the sounding of an alarm, and/or the activating of the camera 444 to record image data 460 of the parcel being moved, for example. The user may be presented a list of options for the monitoring action, including those listed above, from which to choose. The user may be presented the list of options before, during, and/or after the selection of the parcel boundary 475.

In embodiments where the monitoring action includes the user alert 472, the user alert 472 may include an indication that the parcel has been removed from the parcel boundary 475. For example, the user may receive the user alert 472 on the display of their client device 404, 406 with textual information indicating that the parcel has been removed from within the parcel boundary 475. In some of the present embodiments, the user alert 472 may include information about the person who removed the parcel from within the parcel boundary 475. For example, as discussed above, the image data 460 may be analyzed using computer vision to determine the identity of the person and/or to determine if the person is an authorized person. If the person is authorized and/or the identity of the person can be determined (e.g., by comparing the person in the image data 460 to a database of suspicious person), the identity of the person may be included in the user alert 472. For example, the name of the person and/or an indication of whether the person is authorized or not may be included as textual information in the user alert 472. In some of the present embodiments, the user alert 472 may include at least one frame captured by the camera 444 during the time the parcel is being removed from the parcel boundary 475. For example, the user alert 472 may include the live or pre-recorded video of the parcel being moved from within the parcel boundary 475. For another example, a number of frames may be captured by the camera 444 during the time that the parcel is being moved from within the parcel boundary 475, and the user alert 472 may include at least one of those frames. In some of the present embodiments, each of the frames may be analyzed to determine the frame that is most relevant based on the motion detection rules 473. For example, based on the motion detection rules 473, the frame that is most relevant may be the frame including the parcel and the person who is removing the parcel. In such an example, there may be multiple frames including the person and the parcel, and the frame with the clearest image, such as a facial image, of the person may be the selected frame for including in the user alert 472, for example. In some of the present embodiments, the user alert 472 may be programmed to display as a push-notification on the display of the client device 404, 406. The push-notification may include the information discussed above relating to the removal of the parcel and may further include at least one frame from the video and/or a still image, as discussed above.

In some of the present embodiments, the first selection and the second selection may be made in response to entering the parcel protection mode. In such embodiments, the user, similar to that described above, may be able to activate and deactivate (e.g., turn on and off) the parcel protection mode. For example, the user may be aware that his or her spouse is arriving home, and may deactivate the parcel protection mode. In some of the present embodiments, the user may activate, or deactivate, or change the monitoring action, while leaving the parcel monitoring within the parcel boundary 475 in place. This action may be taken, for example, when the user wants to have a record of the parcel being moved, but does not wish to have a monitoring action executed in response to the parcel being moved.

At block B606, the process generates and transmits, by the processor based on the input, parcel monitoring rules to an A/V recording and communication device. For example, the processor of the client device 404, 406 may generate and transmit, using the communication module 450, the parcel monitoring rules 473 to the A/V recording and communication device 402. The parcel monitoring rules 473 may be used by the A/V recording and communication device 402 to update the motion detection rules 470 of the motion detector (e.g., the camera 444 and/or the motion sensor 474) to monitor the parcel within the parcel boundary 475 and execute the monitoring action in response to the parcel being moved from within the parcel boundary 475.

Figure 37:
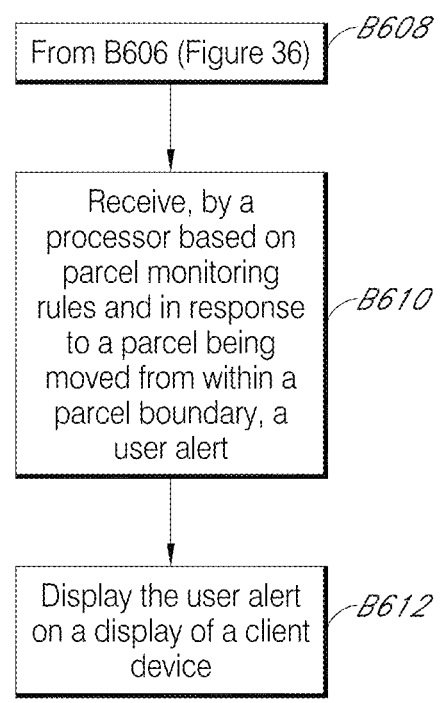

Now referring to FIG. 37, FIG. 37 is a flowchart illustrating one embodiment of a process for deterring parcel theft with an A/V recording and communication device according to various aspects of the present disclosure. The process of FIG. 37, as indicated at block B608, may continue from block B606 of the process of FIG. 36. At block B610, the process receives, by a processor based on parcel monitoring rules and in response to a parcel being moved from within a parcel boundary, a user alert. For example, the processor (e.g., the processor 802 of the client device 800), based on the parcel monitoring rules 473 and in response to the parcel being moved from within the parcel boundary 475 (e.g., the parcel 710 being moved from within the parcel boundary 712 of FIGS. 42-44), receives the user alert 472.

As discussed above, the user alert 472 may include a notification that the parcel has been moved from within the parcel boundary 475, a notification of who removed the parcel, if the person is an authorized person or a recognized unauthorized person, a live or pre-recorded video of the parcel being moved from within the parcel boundary 475, and/or a frame from the video captured by the camera 444 during the movement of the parcel from within the parcel boundary 475, for example.

At block B612, the process displays the user alert on a display of a client device. For example, the user alert 472 may be displayed on the display of the client device 404, 406. The user alert 472, as discussed above, may display on the client device 404, 406 as a push-notification. The user may be able to select the push-notification to access video (live or pre-recorded) captured by the camera 444 of the parcel being moved from within the parcel boundary 475. In some of the present embodiments, the user alert 472 may be programmed such that the video from the parcel being removed from the parcel boundary 475 automatically displays on the display of the client device 404, 406. In some of the present embodiments, the user alert 472 may be programmed to provide a notification that an alert is pending (e.g., with a number "1" or an "!" overlaid on the application icon on the display of the client device 404, 406). In such an embodiment, the user alert 472 may further be programmed to save the video of the parcel being moved from within the parcel boundary 475 for viewing at a future time by the user.

Figure 38:
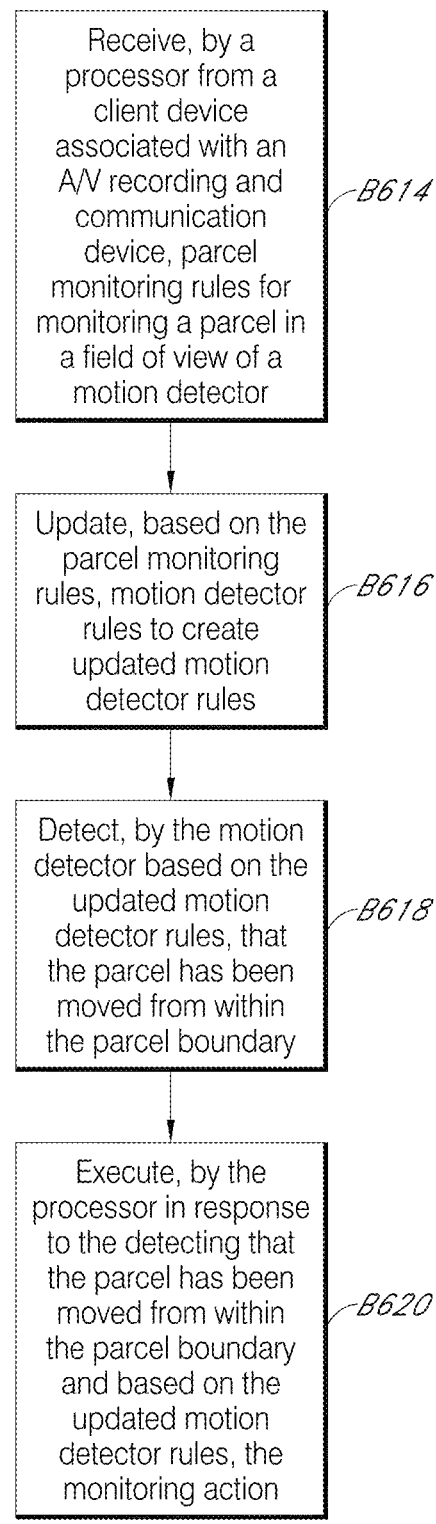

Now referring to FIG. 38, FIG. 38 is a flowchart illustrating one embodiment of a process for deterring parcel theft with an A/V recording and communication device according to various aspects of the present disclosure. At block B614, the process receives, by a processor from a client device associated with an A/V recording and communication device, parcel monitoring rules for monitoring a parcel in a field of view of a motion detector. For example, the processor 452 receives from the client device 404, 406 associated with the A/V recording and communication device 402, the parcel monitoring rules 473 for monitoring the parcel in a field of view of the motion detector (e.g., the camera 444 and/or the motion sensor 474). The parcel monitoring rules 473 may be similar to those described above with respect to FIG. 34 and block B606 of FIG. 36, for example.

At block B616, the process updates, based on the parcel monitoring rules, the motion detection rules to create updated motion detection rules. For example, the processor 452 may update the motion detection rules 470 based on the parcel monitoring rules 473 to create updated motion detection rules 470. The parcel monitoring rules 473 may update the motion detection rules 470 similar to that described above with respect to FIG. 34. For example, the motion detection rules 470 may have an initial setting (e.g., sensitivity level) where the parcel boundary 475 is located. In response to receiving the parcel monitoring rules 473, the motion detection rules 470 may be updated such that the updated motion detection rules 470 have a current setting different than the initial setting within the parcel boundary 475. For example, the current setting may be an increased sensitivity within the parcel boundary 475, as described above. For another example, similar to that described above, successive frames of the image data 460 may be compared within the parcel boundary 475 to determine if any change is detected.

At block B618, the process detects, by the motion detector based on the updated motion detection rules, that the parcel has been moved from within the parcel boundary. For example, the motion detector (e.g., the camera 444 and/or the motion sensor 474) may detect that the parcel has been moved from within the parcel boundary 475 based on the updated motion detection rules 470. Without updating the motion detection rules 470, the removal of the parcel from the parcel boundary 475 may not have been noticed and/or may have been ignored by the user. For example, absent the parcel monitoring rules 473, the A/V recording and communication device 402 may have detected the motion event of a person entering the field of view of the camera 444 and/or the motion sensor 474, however, the image data 460 generated in response would not have been analyzed in view of the presence of a parcel and/or a parcel boundary 475. As such, the user alert 472, for example, generated in response to the person removing the parcel from the parcel boundary 475 may only indicate the presence of a person, which may go unnoticed, or may be ignored by the user. However, using the updated motion detection rules 470 based on the parcel monitoring rules 473, the user alert 472 may include the information pertaining to the parcel being removed from the parcel boundary 475, and thus may result in the user paying closer attention and/or not overlooking the user alert 472. In another example, the parcel may be located in a zone (e.g., one of Zone 1-5 of FIG. 20), or within a part of the zone where, absent the parcel monitoring rules 473, the removal of the parcel may have gone undetected based on current motion detection rules 470. For example, the user may have disabled motion detection in the zone, or part of the zone. However, with the updated motion detection rules 470 based on the parcel monitoring rules 473, the parcel boundary 475 may trigger enhanced monitoring of the zone, or the part of the zone where the parcel boundary 475 is located.

At block B620, the process executes, by the processor in response to the detecting that the parcel has been moved from within the parcel boundary and based on the updated motion detection rules, the monitoring action. For example, the processor 452 may execute the monitoring action (e.g., generate and transmit, using the communication module 450, the user alert 472) based on the updated motion detection rules in response to detecting that the parcel has been moved from within the parcel boundary 475. The parcel monitoring rules 473 may include the monitoring action to be executed, as discussed above, which may be, for example, generating the user alert 472, activating the camera 444 to record the parcel being moved from within the parcel boundary 475, and/or signaling an alarm using the speaker 448.

Figure 39:
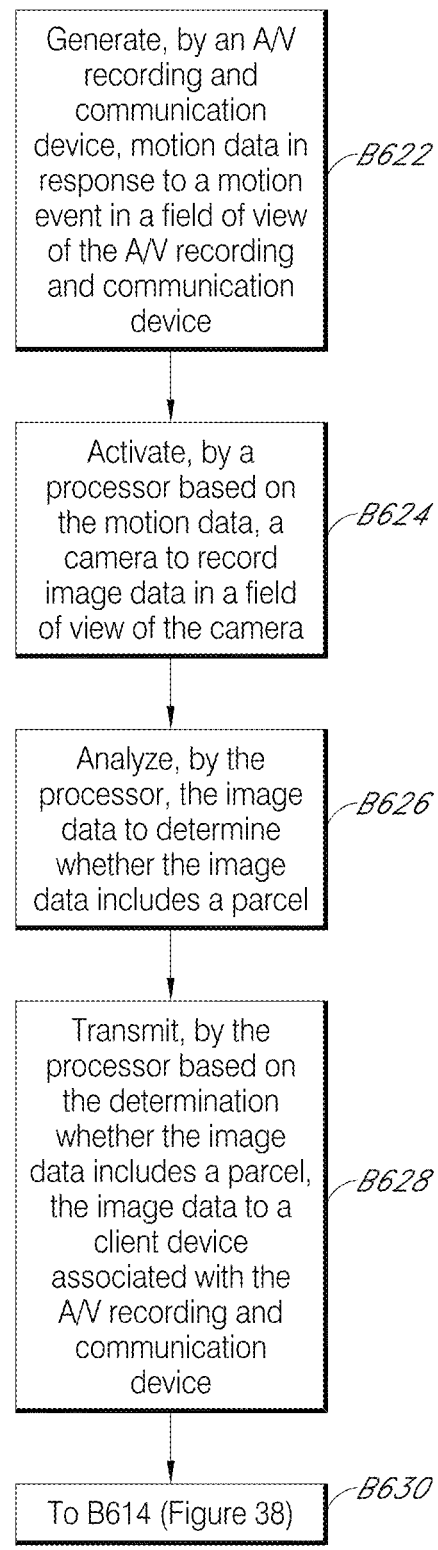

Now referring to FIG. 39, FIG. 39 is a flowchart illustrating one embodiment of a process for deterring parcel theft with an A/V recording and communication device according to various aspects of the present disclosure. As indicated at block B630, the process of FIG. 39 may precede the process of FIG. 38, such that the process of FIG. 38, at block B614, continues the process of FIG. 39 after block B628.

At block B622, the process generates, by an A/V recording and communication device, motion data in response to a motion event in a field of view of the A/V recording and communication device. For example, the motion sensor 474 and/or the camera 444 may generate the motion data 468 in response to a motion event in the field of view of the motion sensor 474 and/or the field of view of the camera 444. The motion event may, in some of the present embodiments, be caused by the movement of a person with a parcel in the field of view of the motion detector (e.g., the camera 444 and/or the motion sensor 474). The person may be carrying the parcel, dragging the parcel, pushing the parcel, or the like. The person may be, for example, a mail carrier, a delivery person, etc., as discussed above.

At block B624, the process activates, by a processor based on the motion data, a camera to record image data in a field of view of the camera. For example, the processor 452, based on the image data 460, may activate the camera 444 to record image data 460 in the field of view of the camera 444.

At block B626, the process analyzes, by the processor, the image data to determine whether the image data includes a parcel. For example, the processor 452 may analyze the image data 460 to determine whether the image data 460 includes the parcel. This process may be similar to that described above (e.g., with respect to the process, at block B300, of FIG. 22). In addition, the image data 460 may be analyzed to determine the location of the parcel within the field of view of the camera 444.

At block B628, the process transmits, by the processor based on the determination whether the image data includes a parcel, the image data to a client device associated with the A/V recording and communication device. For example, the processor 452 may transmit, using the communication module 450, the image data 460 to the client device 404, 406 based on the determination that the image data 460 includes the parcel. The processor 452, using the communication module 450, may transmit the image data 460 with a user alert 472 indicating to the user of the client device 404, 406 that the parcel is present. For example, the user alert 472 may be programmed to allow the user to activate the parcel protection mode whereby the user may be able to create the parcel boundary 475.

The image data 460 transmitted at block B628 may be received by the client device 404, 406 at block B600 of FIG. 36, for example. In response, the client device 404, 406 may execute the process of FIG. 36 and/or the process of FIG. 37, for example. In response, the A/V recording and communication device 402 may receive, at block B614, the parcel monitoring rules 473 transmitted by the client device 404, 406 at block B606 and execute the process of FIG. 38, for example.

Figure 40:
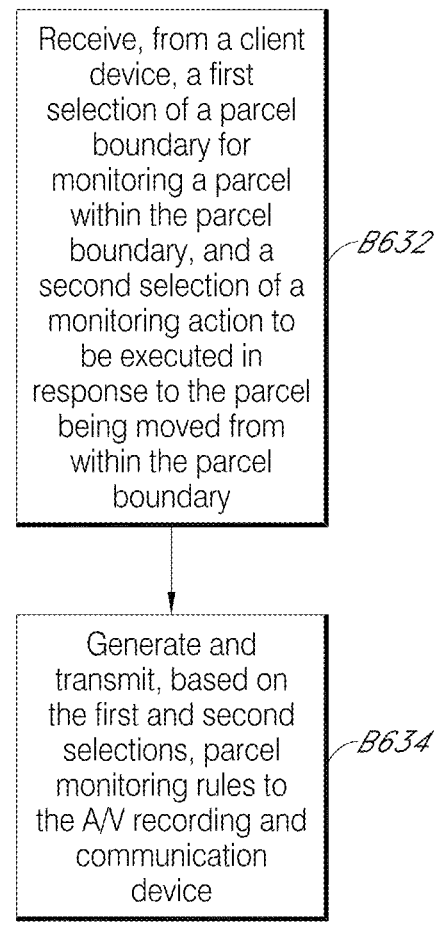

Now referring to FIG. 40, FIG. 40 is a flowchart illustrating one embodiment of a process for deterring parcel theft with an A/V recording and communication device according to various aspects of the present disclosure. At block B632, the process receives, from a client device, a first selection of a parcel boundary for monitoring a parcel within the parcel boundary, and a second selection of a monitoring action to be executed in response to the parcel being moved from within the parcel boundary. For example, the processor 502 of the backend server 430 may receive, using the network interface 520, from the client device 404, 406, a first selection of the parcel boundary 475 for monitoring the parcel within the parcel boundary 475, and a second selection of a monitoring action to be executed in response to the parcel being moved from within the parcel boundary 475. In other words, after the user of the client device 404, 406 makes the first selection and the second selection at block B604 of FIG. 36, for example, the processor 502 of the backend server 430 receives the first selection (e.g., the parcel boundary 475) and the second selection (e.g. the monitoring action such as the user alert 472).

At block B634, the process generates and transmits, based on the first and second selections, parcel monitoring rules to the A/V recording and communication device. For example, the processor 502 may generate and transmit, using the network interface 520, the parcel monitoring rules 473 to the A/V recording and communication device 402. This process may be similar to that of block B606 of FIG. 36, except it may be executed by the processor 502 of the backend server 430, for example.

Figure 41:
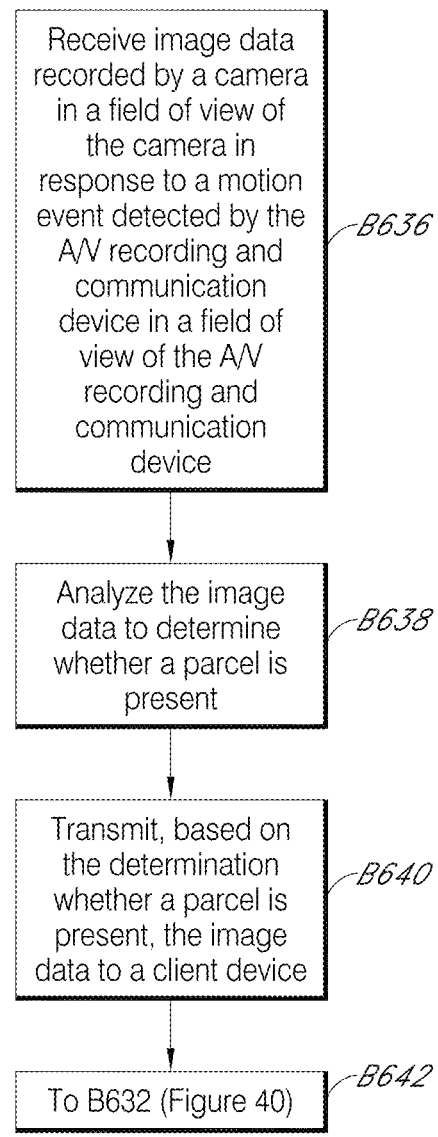

Now referring to FIG. 41, FIG. 41 is a flowchart illustrating one embodiment of a process for deterring parcel theft with an A/V recording and communication device according to various aspects of the present disclosure. As indicated at block B642, the process of FIG. 41 may precede the process of FIG. 40, such that the process of FIG. 40, at block B632, continues the process of FIG. 41 after block B640.

At block B636, the process receives image data recorded by a camera in a field of view of the camera in response to a motion event detected by the A/V recording and communication device in a field of view of the A/V recording and communication device. For example, the processor 502 of the backend server 430 may receive the image data 460 recorded by the camera 444 in a field of view of the camera 444 in response to a motion event detected by the A/V recording and communication device (e.g., by the camera 444 and/or the motion sensor 474) in a field of view of the A/V recording and communication device 402 (e.g., a field of view of the camera 444 and/or a field of view of the motion sensor 474). The processor 502 may receive the image data 460 from the A/V recording and communication device 402 after the A/V recording and communication device 402 records the image data 460 at block B624, for example.

At block B638, the process analyzes the image data to determine whether a parcel is present. For example, the processor 502 may analyze the image data 460 to determine if a parcel is present. This process may be similar to that of block B626 of FIG. 39, except it may be executed by the processor 502 of the backend server 430, for example.

At block B640, the process transmits, based on the determination that a parcel is present, the image data to a client device. For example, the processor 502, using the network interface 520, may transmit the image data 460, based on the determination that a parcel is present in the image data 460, to the client device 404, 406 associated with the A/V recording and communication device 402. This process may be similar to that of block B628 of FIG. 39, except it may be executed by the processor 502 of the backend server 430, for example.

The image data 460 transmitted at block B640 may be received by the client device 404, 406 at block B600 of FIG. 36, for example. In response, the client device 404, 406 may execute the process of FIG. 36 until block B604, and may transmit the first selection and the second selection from block B604 to the backend server 430, for example. In response, the backend server 430 may receive, at block B632, the first selection and the second selection and execute the process of FIG. 40, for example.

In various embodiments, techniques as disclosed herein may protect against parcel theft and/or may aid in apprehending perpetrators of parcel theft. In particular, as described above, the present embodiments advantageously leverage the functionality of A/V recording and communication devices to deter parcel theft and/or to identify and apprehend parcel thieves. Various embodiments may determine when one or more parcels have been left within and/or removed from the area about the A/V recording and communication device. When one or more parcels are removed from the area about the A/V recording and communication device, various embodiments may determine whether such removal was authorized and, if desired, generate an alert. The user may then determine what, if anything, to do in response to the alert, such as notifying law enforcement and/or sharing video footage of the parcel theft, such as via social media.

Figure 45:
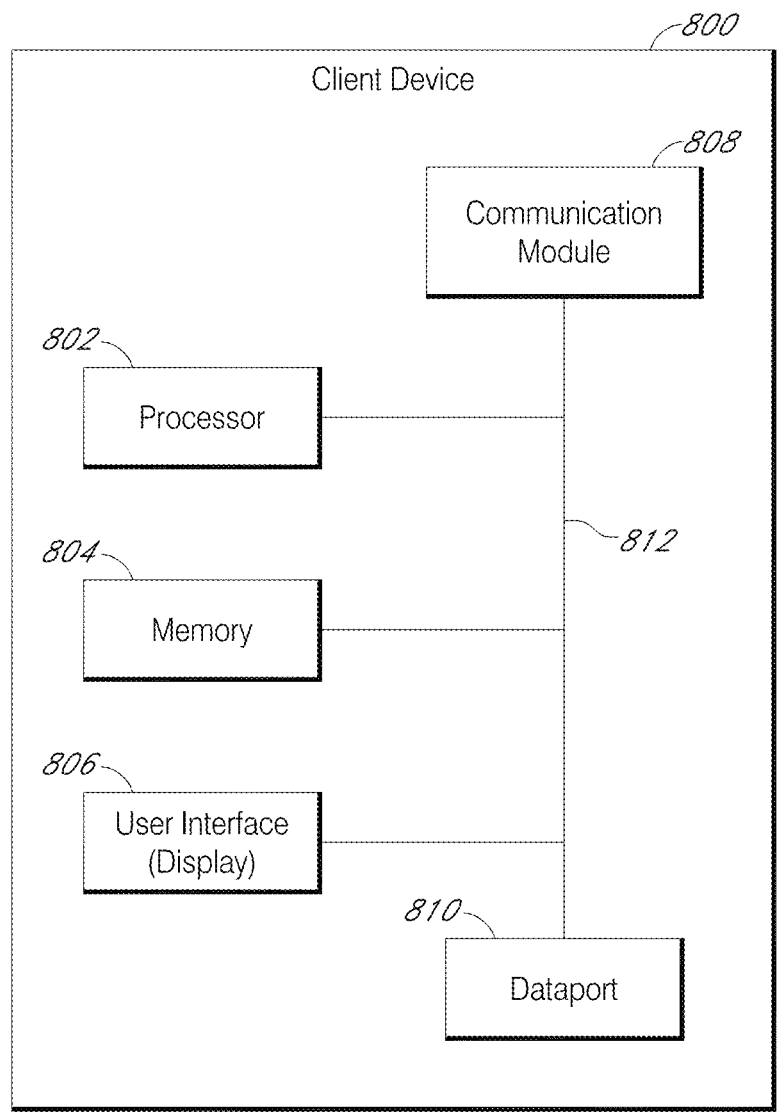
FIG. 45 is a functional block diagram of a client device on which the present embodiments may be implemented according to various aspects of the present disclosure.

FIG. 45 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 45, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some of the present embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some of the present embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 46:
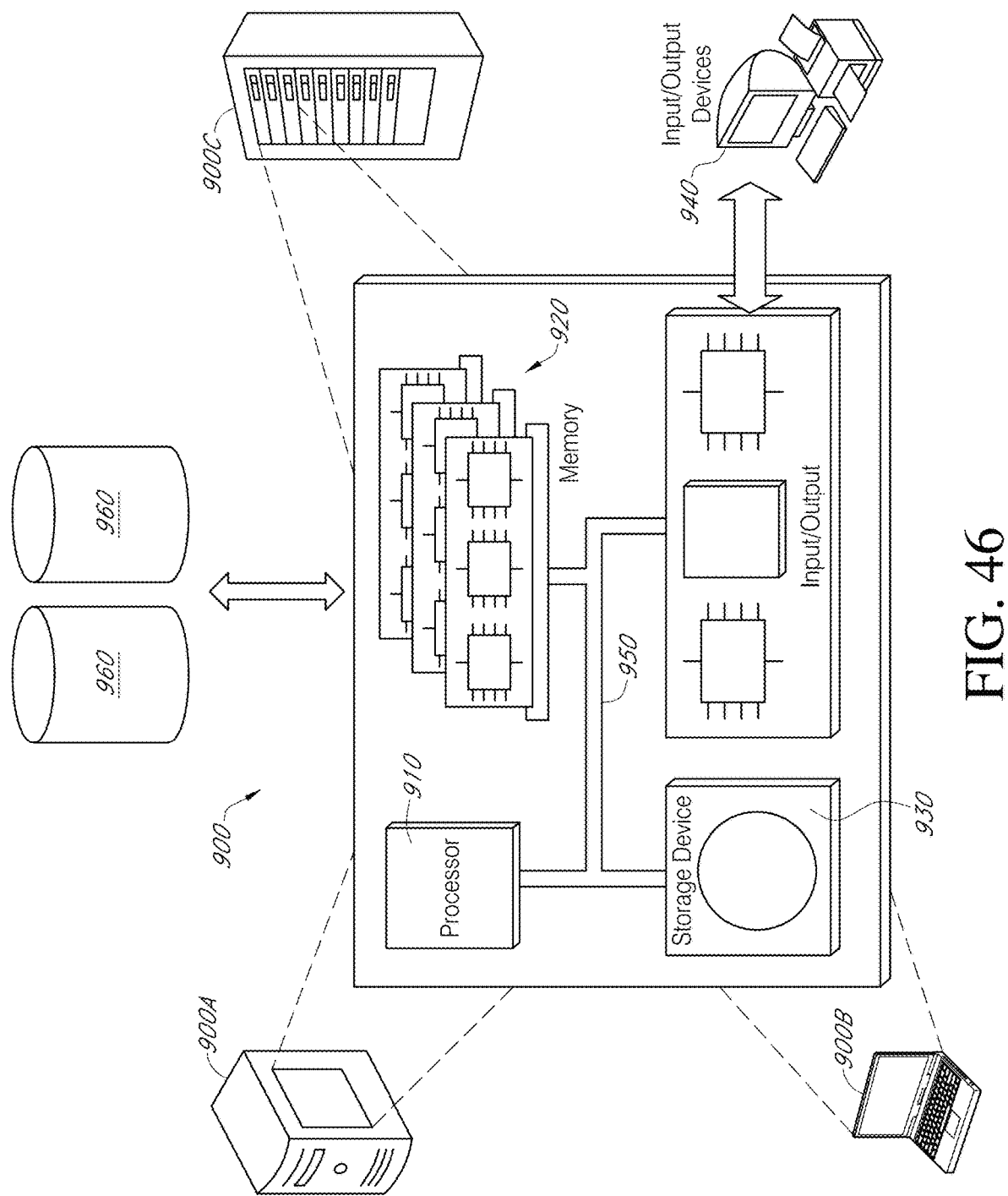
FIG. 46 is a functional block diagram of a general-purpose computing system on which the present embodiments may be implemented according to various aspects of the present disclosure.

FIG. 46 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers.

The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, a client device including a processor and a display associated with an audio/video (A/V) recording and communication device having a camera, receives, by the processor, image data including a parcel recorded by the camera in a field of view of the camera; displays the image data on the display of the client device; receives, by the processor based on the image data displayed on the display of the client device, an input including a first selection of a parcel boundary for monitoring the parcel within the parcel boundary, and a second selection of a monitoring action to be executed in response to the parcel being moved from within the parcel boundary; and generates and transmits, by the processor based on the input, parcel monitoring rules to the A/V recording and communication device.

In an embodiment of the first aspect, displaying the image data on the display includes one of streaming a video, displaying a still image, and displaying a frame of a video.

In another embodiment of the first aspect, the input of the first selection includes one of a drawing of the parcel boundary around the parcel on the display, fitting a selected shape around the parcel as the parcel boundary on the display, and selecting an automatic detection mode for automatically creating the parcel boundary.

In another embodiment of the first aspect, the automatic detection mode includes: using object detection to detect the size, shape, and location of the parcel in the image data; and generating the parcel boundary around the parcel.

In another embodiment of the first aspect, the monitoring action is at least one of sounding an alarm, activating the camera to record, and generating a user alert.

In a second aspect, a client device associated with an audio/video (A/V) recording and communication device having a camera comprises: a display; a communication module; one or more processors; and a non-transitory machine readable memory storing a program, the program executable by at least one of the processors, the program comprising sets of instructions for: receiving image data including a parcel recorded by the camera in a field of view of the camera; displaying the image data on the display of the client device; receiving, based on the image data displayed on the display of the client device, an input including a first selection of a parcel boundary for monitoring the parcel within the parcel boundary, and a second selection of a monitoring action to be executed in response to the parcel being moved from within the parcel boundary; and generating and transmitting, based on the input using the communication module, parcel monitoring rules to the A/V recording and communication device.

In an embodiment of the second aspect, displaying the image data on the display includes one of streaming a video, displaying a still image, and displaying a frame of a video.

In another embodiment of the second aspect, the input of the first selection includes one of a drawing of the parcel boundary around the parcel on the display, fitting a selected shape around the parcel as the parcel boundary on the display, and selecting an automatic detection mode for automatically creating the parcel boundary.

In another embodiment of the second aspect, the automatic detection mode includes: using object detection to detect the size, shape, and location of the parcel in the image data; and generating the parcel boundary around the parcel.

In another embodiment of the second aspect, the monitoring action is at least one of sounding an alarm, activating the camera to record, and generating a user alert.

In a third aspect, a client device including a processor, a display, and a communication module associated with an audio/video (A/V) recording and communication device having a camera, receives, by the processor, image data including a parcel recorded by the camera in a field of view of the camera in response to a motion event detected by the A/V recording and communication device in a field of view of the A/V recording and communication device; displays the image data on the display of the client device; receives, by the processor based on the image data displayed on the display of the client device, a first input including a formation of a parcel boundary for monitoring the parcel within the parcel boundary, and a second input including a selection of a monitoring action to be executed in response to the parcel being moved from within the parcel boundary, the selection of the monitoring action including at least a user alert; generates, by the processor based on the first input and the second input, parcel monitoring rules; transmits, by the processor using the communication module, the parcel monitoring rules to the A/V recording and communication device; receives, by the processor based on the parcel monitoring rules and in response to the parcel being moved from within the parcel boundary, the user alert; and displays the user alert on the display of the client device.

In an embodiment of the third aspect, displaying the image data on the display includes one of streaming a video, displaying a still image, and displaying a frame of a video.

In another embodiment of the third aspect, the formation of the parcel boundary includes one of a drawing of the parcel boundary around the parcel on the display, fitting a selected shape around the parcel as the parcel boundary on the display, and selecting an automatic detection mode for creating the parcel boundary.

In another embodiment of the third aspect, the automatic detection mode includes: using object detection to detect the size, shape, and location of the parcel in the image data; and generating the parcel boundary around the parcel.

In another embodiment of the third aspect, the monitoring action further includes at least one of sounding an alarm and activating the camera to record.

In another embodiment of the third aspect, the user alert includes an indication that the parcel has been removed from the parcel boundary.

In another embodiment of the third aspect, the user alert further includes information about a person who removed the parcel from the parcel boundary.

In another embodiment of the third aspect, the user alert includes at least one frame captured by the camera during the time the parcel is being removed from the parcel boundary.

In another embodiment of the third aspect, the parcel monitoring rules are programmed to adjust motion detection rules of the A/V recording and communication device.

In another embodiment of the third aspect, wherein the parcel monitoring rules are programmed to adjust the motion detection rules only until the parcel is removed from within the parcel boundary.

In a fourth aspect, an audio/video (AN) recording and communication device including a processor and a motion detector having motion detection rules, receives, by the processor from a client device associated with the A/V recording and communication device, parcel monitoring rules for monitoring a parcel in a field of view of the motion detector, the parcel monitoring rules including a parcel boundary for monitoring the parcel within the parcel boundary, and a monitoring action to be executed in response to the parcel being moved from within the parcel boundary; updates, by the processor based on the parcel monitoring rules, the motion detection rules to create updated motion detection rules; detects, by the motion detector based on the updated motion detection rules, that the parcel has been moved from within the parcel boundary; and executes, by the processor in response to the detecting that the parcel has been moved from within the parcel boundary and based on the updated motion detection rules, the monitoring action.

In an embodiment of the fourth aspect, the motion detector is at least one of a camera and a motion sensor of the A/V recording and communication device.

In another embodiment of the fourth aspect, the motion detection rules and the updated motion detection rules include at least one of camera motion detection rules and motion sensor motion detection rules.

In another embodiment of the fourth aspect, the monitoring action includes at least one of sounding an alarm, activating a camera of the A/V recording and communication device to record image data, and generating a user alert.

In another embodiment of the fourth aspect, the user alert includes an indication that the parcel has been removed from the parcel boundary.

In another embodiment of the fourth aspect, the user alert includes information about a person who removed the parcel from the parcel boundary.

In another embodiment of the fourth aspect, the user alert includes at least one frame captured by the camera during the time the parcel is being removed from the parcel boundary.

In another embodiment of the fourth aspect, the updated motion detection rules include increased sensitivity within the parcel boundary.

In a fifth aspect, an audio/video (A/V) recording and communication device comprises: a motion detector having motion detection rules; a communication module; one or more processors; and a non-transitory machine-readable memory storing a program, the program executable by at least one of the processors, the program comprising sets of instructions for: receiving, from a client device associated with the A/V recording and communication device using the communication module, parcel monitoring rules for monitoring a parcel in a field of view of the motion detector, the parcel monitoring rules including a parcel boundary for monitoring the parcel within the parcel boundary, and a monitoring action to be executed in response to the parcel being moved from within the parcel boundary; updating, based on the parcel monitoring rules, the motion detection rules to create updated motion detection rules; detecting, by the motion detector based on the updated motion detection rules, that the parcel has been moved from within the parcel boundary; and executing, by the processor in response to the detecting that the parcel has been moved from within the parcel boundary and based on the updated motion detection rules, the monitoring action.

In an embodiment of the fifth aspect, the motion detector is at least one of a camera and a motion sensor of the A/V recording and communication device.

In another embodiment of the fifth aspect, the motion detection rules and the updated motion detection rules include at least one of camera motion detection rules and motion sensor motion detection rules.

In another embodiment of the fifth aspect, the monitoring action includes at least one of sounding an alarm, activating a camera of the A/V recording and communication device to record image data, and generating a user alert.

In another embodiment of the fifth aspect, the user alert includes an indication that the parcel has been removed from the parcel boundary.

In another embodiment of the fifth aspect, the user alert includes information about a person who removed the parcel from the parcel boundary.

In another embodiment of the fifth aspect, the user alert includes at least one frame captured by the camera during the time the parcel is being removed from the parcel boundary.

In another embodiment of the fifth aspect, the updated motion detection rules include increased sensitivity within the parcel boundary.

In a sixth aspect, an audio/video (A/V) recording and communication device having a processor, a camera, and motion detection rules, generates, by the A/V recording and communication device, motion data in response to a motion event in a field of view of the A/V recording and communication device; activates, by the processor based on the motion data, the camera to record image data in a field of view of the camera; analyzes, by the processor, the image data to determine whether the image data includes a parcel; transmits, by the processor based on the determination whether the image data includes a parcel, the image data to a client device associated with the A/V recording and communication device; receives, by the processor from the client device, parcel monitoring rules for monitoring the parcel in the field of view of the A/V recording and communication device, the parcel monitoring rules including a parcel boundary for monitoring the parcel within the parcel boundary, and a monitoring action to be executed in response to the parcel being moved from within the parcel boundary; updates, by the processor based on the parcel monitoring rules, the motion detection rules to create updated motion detection rules; detects, by the A/V recording and communication device based on the updated motion sensor rules, that the parcel has been moved from within the parcel boundary; and executes, by the processor based on the updated motion detection rules and in response to the detecting that the parcel has been moved from within the parcel boundary, the monitoring action.

In an embodiment of the sixth aspect, the motion detection rules are executed by at least one of the camera and a motion sensor of the A/V recording and communication device.

In another embodiment of the sixth aspect, the motion detection rules and the updated motion detection rules include at least one of camera motion detection rules and motion sensor motion detection rules.

In another embodiment of the sixth aspect, the monitoring action includes at least one of sounding an alarm, activating a camera of the A/V recording and communication device to record image data, and generating a user alert.

In another embodiment of the sixth aspect, the user alert includes an indication that the parcel has been removed from the parcel boundary.

In another embodiment of the sixth aspect, the user alert includes information about a person who removed the parcel from the parcel boundary.

In another embodiment of the sixth aspect, the user alert includes at least one frame captured by the camera during the time the parcel is being removed from the parcel boundary.

In another embodiment of the sixth aspect, the updated motion detection rules include increased sensitivity within the parcel boundary.

In a seventh aspect, a method for use with an audio/video (A/V) recording and communication device and a client device associated with the A/V recording and communication device comprises: receiving, from the client device, a first selection of a parcel boundary for monitoring a parcel within the parcel boundary, and a second selection of a monitoring action to be executed in response to the parcel being moved from within the parcel boundary; and generating and transmitting, based on the first and second selections, parcel monitoring rules to the A/V recording and communication device.

In an embodiment of the seventh aspect, the first selection includes one of a drawing of the parcel boundary around the parcel, fitting a selected shape around the parcel as the parcel boundary, and selecting a parcel boundary creation mode for creating the parcel boundary.

In another embodiment of the seventh aspect, the monitoring action is at least one of sounding an alarm, activating the camera to record, and generating a user alert.

In an eighth aspect, a method for use with an audio/video (A/V) recording and communication device having a camera, and a client device associated with the A/V recording and communication device, comprises: receiving image data recorded by the camera in a field of view of the camera in response to a motion event detected by the A/V recording and communication device in a field of view of the A/V recording and communication device; analyzing the image data to determine whether a parcel is present; transmitting, based on the determination whether a parcel is present, the image data to the client device; receiving, from the client device, a first selection including a parcel boundary for monitoring the parcel within the parcel boundary, and a second selection of a monitoring action to be executed in response to the parcel being moved from within the parcel boundary; generating, based on the first selection and the second selection, parcel monitoring rules; and transmitting the parcel monitoring rules to the A/V recording and communication device.

In an embodiment of the eighth aspect, the first selection includes one of a drawing of the parcel boundary around the parcel, fitting a selected shape around the parcel as the parcel boundary, and selecting a parcel boundary creation mode for creating the parcel boundary.

In another embodiment of the eighth aspect, the monitoring action is at least one of sounding an alarm, activating the camera to record, and generating a user alert.

In a ninth aspect, a non-transitory computer readable storage medium is provided, the non-transitory computer readable storage medium storing a program comprising instructions that, when executed by at least one processor of at least one server, cause the at least one server to perform operations including: receiving, from an audio/video recording and communication device (A/V device), image data recorded by a camera of the A/V device; determining that a parcel is depicted in an image represented by the image data; transmitting, to a client device associated with the A/V device, the image data; receiving, from the client device, a parcel boundary defining a location within a field of view (FOV) of the camera for monitoring the parcel; and generating and transmitting, to the A/V device, parcel monitoring rules for monitoring the parcel in the FOV of the camera, wherein the parcel monitoring rules comprise the parcel boundary.

In an embodiment of the ninth aspect, the parcel monitoring rules further comprise a command to increase sensitivity of motion detection within the parcel boundary.

In another embodiment of the ninth aspect, the non-transitory computer readable storage medium further comprises instructions that, when executed by the at least one processor, further cause the at least one server to receive, from the client device, a monitoring action to be executed in response to the parcel being moved from within the parcel boundary.

In another embodiment of the ninth aspect, the parcel monitoring rules further comprise the monitoring action.

In another embodiment of the ninth aspect, the monitoring action comprises at least one of sounding an alarm, activating the camera of the A/V device to record further image data, and generating an alert.

In another embodiment of the ninth aspect, the non-transitory computer readable storage medium further comprises instructions that, when executed by the at least one processor, further cause the at least one server to receive, from the A/V device, an indication that the parcel has been moved from within the parcel boundary.

In another embodiment of the ninth aspect, the indication that the parcel has been moved from within the parcel boundary includes further image data recorded by the camera of the A/V device during a time when the parcel is being moved from within the parcel boundary.

In another embodiment of the ninth aspect, the non-transitory computer readable storage medium further comprises instructions that, when executed by the at least one processor, further cause the at least one server to generate and transmit, to the client device, an alert.

In another embodiment of the ninth aspect, the alert includes at least one frame represented by the further image data.

In another embodiment of the ninth aspect, the parcel boundary is at least one of a predetermined parcel boundary shape and a shape drawn using the client device.

In another embodiment of the ninth aspect, the parcel boundary is automatically generated to conform to a shape of the parcel.

In a tenth aspect, a method for at least one server for monitoring a parcel using an A/V recording and communication device (A/V device) is provided, the method comprising: receiving, from the A/V device, image data recorded by a camera of the A/V device; determining that a parcel is depicted in an image represented by the image data; transmitting, to a client device associated with the A/V device, at least one frame represented by the image data; and receiving, from the client device, a parcel boundary defining a location within a field of view of the camera for monitoring the parcel.

In an embodiment of the tenth aspect, the method further comprises: detecting that the parcel has been moved from within the parcel boundary; and executing, in response to at least the detecting that the parcel has been moved from within the parcel boundary, at least one monitoring action.

In another embodiment of the tenth aspect, detecting that the parcel has been moved from within the parcel boundary includes analyzing a portion of the image data that is recorded by the camera of the A/V device during a time when the parcel is being moved from within the parcel boundary.

In another embodiment of the tenth aspect, the method further comprises receiving, from the client device, the monitoring action to be executed in response to the parcel being moved from within the parcel boundary.

In another embodiment of the tenth aspect, the method further comprises generating and transmitting, to the client device, an alert.

In another embodiment of the tenth aspect, the alert includes at least one frame represented by further image data recorded by the camera during a time when the parcel is being moved from within the parcel boundary.

In another embodiment of the tenth aspect, the alert includes information about a person who moved the parcel from within the parcel boundary.

In another embodiment of the tenth aspect, the parcel boundary is at least one of a predetermined parcel boundary shape and a shape drawn using the client device.

In another embodiment of the tenth aspect, the parcel boundary is automatically generated to conform to a shape of the parcel.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A non-transitory computer readable storage medium storing a program comprising instructions that, when executed by at least one processor of at least one server, cause the at least one server to perform operations including:
receiving, from an audio/video recording and communication device (A/V device), image data recorded by a camera of the A/V device;
determining that a parcel is depicted in an image represented by the image data;
transmitting, to a client device associated with the A/V device, the image data;
receiving, from the client device, a parcel boundary defining a location within a field of view (FOV) of the camera for monitoring the parcel; and
generating and transmitting, to the A/V device, parcel monitoring rules for monitoring the parcel in the FOV of the camera, wherein the parcel monitoring rules comprise the parcel boundary.

2. The non-transitory computer readable storage medium of claim 1, wherein the parcel monitoring rules further comprise a command to increase sensitivity of motion detection within the parcel boundary.

3. The non-transitory computer readable storage medium of claim 1 further comprising instructions that, when executed by the at least one processor, further cause the at least one server to receive, from the client device, a monitoring action to be executed in response to detection of the parcel being moved from within the parcel boundary.

4. The non-transitory computer readable storage medium of claim 3, wherein the parcel monitoring rules further comprise the monitoring action.

5. The non-transitory computer readable storage medium of claim 3, wherein the monitoring action comprises at least one of sounding an alarm, activating the camera of the A/V device to record further image data, and generating an alert.

6. The non-transitory computer readable storage medium of claim 1 further comprising instructions that, when executed by the at least one processor, further cause the at least one server to receive, from the A/V device, an indication that the parcel has been moved from within the parcel boundary.

7. The non-transitory computer readable storage medium of claim 6, wherein the indication that the parcel has been moved from within the parcel boundary includes further image data recorded by the camera of the A/V device during a time when the parcel is being moved from within the parcel boundary.

8. The non-transitory computer readable storage medium of claim 7 further comprising instructions that, when executed by the at least one processor, further cause the at least one server to generate and transmit, to the client device, an alert.

9. The non-transitory computer readable storage medium of claim 8, wherein the alert includes at least one frame of the further image data.

10. The non-transitory computer readable storage medium of claim 1, wherein the parcel boundary is at least one of a predetermined parcel boundary shape and a shape defined by a drawing at the client device.

11. The non-transitory computer readable storage medium of claim 1, wherein the parcel boundary is automatically generated to conform to a shape of the parcel.

12. A method for at least one server for monitoring a parcel using an A/V recording and communication device (A/V device), the method comprising:
receiving, from the A/V device, image data recorded by a camera of the A/V device;
determining that a parcel is depicted in an image represented by the image data;
transmitting, to a client device associated with the A/V device, at least one frame of the image data; and
receiving, from the client device, a parcel boundary defining a location within a field of view of the camera for monitoring the parcel.

13. The method of claim 12 further comprising:
detecting that the parcel has been moved from within the parcel boundary; and
executing, in response to at least the detecting that the parcel has been moved from within the parcel boundary, at least one monitoring action.

14. The method of claim 13, wherein detecting that the parcel has been moved from within the parcel boundary includes analyzing a portion of the image data that is recorded by the camera of the A/V device during a time when the parcel is being moved from within the parcel boundary.

15. The method of claim 12 further comprising receiving, from the client device, the monitoring action to be executed in response to the parcel being moved from within the parcel boundary.

16. The method of claim 12 further comprising generating and transmitting, to the client device, an alert.

17. The method of claim 16, wherein the alert includes at least one frame of further image data recorded by the camera during a time when the parcel is being moved from within the parcel boundary.

18. The method of claim 16, wherein the alert includes information about a person who moved the parcel from within the parcel boundary.

19. The method of claim 12, wherein the parcel boundary is at least one of a predetermined parcel boundary shape and a shape drawn using the client device.

20. The method of claim 12, wherein the parcel boundary is automatically generated to conform to a shape of the parcel.

* * * * *